(12) United States Patent (10) Patent No.: US 11,918,949 B2
Salehpoor (45) Date of Patent: Mar. 5, 2024

(54) POLLUTANT CAPTURER AND MOBILIZER

(71) Applicant: Karim Salehpoor, Bakersfield, CA (US)

(72) Inventor: Karim Salehpoor, Bakersfield, CA (US)

( * ) Notice: Subject to any disclaimer, the term of this patent is extended or adjusted under 35 U.S.C. 154(b) by 0 days.

(21) Appl. No.: 17/813,569

(22) Filed: Jul. 19, 2022

(65) Prior Publication Data

US 2022/0347619 A1 Nov. 3, 2022

Related U.S. Application Data

(62) Division of application No. 16/298,730, filed on Mar. 11, 2019, now Pat. No. 11,471,816.

(51) Int. Cl.
*B01D 46/58* (2022.01)
*A01G 15/00* (2006.01)
(Continued)

(52) U.S. Cl.
CPC ............. *B01D 46/58* (2022.01); *A01G 15/00* (2013.01); *B01D 46/0031* (2013.01);
(Continued)

(58) Field of Classification Search
None
See application file for complete search history.

(56) References Cited

U.S. PATENT DOCUMENTS 1,540,346 A * 6/1925 Kunz ..................... B01D 46/00
55/304

1,795,888 A * 3/1931 Rabezzana ............. B01D 45/14
55/394
(Continued)

FOREIGN PATENT DOCUMENTS

CN 107869373 A 4/2018
DE 4308907 A1 * 9/1994 ............. B01D 45/12
(Continued)

OTHER PUBLICATIONS

DE4308907A1_ENG (Espacenet machine translation of Berz) (Year: 1994).*
(Continued)

*Primary Examiner* — Gabriel E Gitman
(74) *Attorney, Agent, or Firm* — Andrew D. Fortney; Central California IP Group, P.C.

(57) ABSTRACT

Disclosed are a pollutant capturer and mobilizer and method of mobilizing a polluted gaseous substance from one location towards another location and capturing one or multiple types of polluting substances, such as $CO_2$, from an atmospheric body of polluted gaseous substance or from exhaust of vehicles, chimneys, or stacks and thereby combat the negative health, environmental, and economic impacts of the of the polluting substances on communities. Wet or dry embodiments of the pollutant capturer and mobilizer utilize wet or dry pollutant capturing components, respectively, to capture one or multiple types of polluting substances from a body of polluted gaseous substance. Flow-establishing devices can be used to set the body of polluted gaseous substance in motion through the pollutant capturing component. The pollutant capturer and mobilizer may also be mounted on any type of vehicle, with or without using flow-establishing devices.

20 Claims, 18 Drawing Sheets

(51) Int. Cl.
    *B01D 46/00*     (2022.01)
    *B01D 46/12*     (2022.01)
    *B01D 46/42*     (2006.01)
    *B01D 46/62*     (2022.01)
    *B01D 47/02*     (2006.01)
    *B01D 47/06*     (2006.01)
    *B01D 50/60*     (2022.01)
    *B01D 53/14*     (2006.01)
    *B01D 53/18*     (2006.01)
    *E03B 3/28*     (2006.01)
    *F01N 3/04*     (2006.01)
    *F23J 15/04*     (2006.01)
    *B01D 45/18*     (2006.01)

(52) U.S. Cl.
    CPC ......... *B01D 46/0087* (2013.01); *B01D 46/12* (2013.01); *B01D 46/4218* (2013.01); *B01D 46/4254* (2013.01); *B01D 46/645* (2022.01); *B01D 47/02* (2013.01); *B01D 47/021* (2013.01); *B01D 47/06* (2013.01); *B01D 50/60* (2022.01); *B01D 53/14* (2013.01); *B01D 53/145* (2013.01); *B01D 53/1475* (2013.01); *B01D 53/18* (2013.01); *E03B 3/28* (2013.01); *F01N 3/04* (2013.01); *F23J 15/04* (2013.01); *B01D 45/18* (2013.01); *B01D 2252/103* (2013.01); *B01D 2252/20* (2013.01); *B01D 2279/30* (2013.01); *B01D 2279/40* (2013.01); *Y02C 20/40* (2020.08)

(56) References Cited

U.S. PATENT DOCUMENTS

| | | | |
|---|---|---|---|
| 2,405,494 A | 8/1946 | Dupuy | |
| 3,075,918 A | 1/1963 | Holm | |
| 3,262,498 A | 7/1966 | Connally, Jr. et al. | |
| 3,282,047 A | 11/1966 | Wertheimer | |
| 3,442,332 A | 5/1969 | Keith | |
| 3,447,287 A | 6/1969 | Andersen | |
| 4,175,933 A * | 11/1979 | James | B01D 50/00 261/106 |
| 4,224,992 A | 9/1980 | Comberiati et al. | |
| 4,390,068 A | 6/1983 | Patton et al. | |
| 4,792,378 A | 12/1988 | Rose et al. | |
| 5,097,814 A | 3/1992 | Smith | |
| 5,106,603 A | 4/1992 | McCord et al. | |
| 5,119,398 A | 6/1992 | Webber, Jr. | |
| 5,147,429 A * | 9/1992 | Bartholomew | B01D 53/74 244/30 |
| 5,449,398 A | 9/1995 | Motoda | |
| 5,888,261 A * | 3/1999 | Fortune | F04D 29/703 55/467 |
| 8,128,742 B1 | 3/2012 | McGuffin | |
| 8,241,408 B2 | 8/2012 | Yi et al. | |
| 8,753,437 B2 | 6/2014 | Yi et al. | |
| 8,764,890 B2 | 7/2014 | Yi et al. | |
| 8,840,806 B2 | 9/2014 | Jeong et al. | |
| 8,852,329 B2 | 10/2014 | Yi et al. | |
| 9,051,586 B2 | 6/2015 | Cha et al. | |
| 9,157,353 B2 | 10/2015 | Hodotsuka et al. | |
| 9,962,711 B2 | 5/2018 | Chen et al. | |
| 9,977,400 B2 | 5/2018 | Yamaguchi et al. | |
| 10,005,085 B2 | 6/2018 | Wright et al. | |
| 10,071,384 B2 | 9/2018 | Kojima et al. | |
| 10,099,225 B2 | 10/2018 | Wennerstrom | |
| 2003/0113239 A1 | 6/2003 | Pahlman et al. | |
| 2004/0074041 A1 | 4/2004 | Overvaag | |
| 2005/0145108 A1 | 7/2005 | Rubin et al. | |
| 2015/0198072 A1 | 7/2015 | Alasmari | |
| 2017/0106333 A1 | 4/2017 | Zhu | |
| 2022/0347619 A1 * | 11/2022 | Salehpoor | B01D 53/18 |

FOREIGN PATENT DOCUMENTS

| | | | | |
|---|---|---|---|---|
| JP | H02115014 A | * | 4/1990 | ............ B01D 46/00 |
| WO | WO-2009084725 A1 | * | 7/2009 | ......... B01D 46/0016 |

OTHER PUBLICATIONS

WO2009084725A1_ENG (WIPO machine translation of Uehara) (Year: 2009).*

JPH02115014A_ENG (Espacenet machine translation of Shimoda) (Year: 1990).*

International Search Report and Written Opinion; International Searching Authority/US dated May 20, 2020; International Application No. PCT/US2020/021169; 9 pages; International Searching Authority/ISA/US, Commissioner For Patents, P.O. Box 1450, Alexandria, VA.

International Preliminary Report on Patentability dated Sep. 23, 2021; International Application No. PCT/US2020/021169; 8 pages; International Bureau of WIPO, 34, chemin des Colombettes, 1211 Geneva 20, Switzerland.

* cited by examiner

POLLUTANT CAPTURER AND MOBILIZER

CROSS-REFERENCE TO RELATED APPLICATION(S)

This application is a divisional of U.S. patent application Ser. No. 16/298,730, filed Mar. 11, 2019, pending, incorporated herein by reference.

BACKGROUND OF THE INVENTION

1. Field of the Invention

The present invention relates to a pollutant capturer and mobilizer for moving a body of polluted gaseous substance from one location towards another location and remove $CO_2$ or other undesired gases, as well as smog, fog, water vapor, any type of airborne pollutants including pollen, fumes, ash, smoke, soot, dust, combustion products, sand, and any other airborne particulate substances from the body of polluted gaseous substance such as air in buildings, atmospheric air, atmospheric air in a building blow-down demolishing site, atmospheric air nearby active volcanoes and wild fires, exhaust from any type of vehicles, as well as exhaust from vehicles' exhaust pipe and chimneys or stacks of buildings, industrial plants, and facilities in an effort to combat negative health, environmental, and economic impacts of pollution on communities.

2. Description of the Prior Art

Atmospheric carbon dioxide, $CO_2$, has been in steady increase because of extensive increase in the use of fossil fuels. Increase in concentration of atmospheric carbon dioxide is known to be a contributor to global warming, climate change and extreme weather conditions, drought, polar ice melt and rise in ocean level which threatens human life on many islands. Review of the prior art indicates public concerns for a need to reduce the amount of the atmospheric $CO_2$. Carbon dioxide has been injected into the geologic oil reservoirs to improve oil production, the improve in oil production is known to be due to lowering the crude oil viscosity and its swell in volume as $CO_2$ is introduced to the crude oil. The reduction of viscosity and swell of crude oil accommodate crude oil movement towards the production wells, thus improving oil production from the oil reservoir. However, the pressure of $CO_2$ has to be increased so it can be injected into the oil reservoir, thus such $CO_2$ injection requires the use of compression devices and therefore the injection process itself is associated with $CO_2$ generation. Even though injection of $CO_2$ into geologic oil reservoirs may be considered as a means of storing $CO_2$, such activity is an option that is available mostly to oil companies and not to other branches of the industry or the individual members of the public communities. Also, air cleaning devices have been suggested for cleaning air from airborne particulates by charging the particulates and remove the charged particulates electrostatically.

U.S. Pat. No. 8,241,408 B2 describes a carbon dioxide capturing device for improving carbon dioxide removal efficiency and use of a dry solid absorbent. The device comprises a carbon dioxide recovery reactor to permit carbon dioxide containing gas externally supplied to be in contact with a dry solid absorbent to capture carbon dioxide; a recovery cyclone connected to the recovery reactor to exhaust carbon dioxide-free gas while separating a solid portion containing carbon dioxide; a fluidized bed type regeneration reactor which receives the solid portion through a solid feeding pipe connected to the recovery cyclone and divides the solid portion into carbon dioxide and the other part containing the dry solid absorbent by using a fluidizing gas fed through a fluidizing gas supply pipe; a regeneration cyclone to exhaust the separated carbon dioxide outside in order to use carbon dioxide in the regeneration reactor; and a water vapor pretreatment device connected to the regeneration reactor to absorb water in the dry solid absorbent and feedback the water containing absorbent to the recovery reactor.

The carbon dioxide capturing device including water vapor pretreatment apparatus, described above, utilizes multiple process equipment and therefore it may produce more carbon dioxide, associated with the function of the apparatus or preparation of the process materials needed for functioning of the apparatus; a carbon dioxide capturing apparatus should capture more carbon dioxide than it produces in order to be a reasonable solution for carbon dioxide capturing.

U.S. Pat. No. 8,753,437 B2 describes a dry carbon dioxide capturing device with improved energy efficiency, which utilizes a difference in temperature between a regeneration operation of isolating carbon dioxide from a sorbent containing carbon dioxide absorbed therein and a pre-treatment operation of allowing water to be adsorbed to carbon dioxide. The dry carbon dioxide capturing device, includes a recovery reactor for recovering carbon dioxide, a recovery cyclone for discharging a gas while separating the carbon dioxide-captured solid sorbent only, a regenerator for receiving the carbon dioxide-captured solid sorbent and separating carbon dioxide captured in the solid sorbent, and a pre-treatment reactor for cooling the solid sorbent free from carbon dioxide, wherein a first heat exchanger is provided between the recovery cyclone and the regenerator to pass the carbon dioxide-captured solid sorbent therethrough, and a second heat exchanger is provided between the pre-treatment reactor and the regenerator to pass the solid sorbent free from carbon dioxide therethrough. The first and second heat exchanger include a first and second heat exchange jacket mounted thereon which are connected to each other in a closed loop state.

The dry carbon dioxide capturing device with improved energy efficiency, described above, utilizes multiple process equipment, including two heat exchangers, and therefore it may produce more carbon dioxide, associated with the function of the apparatus or preparation of the process materials needed for functioning of the apparatus; a carbon dioxide capturing device should capture more carbon dioxide than it produces in order to be a reasonable solution for carbon dioxide capturing.

U.S. Pat. No. 8,764,890 B2 describes a dry carbon dioxide capturing device using multi sorbents so as to maintain the sorption rate for exhaust gas containing carbon dioxide. The dry carbon dioxide capturing device comprises at least two dry carbon dioxide capturing parts comprising: a first and second recovery reactors and to recover carbon dioxide by contacting a solid sorbent with exhaust gas; a first and second recovery cyclones and connected to the recovery reactors; a first and second regenerators and connected to the recovery cyclones; and a first and second pre-treatment reactors connected to the regenerators through sorbent supply lines. The first and second dry carbon dioxide capturing parts are connected to each other so as to feed an isolated gas, which is separated with the solid sorbent in the first recovery cyclone of the first dry carbon dioxide capturing part, to the second dry carbon dioxide capturing part through the exhaust gas supply line, and different solid sorbents are used in the first and second carbon dioxide capturing parts.

The dry carbon dioxide capturing device using multi sorbents, described above, utilizes multiple process equipment and therefore it may produce more carbon dioxide, associated with the function of the device or preparation of the process materials needed for functioning of the device; a carbon dioxide capturing device should capture more carbon dioxide than it produces in order to be a reasonable solution for carbon dioxide capturing.

U.S. Pat. No. 8,840,806 B2 describes an absorbent for capturing carbon dioxide. The absorbent may include an amino acid with multiple amine groups and an alkali-metal hydroxide mixed with the amino acid and thus, may increase an absorption capacity for carbon dioxide. When a sterically hindered effect is induced to the amino acid with multiple amine groups, the absorption capacity for carbon dioxide may increase and heat of absorption reaction may decrease and thus, energy consumed for regeneration of an absorbent may be reduced. The absorbent for capturing carbon dioxide may include amino acid with multiple amine groups and the metal hydroxide, and may provide a functional group around the amine groups to cause an sterically hindered effect and thus, the absorption capacity for carbon dioxide and an carbon dioxide absorption rate may increase, and the capital cost for a carbon dioxide capturing process and an operating cost may be significantly reduced.

The absorbent for capturing carbon dioxide including amino acid having multi amine groups and metal hydroxide, described above, proposes a sorbent for capturing carbon dioxide; it does not propose a device or apparatus for capturing carbon dioxide. However, for any manufactured substance to be used as a reasonable carbon dioxide absorbent, it should be capable of capturing more carbon dioxide than that produced during manufacturing or using processes of the absorbent.

U.S. Pat. No. 8,852,329 B2 describes a dry carbon dioxide capturing device with multistage supply structure which can improve sorption efficiency by supplying sorbent for absorbing carbon dioxide or exhaust gas containing carbon dioxide to a recovery reactor in multistages at various heights. The dry carbon dioxide capturing device with multistage supply structure comprises a recovery reactor to recover carbon dioxide by contacting a solid sorbent with exhaust gas; a recovery cyclone connected to the recovery reactor to discharge a gas while separating the carbon dioxide-captured solid sorbent only; a regenerator connected to the recovery cyclone to receive the carbon dioxide-captured solid sorbent and separate carbon dioxide captured in the solid sorbent; and a pre-treatment reactor connected to the regenerator for cooling the solid sorbent free from carbon dioxide, wherein at least one of the exhaust gas supply line and the sorbent supply line has two or more arranged according to the height of the recovery reactor.

The dry carbon dioxide capturing device with multistage supply structure, described above, utilizes multiple process equipment and therefore it may produce more carbon dioxide, associated with the function of the device or preparation of the process materials needed for functioning of the device; a carbon dioxide capturing device should be capable of capturing more carbon dioxide than that produced during all stages of building the device, manufacturing substances that are utilized by the device, and functioning of the device in order for the device to be a reasonable solution for carbon dioxide capturing.

U.S. Pat. No. 9,051,586 B2 describes a method for converting and producing carbonate minerals from carbon dioxide using recombinant biocatalyst related to a technique for capturing carbon dioxide and converting the carbon dioxide to carbonate minerals using a recombinant whole cell biocatalyst expressing carbonic anhydrase. More particularly, the proposed invention relates to a composition for capturing carbon dioxide and a method for capturing carbon dioxide using the composition, which composition comprises a whole cell of a transformant formed with a vector including a nucleic acid encoding a recombinant carbonic anhydrase; a cell lysate or its fraction of the whole cell; or a recombinant carbonic anhydrase isolated from the whole cell. Further, the proposed invention relates to a composition and method for converting the carbon dioxide to carbonate minerals using the carbon dioxide capturing composition.

The method for converting and producing carbonate minerals from carbon dioxide using recombinant biocatalyst, described above, proposes a method for converting and producing carbonate minerals from carbon dioxide; it does not propose a device or apparatus for capturing carbon dioxide. However, for any method to be used for capturing carbon dioxide, the method should be capable of capturing more carbon dioxide than that produced because of preparation for implementation of the method and the implementation process itself.

U.S. Pat. No. 9,157,353 B2 describes a carbon dioxide capturing system and method of operating same. In one embodiment, a carbon dioxide capturing system includes an absorption tower to bring a gas containing carbon dioxide into contact with an absorbing liquid to discharge the absorbing liquid which has absorbed the carbon dioxide and discharge the gas whose carbon dioxide concentration is reduced. The system includes a regeneration tower to release the carbon dioxide from the absorbing liquid to discharge the absorbing liquid whose carbon dioxide concentration is reduced and discharge a gas containing the carbon dioxide. The system includes a first absorbing liquid component washing apparatus to cool the gas which is discharged from the absorption or regeneration tower and has passed through an absorption or regeneration tower condenser to condense or sublime an absorbing liquid component in the gas and remove a liquid or solid product generated by the condensation or sublimation of the absorbing liquid component by using a washing liquid.

The carbon dioxide capturing system and method of operating same, described above, utilizes multiple process equipment and therefore it may produce more carbon dioxide, associated with the function of the system or preparation of the process materials needed for functioning of the system or method; a carbon dioxide capturing system or method should be capable of capturing more carbon dioxide than that produced during all stages of functioning the system or preparing materials that are utilized by the system in order for using the system or implementing the method to be a reasonable solution for carbon dioxide capturing.

U.S. Pat. No. 3,075,918 discloses secondary recovery of petroleum related to the recovery of oil from petroleum-bearing geological reservoirs and to an improvement over the conventional type of gas-injection recovery method. More specifically, this process is concerned with an improved method of producing a fluid for injection into petroleum-bearing reservoirs. The process utilizes a variety of process equipment such as flash drum, absorber, and multiple heat exchangers.

The secondary recovery of petroleum, described above, indicates that the use of carbon dioxide for injection into geological reservoirs or absorption of carbon dioxide by hydrocarbons have been discussed in the past, however, only as a means of improving oil recovery from geologic hydrocarbon reservoirs and with no considerations regarding achieving a net carbon dioxide reduction as a result of preparing the injection fluid or the injection process itself. A method for preparing an injection fluid for improving oil recovery from geologic hydrocarbon reservoirs or the injection process itself can be considered as reasonable solutions for carbon dioxide capturing if they result in capturing more carbon dioxide than that produced because of the preparation of the injection fluid or the injection process itself.

U.S. Pat. No. 3,262,498 discloses a secondary recovery of oil from a subterranean formation and describes a method of recovering oil in which the flood efficiency is improved by injecting carbon dioxide into the oil reservoir and with the reservoir having at least one injection well and one production well that are spaced apart.

The secondary recovery of oil from a subterranean formation, described above, indicates that the use of carbon dioxide for injection into geological reservoirs has been discussed in the past, however, only as a means of improving oil recovery from geologic hydrocarbon reservoirs and with no considerations regarding achieving a net carbon dioxide reduction as a result of the injection process itself. A method for injecting carbon dioxide into geologic hydrocarbon reservoirs can be considered as reasonable solutions for carbon dioxide capturing if it results in capturing more carbon dioxide than that produced because of the injection process itself.

U.S. Pat. No. 3,442,332 discloses combination methods involving the making of gaseous carbon dioxide and its use in crude oil recovery and describes a method in which pure gaseous carbon dioxide is injected into an underground formation containing crude oil; carbon dioxide dissolves in the oil and reduces its viscosity. The low viscosity solution is withdrawn from the formation and $CO_2$ is separated for reinjection into the formation again.

The combination methods involving the making of gaseous carbon dioxide and its use in crude oil recovery, described above, indicates that the use of carbon dioxide for injection into geological hydrocarbon reservoirs or absorption of carbon dioxide by hydrocarbons and the reduction of the viscosity of the hydrocarbon oil as a result of absorbing carbon dioxide have been discussed in the past, however, only as a means of improving oil recovery from geologic hydrocarbon reservoirs and with no considerations regarding achieving a net carbon dioxide reduction associate with the injection process itself. A method for injecting carbon dioxide into geologic hydrocarbon reservoirs for improving oil recovery from the reservoirs can be considered as a reasonable solution for carbon dioxide capturing if it can result in capturing more carbon dioxide than that produced because of all aspects associated with the injection process itself.

U.S. Pat. No. 4,224,992 discloses a method for enhanced oil recovery that is directed to an improved method for enhanced recovery of oil from relatively "cold" reservoirs by carbon dioxide flooding. In oil reservoirs at a temperature less than the critical temperature of 87.7° F. and at a pore pressure greater than the saturation pressure of carbon dioxide at the temperature of the reservoir, the carbon dioxide remains in the liquid state which does not satisfactorily mix with the oil. However, applicants have found that carbon dioxide can be vaporized in situ in the reservoir by selectively reducing the pore pressure in the reservoir to a value less than the particular saturated vapor pressure so as to greatly enhance the mixing of the carbon dioxide with the oil.

The method for enhanced oil recovery, described above, indicates that the use of carbon dioxide for injection into geological hydrocarbon reservoirs for improving oil recovery or mixing carbon dioxide with oil have been discussed in the past, however, only as a means of improving oil recovery from geologic hydrocarbon reservoirs and with no considerations regarding achieving a net carbon dioxide reduction associate with all aspects of the process of injecting carbon dioxide into the oil reservoirs. A method for injecting carbon dioxide into geologic hydrocarbon reservoirs for improving oil recovery from the reservoirs can be considered as a reasonable solution for carbon dioxide capturing if it can result in capturing more carbon dioxide than that produced because of all aspects associated with the injection process itself.

U.S. Pat. No. 4,390,068 discloses a carbon dioxide stimulated oil recovery process utilizing carbon dioxide in the liquid state. The carbon dioxide is introduced into an underground formation where it partially dissolves in the crude oil present therein. A back pressure in the range of atmospheric to approximately 300 psi is maintained on the formation while the oil containing carbon dioxide is withdrawn. The carbon dioxide is thereafter separated from the oil.

The carbon dioxide stimulated oil recovery process, described above, indicates that the use of carbon dioxide for injection into geological hydrocarbon reservoirs for improving oil recovery or dissolution of carbon dioxide in the crude oil have been discussed in the past, however, only as means of improving oil recovery from geologic hydrocarbon reservoirs and with no considerations regarding achieving a net carbon dioxide reduction associate with all aspects of the process of injecting carbon dioxide into the oil reservoirs. A method for injecting carbon dioxide into geologic hydrocarbon reservoirs for improving oil recovery from the reservoirs can be considered as a reasonable solution for carbon dioxide capturing if it can result in capturing more carbon dioxide than that produced because of all aspects associated with the injection process itself.

U.S. Pat. No. 9,962,711 B2 discloses an electrostatic air cleaner comprising a main body, a corona discharged module, a collector module and a fan. The main body has an airflow passage for disposing the corona discharged module, the collector module and the fan. The fan is used for drawing an air stream into the airflow passage. The corona discharged module is used for discharging particles in the air stream. The charged particles are then captured by the collector module.

The electrostatic air cleaner, described above, utilizes multiple electrical components, and therefore, it requires use of significant amount of electricity. Thus, the function of each of its electrical components contributes to increasing level of carbon dioxide in atmosphere since a large portion of electric power is still generated by burning fossil fuels. Therefore, even though the electrostatic air cleaner might be capable to clean air from particulates to some extent, its operation is still associated with polluting the atmospheric air with carbon dioxide.

U.S. Pat. No. 9,977,400 B2 discloses an exhaust air cleaning apparatus and image forming apparatus which includes a cleaning duct for cleaning air to be exhausted from an exhaust port of an image forming apparatus. In the cleaning duct, a fan and a filter are provided between an inflow part connected with the exhaust port of the image forming apparatus and a discharge port for discharging air from the inside of the cleaning duct. The exhaust air cleaning apparatus further includes a pressure adjusting part for adjusting the pressure in the cleaning duct. The pressure adjusting part performs pressure adjustment so that the pressure at a pressure adjusting position located between the inflow part and the fan in the cleaning duct falls within an appropriate pressure range determined in advance to be equal to or less than atmospheric pressure.

The exhaust air cleaning apparatus and image forming apparatus, described above, is intended for use with an image forming apparatus such as a copier, a printer, or a facsimile machine that generates various by-products during image formation; such apparatus is not capable of removing particulate polluting substances from atmospheric air or from a conduit that carries combustion products. The apparatus is not also capable of removing carbon dioxide from the atmospheric air or the combustion products.

U.S. Pat. No. 10,005,085 B2 discloses an ion filtration air cleaner and describes a method for filtering air that includes: passing air through a prefilter disposed in a housing to remove at least a portion of particulates suspended in the air to thereby create prefiltered air; passing the prefiltered air by an ionizer disposed in the housing to ionize at least a portion of the particulates suspended in the air to thereby create ionized particulates in the prefiltered air, the ionizer downstream from the prefilter and upstream from the fan positioned to create an airflow within the housing; and prior to the prefiltered air exiting the housing with ionized particulates, causing the ionized particulates to pass through an electrostatically charged main filter disposed within the housing downstream from each of the ionizer and the fan.

The ion filtration air cleaner, described above, utilizes multiple electrical components therefore it requires use of significant amount of electricity to function, thus function of each of its electrical components contributes to increasing level of carbon dioxide in atmosphere since a large portion of electric power is still generated by burning fossil fuels. Therefore, even though the ion filtration air cleaner might be capable to clean air from particulates to some extent, its operation is still associated with polluting the atmospheric air with carbon dioxide.

U.S. Pat. No. 10,071,384 B2 discloses a dust collector, dust collection system, and dust collection method that can enhance dust-collecting efficiency while reducing the volume of the dust collector as a whole. A dust collector is provided with a casing having an inlet into which gas is introduced; a discharge electrode to which voltage is applied, the discharge electrode being disposed inside the casing and having a spike called discharge spike and mounting frames for supporting the discharge spike; and a collecting electrode having a planar member, disposed inside the casing facing the discharge electrode, the mounting frames being inclined with relation to the gas flow at the inlet. Two mounting frames are connected to each other on the downstream side of the gas flow, and are arranged so that, between the two mounting frames, the upstream side of the gas flow is wider than the downstream side of the gas flow.

The dust collector, dust collection system, and dust collection method, described above, utilizes multiple electrical components therefore it requires use of significant amount of electricity to function, thus function of each of its electrical components contributes to increasing level of carbon dioxide in atmosphere because a large portion of electric power is still generated by burning fossil fuels. Therefore, even though the dust collector, dust collection system, and dust collection method might be capable to clean air from particulates to some extent, its operation requires the use of spraying water and is still associated with polluting the atmospheric air with significant amount of carbon dioxide.

U.S. Pat. No. 10,099,225 B2 discloses an air cleaning device for separating airborne particles from a flow of air. The air cleaning device comprises a separating unit and an ionizing unit arranged to charge airborne particles present in the flow of air and transmit at least a major part of the charged particles towards the separating unit. The ionizing unit comprises at least one collector electrode and at least one emitter electrode. The separating unit is arranged to attract at least some of the charged particles so as to separate them from the flow of air. Further, at least one collector electrode is shaped so as to conduct at least a portion of the flow of air and has a spherically curved inner surface and the emitter electrode is centered with respect to the spherically curved inner surface of the collector electrode.

The air cleaning device, described above, utilizes multiple electrical components such as ionizing unit equipped with collector electrode and emitter electrode, and a separating unit. The separating unit attracts the charged particles and separates them from the flow of air. Therefore, even though the air cleaning device might capture charged particulates to some extent, its use is associated with a significant amount of electricity and thus the function of the air cleaning device contributes to increasing the level of atmospheric carbon dioxide since a large portion of electric power is still generated by burning fossil fuels.

Examination of the prior art reviles methods and devices that have been proposed for cleaning air from airborne particulates, capturing $CO_2$ and injection of $CO_2$ in geological crude oil formations for improving oil production from the formations. However, all of these methods and devices have one or multiple deficiencies with regards to utilizing fans or other compression equipment thus producing $CO_2$ associated with implementation of the process itself, having potential for both small scale and large scale applications, utilizing simple process or equipment or design or methodology, capability of capturing a diverse types of polluting substances, the amount of electrical or mechanical or thermal energy required for the device to function, capability to capture $CO_2$ from a variety of sources such as $CO_2$ in combustion products that flows in a chimney or stack or vehicle's exhaust pipe, $CO_2$ produced within buildings or plants or facilities as well as capturing the atmospheric $CO_2$, capability to be incorporated in existing buildings or plants or facilities with minimum required remedial work or changes in the design of the existing buildings or plants or facilities, and capability of capturing particulate polluting substances as well as $CO_2$ and other gaseous polluting substances from a body of polluted gaseous substance. Also, the methods and devices that are reviled in the prior art do not offer a possibility for individual members of the public communities to contribute to the capturing or storing activities with regards to the $CO_2$ and thus it is unlikely that such methods or devices can lead to achieving positive results in capturing or storing $CO_2$ with no net reduction of $CO_2$ in the process. Therefore, there is need for a pollutant capturer and mobilizer to address all of the above existing shortcomings which are associated with the methods and devices that are discussed in the prior art and provide a pollutant capturer and mobilizer that can capture a diverse types of polluting substances from a body of polluted gaseous substance in an effort to combat negative health, environmental, and economic impacts of pollution on communities.

SUMMARY OF THE INVENTION

The present invention is a pollutant capturer and mobilizer for small and large scale moving a body of polluted gaseous substance from one location towards another location and capture pollutants such as pollen, fumes, ash, smoke, fog, water vapor, smog, $CO_2$, airborne soot, combustion products, sand, dust, or any other desired substance or airborne particulates from the body of polluted gaseous substance such as air in residential and industrial buildings, atmospheric air, atmospheric air in a building blow down demolishing site, atmospheric air nearby active volcanoes and wild fires, exhaust from any type of land, sea, or air vehicles, as well as exhaust from chimneys of buildings, industrial plants, and facilities.

A pollutant capturing component is used to capture desired pollutants from the body of the polluted gaseous substance. Different pollutant capturing components may be used; each can capture one or more type of airborne pollutants from the body of polluted gaseous substance.

A dry embodiment of the pollutant capturer and mobilizer uses a dry pollutant capturing component to capture desired particulate pollutants from a body of polluted gaseous substance.

A wet embodiment of the pollutant capturer and mobilizer uses a liquid pollutant capturing component to capture desired airborne polluting substances from a body of polluted gaseous substance. A liquid pollutant capturing component can capture airborne pollutants of the body of polluted gaseous substance by means of dissolving, or by means of absorbing, or by means of formation of a solid substance, or by means of denaturing, or by means of consuming, or by means of physical deposition, or by means of altering the chemical properties, or by a combination of some or all of the above said means.

To capture a targeted type of pollutant from a body of polluted gaseous substance, the body of the polluted gaseous substance is brought in physical contact with a desired pollutant capturing component, resulting in the capture of the polluting substances of the body of the polluted gaseous substance by the pollutant capturing component.

Any type of fabric, or spongy, or porous, or air filtering substance, or fibrous substance, or any combination of the substances, can be used as the dry pollutant capturing component as long as they can remove particulate pollutants from a body of polluted gaseous substance as the body of pollutant gaseous substance flows over or through the dry pollutant capturing component.

Water, any type of produced crude oil, any type of naturally occurring or synthetic oil, and any type of chemical solution can be used as the liquid pollutant capturing component as long as they can remove at least one type of polluting substance from a body of polluted gaseous substance as the latter is brought in physical contact with the body of liquid pollutant capturing component. Any type of odor removing substances can be used with the liquid pollutant capturing components, if desired, to neutralize the odor of the liquid pollutant capturing component.

A dry embodiment of the pollutant capturer and mobilizer can be mounted on the ground or on a concrete foundation or on a stationary or mobile platform, or on chimneys or stacks of plants and facilities, or at any desired spot on any type of land, air, and sea vehicles.

A wet embodiment of the pollutant capturer and mobilizer can be mounted on the ground or on a concrete foundation or on a stationary or mobile platform, or on chimneys or stacks of plants and facilities, or at any desired spot on any type of land, air, and sea vehicles.

The body of the polluted gaseous substance may flow into the pollutant capturer and mobilizer by virtue of its own speed or energy, or by virtue of using flow establishing devices, or by virtue of mounting the pollutant capturer and mobilizer on any type of land, sea, and air vehicles that can move within the body of the polluted gaseous substance.

It is therefore a primary object of the present invention to provide a pollutant capturer and mobilizer for small and large scale capturing of polluting substances such as pollen, fumes, ash, smog, fog, smoke, $CO_2$, airborne soot, combustion products, sand, and dust particulates, or any other desired substance or airborne particulates from a body of polluted gaseous substance such as air in residential and industrial buildings, atmospheric air, atmospheric air in a building blow down demolishing site, atmospheric air nearby active volcanoes and wild fires, exhaust from chimneys or stacks of buildings, facilities and industrial plants, as well as exhaust from any type of land, sea, or air vehicles.

It is another object of the present invention to provide a pollutant capturer and mobilizer to utilizes one or more types of dry or liquid pollutant capturing components that are made from fabrics, natural or synthetic air filtering substances, natural or synthetic spongy or fibrous substances, or water, or any type of produced crude oil, or any type of naturally occurring or synthetic oil, or other types of chemical solutions to remove carbon dioxide or other desired gases or airborne particulate substances from a body of polluted gaseous substance with no or minimum carbon dioxide or other polluting substances produced because of the preparation and processing of the required liquid pollutant capturing component or the process of capturing the pollutant substances from the body of polluted gaseous substance by the pollutant capturer and mobilizer.

It is a further object of the present invention to provide a pollutant capturer and mobilizer in which a body of polluted gaseous substance is brought in physical contact with one or more types of pollutant capturing components and with the body of polluted gaseous substance flowing into the pollutant capturer and mobilizer either by its own speed and energy or by virtue of the use of flow establishing devices, to minimize energy required for the functioning of the pollutant capturer and mobilizer and produce minimum carbon dioxide during the process of capturing pollutants from the body of polluted gaseous substance.

It is still another object of the present invention to provide a pollutant capturer and mobilizer that can be used as a mobile or stationary unit; can be mounted on the ground, rooftops, desired structures, and chimneys or stacks of buildings, facilities, industrial plants; can be mounted on exhaust pipe of cars, busses, trains, ships, or airplanes; or can be mounted at a desired point on cars, busses, trains, ships, airplanes, motorcycles, bicycles, tricycles, scooters, boats, yacht, or any other type of land, sea, or air vehicle to capture polluting substances from a body of polluted gaseous substance with no or minimum electric power required for the process of capturing the polluting substances.

It is still a further object of the present invention to provide a pollutant capturer and mobilizer which is equipped with all mechanical, electrical, and instrumentation components and devices that allows safe and reliable operation of the pollutant capturer and mobilizer, convenient replacement or replenishment of the pollutant capturing component(s), and convenient removal of the captured polluting substances from the device, as desired.

It is yet another object of the present invention to provide a pollutant capturer and mobilizer that divides a body of polluted gaseous substance into many small polluted gaseous bodies as well as utilizing a path extender, for flow of the body of polluted gaseous substance through the liquid pollutant capturing component, to accommodate capturing the polluting substances of the small polluted gaseous bodies more effectively.

It is yet a further object of the present invention to provide a pollutant capturer and mobilizer that can move and mobilize an atmospheric body of polluted gaseous substance, that contains water vapor, from one location towards another location thus reduce rainfall at one location and therefore prevent flooding at the location, or initiate rainfall at another location and thus prevent drought at that location, or accelerate or decelerate the movement of an atmospheric body of polluted gaseous substance to control the amount of rainfall at desired locations, or move an atmospheric body of polluted gaseous substance from one or multiple locations towards one or multiple other locations to disrupt a hurricane or formation of a hurricane, or disrupt a tornado or formation of a tornado, or disrupt heat and cold waves or formation of heat and cold waves.

DETAILED DESCRIPTION OF THE INVENTION

1. Definitions

Figure 1:
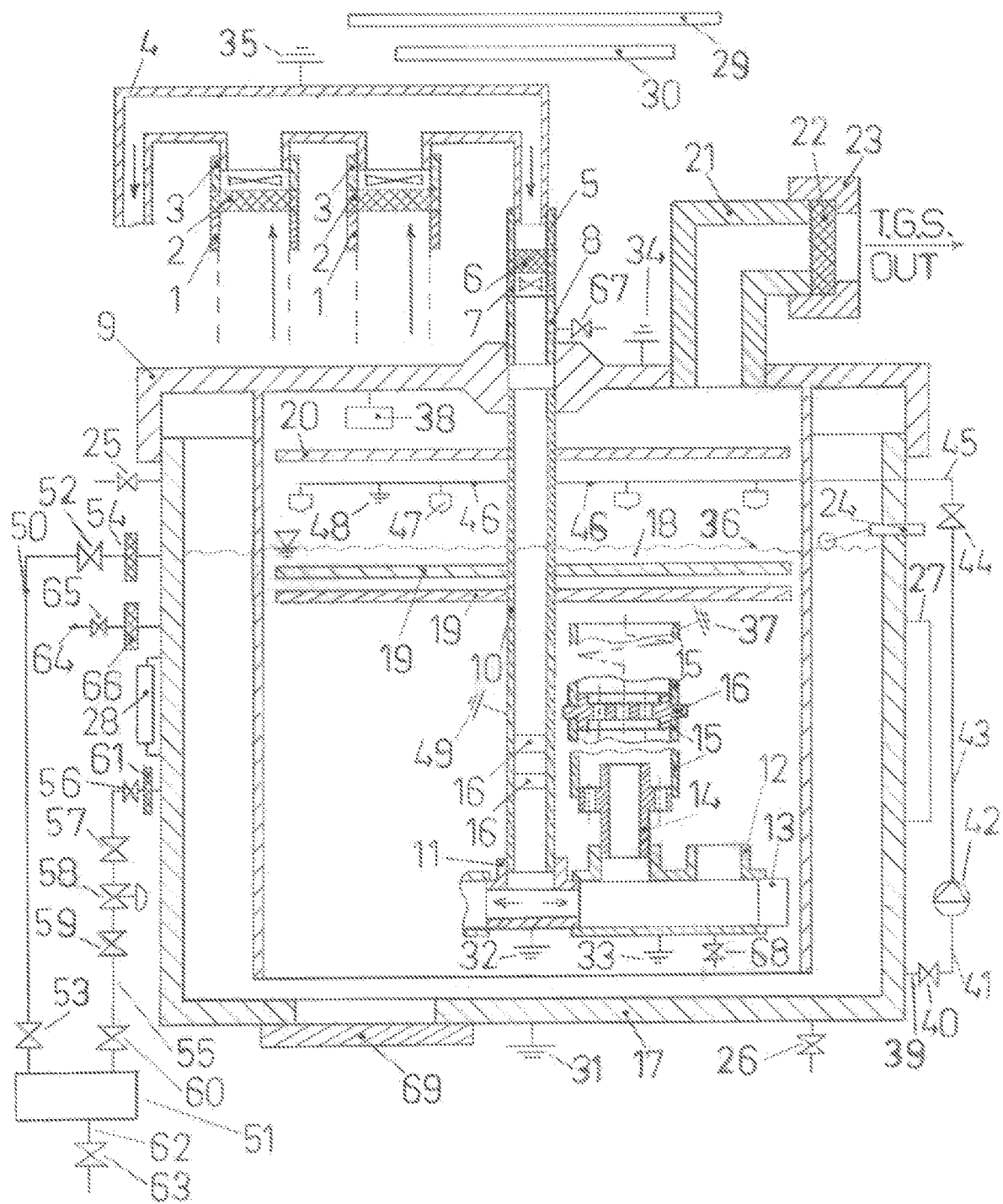
FIG. 1 is a schematic of the wet embodiment of the pollutant capturer and mobilizer that can be used to capture pollutants from a body of polluted gaseous substance or mobilize an atmospheric body of polluted gaseous substance from one location towards another location.

Pollutant or polluting substance as used herein shall mean any type of airborne gas or water vapor or moisture or particulate substance such as pollen, fumes, fog, smog, ash, soot, dust, sand, smoke, combustion products, carbon dioxide, any other gases or airborne particulate substances, or extreme thermal energy that is contained in a body of air or gaseous substance and can have undesired impact on the environment or surroundings or human health.

Polluted gaseous substance as used herein shall mean a gaseous substance that contains one or multiple types of polluting substances.

Pollutant Capturing Component (or P.C.C.) as used herein shall mean any type of manufactured, or synthetic, or naturally occurring substance, or any combination of the above said substances, that can capture and thus remove at least one type of polluting substances from a body of polluted gaseous substance by means of dissolving, or by means of absorbing, or by means of formation of a solid substance, or by means of denaturing, or by means of consuming, or by means of physical deposition, or by means of altering the chemical properties, or by a combination of some or all of the above said means, as the body of polluted gaseous substance is brought in physical contact with the pollutant capturing component. Pollutant capturing components may be in any form of solid, liquid, gas, or vapor.

P.G.S. as used herein shall mean polluted gaseous substance.

T.G.S. as used herein shall mean treated gaseous substance; a gaseous substance exiting a pollutant capturer and mobilizer after one or more types of its polluting substances being captured by the pollutant capturer and mobilizer.

Flow establishing device as used herein shall mean a device that can increase elevation of a body of a liquid or gas or vapor or make the body flow with the same or increased pressure. Pumps, fans, blowers, and compressors are some examples of flow establishing devices; the flow establishing device can be driven by any type of electric motors or gas turbine or any other types of internal combustion engines.

Flow establishing device box as used herein shall mean a compartment that contains one or multiple flow establishing devices, with the flow establishing devices mounted on the compartment in parallel or in series or in a combination of both series and parallel.

Produced crude oil as used herein shall mean any type of light or heavy crude oil that has been produced from a geological fossil fuel oil formation or reservoir and is readily available anywhere outside of the fossil fuel oil formation or reservoir, or above the ground for use as desired.

Vehicle as used herein shall mean any type of device that is used for transporting people or equipment or cargo, or any combination of the above, on the ground or on water or in air, and with the device being driven manually or by the use of any type of internal combustion engines. Cars, buses, trucks, trains, airplanes, helicopters, boats, yachts, ships, barges, motorcycles, bicycles, tricycles, strollers, and scooters are some examples of vehicles.

Oil reserve as used herein shall mean any type of oil that is kept in tanks or containers for use at a later time for any application, as desired.

2. Best Mode of the Invention

Figure 2:
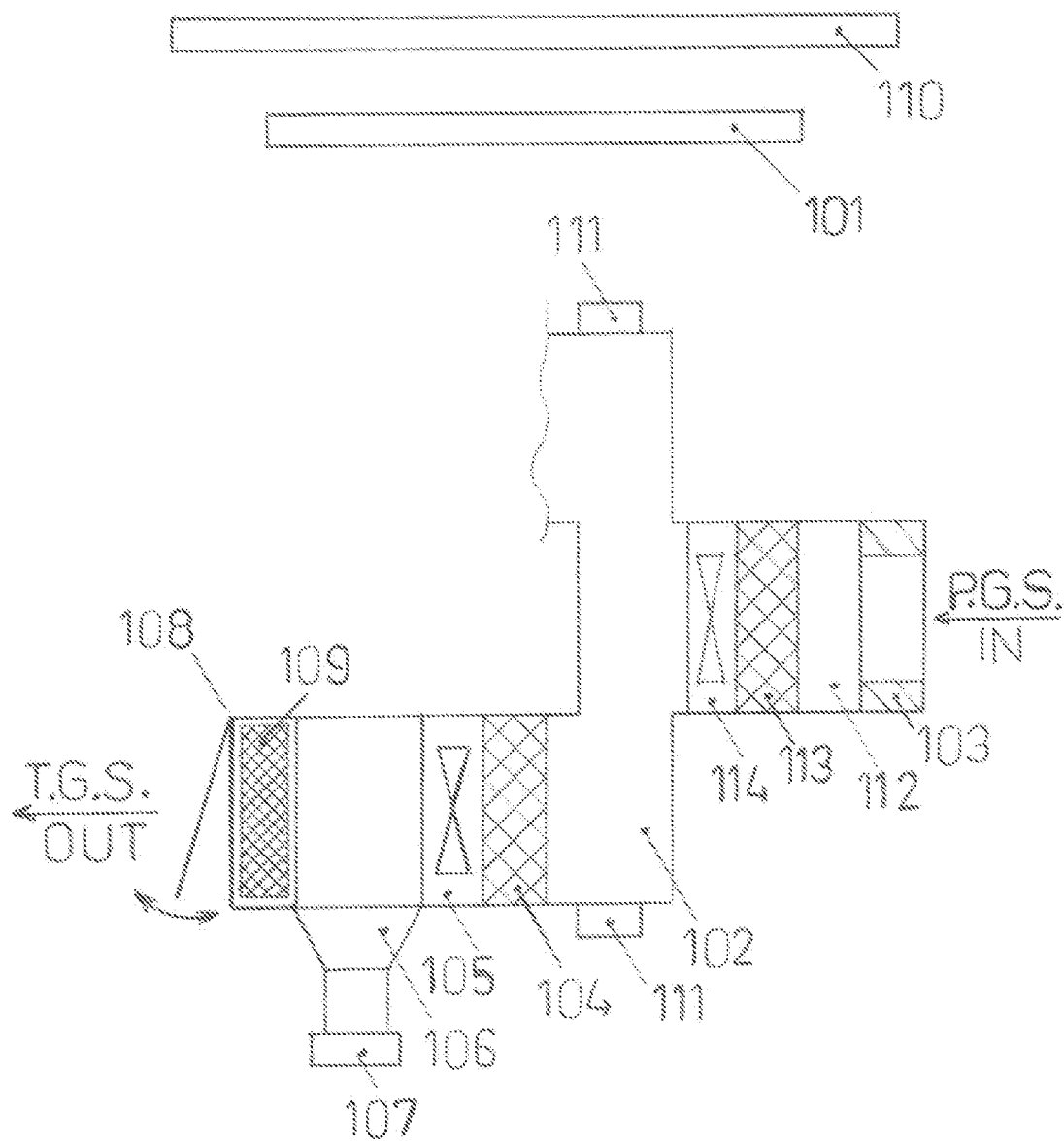
FIG. 2 is a schematic of the dry embodiment of the pollutant capturer and mobilizer that can be used to capture particulate pollutants from a body of polluted gaseous substance or mobilize an atmospheric body of polluted gaseous substance from one location towards another location.

FIG. 1 shows the best mode of the wet embodiment of the pollutant capturer and mobilizer. FIG. 2 shows the best mode of the dry embodiment of the pollutant capturer and mobilizer.

3. General Description of the Wet Embodiment of the Invention

Referring to FIG. 1, the wet embodiment of the pollutant capturer and mobilizer utilizes one or multiple primary supply connectors 1, one or multiple primary screen boxes 2, one or multiple primary flow establishing device boxes 3, the primary distributor 4, one or multiple inlet connectors 5, one or multiple secondary screen boxes 6, one or multiple secondary flow establishing device boxes 7, one or multiple adaptors 8, one or multiple P.C.C. container caps 9, one or multiple risers 10, one or multiple secondary distributors 11, one or multiple branches 12, one or multiple plugs 13, one or multiple branch connectors 14, one or multiple path extenders 15, one or multiple perforated disks 16, one or multiple P.C.C. containers 17, one or multiple bodies of the P.C.C. 18, one or multiple gas dividers 19, one or multiple splash shields 20, one or multiple P.C.C. container exit ports 21, one or multiple P.C.C. shields 22, one or multiple P.C.C. shield retainers 23, one or multiple float valves 24, one or multiple fill up valves 25, one or multiple P.C.C. container drain network 26, one or multiple fins or arrays of fins 27, one or multiple sight glasses 28, one or multiple base structures 29, one or multiple rain shields 30, one or multiple P.C.C. container supports 31, one or multiple secondary distributor supports 32, one or multiple branch supports 33, one or multiple cap supports 34, one or multiple primary distributor supports 35, one or multiple P.C.C. surfaces 36, one or multiple path extender supports 37, one or multiple odor removal substance containers 38, one or multiple P.C.C. outlet network 39, one or multiple P.C.C. pump inlet valves 40, one or multiple P.C.C. pump inlet network 41, one or multiple P.C.C. pumps 42, one or multiple P.C.C. pump outlet network 43, one or multiple P.C.C. pump outlet valves 44, one or multiple P.C.C. inlet network 45, one or multiple spray network 46, one or multiple spray nozzles 47, one or multiple spray network supports 48, one or multiple riser support 49, an overflow network 50, one or multiple liquid storage containers 51, an overflow network isolating valve 52, a liquid storage container overflow isolating valve 53, an overflow network filtering box 54, a drain network 55, a drain network isolating valve 56, an upstream isolating valve 57, a pressure relief valve 58, a downstream isolating valve 59, a storage container drain isolating valve 60, a drain network filtering box 61, a liquid storage container drain network 62, a liquid storage container drain valve 63, a spare network 64, a spare network valve 65, a spare network filtering box 66, one or multiple maintenance fill up network 67, multiple maintenance drain network 68, and one or multiple maintenance window covers 69 to mobilize an atmospheric body of polluted gaseous substance from one location towards another location, or accelerate or decelerate the movement of an atmospheric body of polluted gaseous substance, or capture one or multiple types of polluting substances from a body of polluted gaseous substance, and thus combat the negative health, environmental, and economic impacts of the body of polluted gaseous substance on communities. The order of arrangement of components might be different from what is shown in FIG. 1. Some of the wet embodiment of the pollutant capturer and mobilizer may include fewer components than those shown in FIG. 1, as desired.

Referring to FIG. 1, as a body of polluted gaseous substance enters and flows within different components of the wet embodiment of pollutant capturer and mobilizer, it exits the embodiment with one or multiple types of its polluting substances being captured by the wet embodiment of pollutant capturer and mobilizer.

Referring to FIG. 1, the primary supply connector 1 is a flow passage that connects two components of the wet embodiment of the pollutant capturer and mobilizer together, or is connected to one component of the wet embodiment of the pollutant capturer and mobilizer at one end but is open to an atmospheric body of polluted gaseous substance at its other end, or connects any component of the wet embodiment of the pollutant capturer and mobilizer to an existing polluted gaseous substance producing plant or vehicle, as desired. FIG. 1 show the primary supply connector 1 connected to a primary screen box 2 at one of its ends. Two primary supply connectors 1 are shown in FIG. 1; any other desired number of primary supply connectors may be used as desired.

Referring to FIG. 1, when the primary supply connector 1 has one of its ends connected to one component of the wet embodiment of the pollutant capturer and mobilizer and its other end is open to an atmospheric body of polluted gaseous substance, then the end that opens to the atmospheric body of polluted gaseous substance can be much larger than the end that is connected to another component of the wet embodiment of the pollutant capturer and mobilizer and with the cross sectional area of the primary supply connector 1 gradually decreasing from its larger end towards its smaller end. A variable cross sectional area accelerates the atmospheric body of polluted gaseous substance as it flows from the larger end towards the smaller end of the primary supply connector 1, thus the accelerated atmospheric body of polluted gaseous substance can enter into the liquid P.C.C. 18 on its own with no need to using any flow establishing device box. Additionally, the primary supply connector 1 can have one or multiple arrays of flappers mounted on its larger cross sectional area. Each flapper can rotate about a pin only in one direction, thus flappers serve as check valves and allow the atmospheric body of polluted gaseous substance to only enter the primary supply connector 1 through its larger cross sectional area; upon passing through the flappers and entering the primary supply connector 1 through its larger cross-sectional area, the atmospheric body of polluted gaseous substance will then have to accelerate within the primary supply connector 1 as it flows from the larger cross sectional area towards the smaller cross sectional area. The flappers and their associated pins are not shown in FIG. 1.

Referring to FIG. 1, the primary screen box 2 is a flow passage and contains one or more screen layers to prevent birds and other undesired objects to enter the internal space of the pollutant capturer and mobilizer. The screen layers may have identical or different mesh or grid sizes. The primary screen box 2 is used in only some applications of the wet embodiment of the pollutant capturer and mobilizer. Two primary screen boxes 2 are shown in FIG. 1; any other desired number of primary screen boxes may be used either in parallel or in series, or a combination of both in parallel and in series as desired.

Referring to FIG. 1, the primary flow establishing device box 3 forces a body of polluted gaseous substance into the primary distributor 4. The primary flow establishing device box 3 may house one or multiple flow establishing devices in parallel, i.e. side by side. One flow establishing device is shown in each of the single primary flow establishing device boxes 3 that is shown in FIG. 1; any other desired number of flow-establishing devices may be used, in parallel, in a single primary flow establishing device box 3. Any desired number of primary flow-establishing device boxes 3 may be used in the wet embodiment of the pollutant capturer and mobilizer either in parallel or in series as desired.

Referring to FIG. 1, the primary distributor 4 is a flow passage that might have one or multiple inlet ports and one or multiple exit ports; each exit port directs the body of the polluted gaseous substance towards other components of the wet embodiment of the pollutant capturer and mobilizer for further processing and removal of the polluting substances of the body of polluted gaseous substance. A primary distributor 4 with two inlet ports and two exit ports is shown in FIG. 1. Components connected to only one exit port of the primary distributor 4 are shown in FIG. 1; components connected to the other exit ports of the primary distributor 4 will be similar to those connected to the exit port that is shown in FIG. 1.

Referring to FIG. 1, the inlet connector 5 is a flow passage that connects two components of the wet embodiment of the pollutant capturer and mobilizer together, or is connected to one component of the wet embodiment of the pollutant capturer and mobilizer at one end but is open to an atmospheric body of polluted gaseous substance at its other end or its side surfaces, or connects a component of the wet embodiment of the pollutant capturer and mobilizer to a vehicle's exhaust pipe or chimney or stack, or to any other existing polluted gaseous substance producing plant or vehicle, as desired. In FIG. 1, the inlet connector 5 connects one exit port of the primary distributor 4 to the secondary screen box 6.

Referring to FIG. 1, when the inlet connector 5 has one of its ends connected to one component of the wet embodiment of the pollutant capturer and mobilizer and its side surfaces is open to an atmospheric body of polluted gaseous substance, then the side surfaces open to the atmospheric body of polluted gaseous substance through one or multiple arrays of openings on the side surfaces of the inlet connector 5 such that the total cross sectional area of the openings is much larger that the cross sectional area of the end that is connected to one component of the pollutant capturer and mobilizer, resulting in an increase in velocity as the atmospheric body of polluted gaseous substance exits the inlet connector 5 through its small cross sectional area. With a high velocity, the atmospheric body of polluted gaseous substance can then flow through other components of the wet embodiment of the pollutant capturer and mobilizer and enters the body of liquid P.C.C.18 on its own with no need to using any flow establishing device box. Additionally, each of the openings on the side surfaces of the inlet connector 5 is equipped with a flapper mounted on the opening; each flapper can rotate about a pin only in one direction, thus flappers serve as check valves and allow the atmospheric body of polluted gaseous substance to only enter into the inlet connector 5 through the openings on its side surfaces. The flappers and their associated pins are not shown in FIG. 1.

Referring to FIG. 1, the secondary screen box 6 is a flow passage that contains one or more screen layers to prevent birds and other undesired objects to enter the internal space of the wet embodiment of the pollutant capturer and mobilizer. Screen layers may have identical or different mesh or grid sizes. The secondary screen box 6 is used in only some applications of the wet embodiment of the pollutant capturer and mobilizer. One secondary screen box 6 is shown in FIG. 1; any desired number of secondary screen boxes may be used either in parallel or in series, or a combination of both in parallel and in series as desired.

Referring to FIG. 1, the secondary flow establishing device box 7 forces the body of polluted gaseous substance to flow into the adaptor 8 or other components of the wet embodiment of the pollutant capturer and mobilizer. The secondary flow establishing device box 7 may house one or multiple flow establishing devices in parallel, i.e., side by side. One flow-establishing device is shown in the single secondary flow establishing device box 7 in FIG. 1; any other desired number of flow-establishing devices may be used, in parallel, in a single secondary flow establishing device box 7. Any desired number of secondary flow-establishing device boxes 7 may be used in the flow pass in parallel as desired.

Referring to FIG. 1, the adaptor 8 is a flow passage that connects two components of the wet embodiment of the pollutant capturer and mobilizer together; FIG. 1 shows the adaptor 8 connecting the secondary flow establishing device box 7 to the P.C.C. container cap 9. Adaptor 8 is also used to inject water or pressurized air to clean any particulates that might accumulate inside the components of the wet embodiment of the pollutant capturer and mobilizer, which are housed inside the P.C.C. container 17, as desired.

Referring to FIG. 1, the P.C.C. container cap 9 is mounted on the P.C.C. container 17; some of the other components of the wet embodiment of the pollutant capturer and mobilizer can be mounted the P.C.C. container cap. The P.C.C. container cap 9 has a barrier attached to it, with the barrier to have any desired shape or geometry or dimensions, and with the top portion of the barrier preventing flow of the polluted gaseous substance through the barrier, and with the bottom portion of the barrier allowing continuity in a body of liquid that that occupies the bottom parts of the barrier and the P.C.C. container.

Referring to FIG. 1, the riser 10 is a flow passage that connects two components of the pollutant capturer and mobilizer together. In FIG. 1, the riser 10 connects the P.C.C. container cap 9 to the secondary distributor 11.

Referring to FIG. 1, the secondary distributor 11 is a flow passage with one inlet port and a desired number of outlet ports. A secondary distributor with two outlet ports is shown in FIG. 1; any other desired number of outlet ports may be used with the secondary distributor as desired. Components connected to only one exit port of the secondary distributor 11 are shown in FIG. 1; components connected to the other exit ports of the secondary distributor 11 will be similar to those connected to the exit port as shown in FIG. 1.

Referring to FIG. 1, one branch 12 is connected to each outlet port of the secondary distributor 11. Each branch 12 has one upstream opening, one downstream opening, and one or multiple outlet ports. The upstream opening is connected to one outlet port of the secondary distributor 11 and the downstream opening is plugged. Components connected to only one outlet port of the secondary distributor 11 are shown in FIG. 1; components connected to the other outlet ports of the secondary distributor 11 will be similar to those connected to the outlet port as shown in FIG. 1.

Referring to FIG. 1, one plug 13 is connected to the downstream opening of each branch 12 to prevent flow of the polluted gaseous substance through the downstream opening of branches.

Referring to FIG. 1, one branch connector 14 is used for each outlet port of the branch 12. The branch connector 14 has multiple flow passages; it has one flow passage at its central area and one or multiple flow passages distributed further away from its centerline. The central flow passage of the branch connector 14 is connected to an outlet port of the branch 12.

Referring to FIG. 1, one path extender 15 is connected to each branch connector 14. The path extender 15 is made of multiple coil segments connected to each other; each two adjacent coil segments are connected to each other by one perforated disk 16. Any desired number of the coil segments may be connected to each other, by the perforated disks, to form a path extender 15. FIG. 1 shows the broken view of the path extender 15 and its centerline.

Referring to FIG. 1, one or multiple perforated disks 16 may be mounted inside each riser 10 to cover the cross sectional area of the riser at desired locations, thus divide the body of polluted gaseous substance into many small polluted gaseous bodies as the body of polluted gaseous substance passes through the perforated disks 16 that are mounted inside the riser 10 and are also submerged within the liquid pollutant capturing component 18. Similarly, one or multiple perforated disks 16 may be mounted inside each path extender 15 to cover the cross sectional area of the path extender 15 at desired locations and further divide the body of polluted gaseous substance into many small polluted gaseous bodies as the body of polluted gaseous substance passes through the path extender 15 that is completely submerged within the liquid pollutant capturing component 18. Dividing the body of polluted gaseous substance into many small polluted gaseous bodies, as well as extending the flow path of the body of polluted gaseous substance within the liquid pollutant capturing component 18 improves the effectiveness of capturing the polluting substances of the body of polluted gaseous substance as the body of polluted gaseous substance passes through the liquid pollutant capturing component 18. Two perforated disks 16 are shown in the riser 10 in FIG. 1, any other desired number of perforated disks 16 may be mounted in each riser 10 as desired. Structural details of the perforated disks 16 within the riser 10 are not depicted in FIG. 1. One perforated disk 16 is shown in the path extender 15 in FIG. 1; any other desired number of perforated disks 16 may be mounted in each path extender 15 at desired locations, as desired.

Referring to FIG. 1, the P.C.C. container 17 contains the liquid pollutant capturing component 18 and also houses some of the other components of the pollutant capturer and mobilizer such as the riser 10, the secondary distributor 11, the branch 12, the path extender 15, and some other components as seen in FIG. 1.

Referring to FIG. 1, the liquid pollutant capturing component 18 fills up the P.C.C. container 17 to a desired height. The liquid pollutant capturing component can be used with or without any additives such as soap or any other type of foaming agents.

Referring to FIG. 1, one or multiple gas dividers 19, which are submerged within the liquid pollutant capturing component 18, are used to divide the body of polluted gaseous substance into many small polluted gaseous bodies as the body of polluted gaseous substance flows upward passing through the gas dividers 19. Dividing the body of polluted gaseous substance into many small polluted gaseous bodies improves the effectiveness of capturing the polluting substances of the body of polluted gaseous substance as the body of polluted gaseous substance flows through the liquid pollutant capturing component 18. The gas dividers 19 can be mounted on the riser 10 or on the P.C.C. container 17 or on any other component or combination of components of the wet embodiment of the pollutant capturer and mobilizer. Two gas dividers 19 are shown in FIG. 1, any other desired number of the gas dividers may be used. A gas divider 19 might be a perforated disk or a body of natural or manufactured spongy or fibrous substance; perforation holes of the gas divider 19 are not shown in FIG. 1.

Referring to FIG. 1, the splash shield 20 is mounted on the riser 10 or on the P.C.C. container 17 or on any other component or combination of components of the wet embodiment of the pollutant capturer and mobilizer. The splash shield 20 is mounted at a desired distance above the liquid P.C.C. surface 36 to shield any liquid splash that might be created as the body of polluted gaseous substance exits from the body of the liquid P.C.C. 18. The splash shield 20 might be a perforated disk or a body of natural or manufactured spongy or fibrous substance.

Referring to FIG. 1, the P.C.C. container exit port 21 is a flow passage that is mounted either on the P.C.C. container cap 9 or on the P.C.C. container 17 as desired. After the body of polluted gaseous substance leaves the body of the liquid P.C.C. 18 and passes through the splash shield 20, it exits the P.C.C. container 17 through the P.C.C. container exit port 21. FIG. 1 show the P.C.C. container exit port 21 to be mounted on the P.C.C. container cap 9; however, the P.C.C. exit port 21 may also be mounted on the P.C.C. container 17 as desired.

Referring to FIG. 1, the P.C.C. shield 22 is a flow passage that prevents any small quantities of the liquid P.C.C 18 to escape into the atmosphere. The P.C.C. shield 22 might be a perforated disk or a body of natural or manufactured spongy or fibrous substance.

Referring to FIG. 1, the P.C.C. shield retainer 23 is a flow passage that keeps the P.C.C. shield 22 in place. The P.C.C. shield retainer 23 is mounted on the P.C.C. container exit port 21.

Referring to FIG. 1, the float valve 24 controls the amount of the liquid P.C.C. 18 within the P.C.C. container 17. The float valve 24 can be mounted either on P.C.C. container 17 or on the P.C.C. container cap 9; FIG. 1 shows the float valve 24 when mounted on the P.C.C. container 17. The float valve 24 is also connected to an external supply source of the liquid P.C.C. 18; when the amount of the liquid P.C.C. 18 in the P.C.C. container decreases, the level of the liquid P.C.C. in the P.C.C. container drops thus it activates and opens the float valve 24 to allow more liquid P.C.C. 18 to enter into the P.C.C. container 17. The external supply source of liquid P.C.C. 18 is not shown in FIG. 1. When multiple P.C.C. containers 17 are used, a piping network can be used to connect all of the float valves to a single external supply source of liquid P.C.C. 18. The piping network is not shown in FIG. 1.

Referring to FIG. 1, the fill up valve 25 is also used to add more liquid P.C.C. 18 or any other desired fluid into the P.C.C. container 17 as desired. The fill up valve 25 can be mounted on either P.C.C. container 17 or on the P.C.C. container cap 9; FIG. 1 shows the fill up valve 25 to be mounted on the P.C.C. container 17. When multiple P.C.C. containers 17 are used, a piping network can be used to supply the liquid P.C.C. 18 or other desired fluid to the P.C.C. containers. The piping network is not shown in FIG. 1.

Referring to FIG. 1, the P.C.C. container drain network 26 is a piping network that connects two components of the wet embodiment of the pollutant capturer and mobilizer together, or connects one component of the embodiment to atmosphere, or to an existing liquid storage, or to an existing piping network. FIG. 1 shows the P.C.C. container drain network 26 to be mounted at a low point of the P.C.C. container 17 and is used to empty the liquid P.C.C. 18 or any other fluid from the P.C.C. container 17 as desired. When multiple P.C.C. containers 17 are used, a collecting piping network can be used to empty all of the P.C.C. containers 17 by their individual P.C.C. container drain network 26, through the collecting piping network. The collecting piping network is not shown in FIG. 1; one valve is shown in the liquid P.C.C. container drain network 26.

Referring to FIG. 1, a desired number of thermal fins, or arrays of fins, 27 can be attached to the P.C.C. container 17, with a desired pattern, to enhance dissipation of heat and thermal energy that is carried into the liquid P.C.C. 18 within the P.C.C. container 17 by a high-temperature body of polluted gaseous substance.

Referring to FIG. 1, one or multiple sight glasses 28 can be connected to the P.C.C. container 17 to show the level of the liquid P.C.C 18 or other liquids within the P.C.C. container 17.

Referring to FIG. 1, the base structure 29 supports other components of the wet embodiment of the pollutant capturer and mobilizer, directly or indirectly, as desired. The base structure 29 can be mounted on the ground or on a stationary foundation, or on a chimney or stack, or on a vehicle's exhaust pipe, or at any desired point of a vehicle, or on an existing stationary or mobile structure. The base structure 29 comprises rotary and sliding structural segments which allow mounting, removing, or replacing other components of the wet embodiment of the pollutant capturer and mobilizer conveniently.

Referring to FIG. 1, one or multiple rain shields 30 are used to protect some or all of the components of the wet embodiment of the pollutant capturer and mobilizer against rain or any other undesired atmospheric conditions. Different segments of each of the rain shields can be mounted on the base structure 29 or on any other component or combination of components of the wet embodiment of the pollutant capturer and mobilizer as desired.

Referring to FIG. 1, the P.C.C. container support 31 is a structure that supports the P.C.C. container 17. The P.C.C. container support 31 can be mounted on the base structure 29 or on any existing external stationary or mobile structure as desired. One or multiple P.C.C. container support 31 may be used for each P.C.C. container 17; only one P.C.C. container support 31 is shown in FIG. 1.

Referring to FIG. 1, the secondary distributor support 32 is a structure that is used to support the secondary distributor 11. The secondary distributor support 32 can be mounted on the P.C.C. container 17 or on any other component or combination of components of the wet embodiment of the pollutant capturer and mobilizer as desired. One or multiple secondary distributor supports 32 may be used for each secondary distributor 11; only one secondary distributor support 32 is shown in FIG. 1.

Referring to FIG. 1, the branch support 33 is a structure that is used to support the branch 12. The branch support 33 can be mounted on the P.C.C. container 17 or on any other component or combination of components of the wet embodiment of the pollutant capturer and mobilizer as desired. One or multiple branch support 33 may be used for each branch 12; only one branch support 33 is shown in FIG. 1.

Referring to FIG. 1, the cap support 34 is a structure that supports the P.C.C. container cap 9. The cap support 34 can be mounted on the base structure 29 or on any other component or combination of components of the wet embodiment of the pollutant capturer and mobilizer, or on any existing foundation or external stationary or mobile structure as desired. One or multiple cap support 34 may be used for each P.C.C. container cap 9; only one cap support 34 is shown in FIG. 1.

Referring to FIG. 1, the primary distributor support 35 is a structure that supports the primary distributor 4. The primary distributor support 35 can be mounted on the base structure 29 or on any other component or combination of components of the wet embodiment of the pollutant capturer and mobilizer, or on any existing foundation or external stationary or mobile structure as desired. One or multiple primary distributor support 35 may be used for each primary distributor 4; only one primary distributor support 35 is shown in FIG. 1.

Referring to FIG. 1, the liquid P.C.C. surface 36 shows the level of the liquid P.C.C. 18 within the P.C.C. container 17. The liquid P.C.C. surface 36 is maintained at a desired level by supplying liquid P.C.C. 18, from an external supply source, to the P.C.C. container 17 through the float valve 24 or the fill up valve 25.

Referring to FIG. 1, the path extender support 37 is a structure that supports the path extender 15. The path extender support 37 can be mounted on the P.C.C. container 17 or on any other component or combination of components of the wet embodiment of the pollutant capturer and mobilizer as desired. One or multiple path extender support 37 may be used for each path extender 15; only one path extender support 37 is shown in FIG. 1.

Referring to FIG. 1, the odor removal substance container 38 is attached to any component of the wet embodiment of the pollutant capturer and mobilizer, as desired. The container may contain a desired amount of a desired type of solid or liquid odor removal substance to generate a pleasant smell in the location where the wet embodiment of the pollutant capturer and mobilizer is in operation. The odor removal substance container 38 may be attached to any component or combination of components of the wet embodiment of the pollutant capturer and mobilizer as desired. The odor removal substance may also be added to the liquid P.C.C. 18 directly, as desired. One or multiple odor removal substance containers 38 may be used with the wet embodiment of the pollutant capturer and mobilizer; FIG. 1 shows only one odor removal substance container 38 mounted on the P.C.C. container cap 9.

Referring to FIG. 1, the P.C.C. outlet network 39 is a piping network that connects the P.C.C. container 17 to the P.C.C. pump inlet valve 40.

Referring to FIG. 1, The P.C.C. pump inlet valve 40 is a valve that connects the P.C.C. outlet network 39 to the P.C.C. pump inlet network 41 or to another component of the wet embodiment of the pollutant capturer and mobilizer as desired. The P.C.C. pump inlet valve can restrict flow of the P.C.C. 18 out of the P.C.C. container 17, as desired.

Referring to FIG. 1, the P.C.C. pump inlet network 41 is a piping network that connects the P.C.C. pump inlet valve 40, or another component of the wet embodiment of the pollutant capturer and mobilizer, to the P.C.C. pump 42.

Referring to FIG. 1, the P.C.C. pump 42 connects the P.C.C. pump inlet network 41 to the P.C.C. pump outlet network 43 or to another component of the wet embodiment of the pollutant capturer and mobilizer and circulates the P.C.C. 18 into and out of the P.C.C. container 17 through some other piping networks and components of the wet embodiment of the pollutant capturer and mobilizer, as desired.

Referring to FIG. 1, the P.C.C. pump outlet network 43 is a piping network that connects the P.C.C. pump 42 to the P.C.C. pump outlet valve 44 or to another component of the wet embodiment of the pollutant capturer and mobilizer, as desired.

Referring to FIG. 1, the P.C.C. pump outlet valve 44 is a valve that connects two components of the pollutant capturer and mobilizer together. In FIG. 1, the P.C.C. pump outlet valve 44 connects the P.C.C. pump outlet network 43 to the P.C.C. inlet network 45. The P.C.C. pump outlet valve 44 can restrict flow of the P.C.C. 18 exiting the P.C.C. container 17, as desired.

Referring to FIG. 1, the P.C.C. inlet network 45 is a piping network that connects the P.C.C. pump outlet valve 44 to the P.C.C. container 17 or to another component of the wet embodiment of the pollutant capturer and mobilizer, as desired.

Referring to FIG. 1, the spray network 46 is a piping network that includes a desired number of branches with a desired number of spray nozzles 47 mounted on each of the branches. The spray network 46 is connected to the P.C.C. inlet network 45 through an opening on the wall of the of the P.C.C. container 17, as desired.

Referring to FIG. 1, one or multiple spray network supports 48 are used to secure the spray network 46 in place, as desired. The spray network support 48 may be attached to the P.C.C. container 17 or to any structure or component or combination of components of the wet embodiment of the pollutant capturer and mobilizer, as desired.

Referring to FIG. 1, one or multiple riser supports 49 are used to secure the riser 10 in place, as desired. The riser support 49 may be attached to the P.C.C. container 17 or to any structure or component or combination of components of the wet embodiment of the pollutant capturer and mobilizer, as desired.

Referring to FIG. 1, the overflow network 50 is a piping network that connects two components of the wet embodiment of the pollutant capturer and mobilizer together, or connects one component of the embodiment to atmosphere, or to an existing liquid storage, or to an existing piping network. When the body of polluted gaseous substance contains water vapor, the water vapor condenses when it comes in physical contact with the liquid P.C.C. 18. The condensation of the water vapor will result in an increase of the amount of liquid that is contained within the P.C.C. container 17. The increased amount of liquid may exit the P.C.C. container 17 through the overflow network 50 or the drain network 55 or the spare network 64. FIG. 1 shows the overflow network 50 connecting the P.C.C. container 17 to the liquid storage container 51.

Referring to FIG. 1, the liquid storage container 51 is a container that is used to store the liquid that is discharged from the P.C.C. container 17. The liquid storage container 51 is equipped with one or multiple vents to maintain it at atmospheric pressure. The liquid storage container 51 is also equipped with one or multiple sight glasses to show the level of liquid within the liquid storage container 51. The vents and sight glasses are not shown in FIG. 1.

Referring to FIG. 1, the overflow network isolating valve 52 is a valve that can allow discharge of liquid from the P.C.C. container 17 as desired.

Referring to FIG. 1, the liquid storage container overflow isolating valve 53 is a valve that can allow flow into the liquid storage container 51 as desired.

Referring to FIG. 1, the overflow network filtering box 54 prevents particulate substances from exiting the P.C.C. container 17.

Referring to FIG. 1, the drain network 55 is a piping network that connects two components of the wet embodiment of the pollutant capturer and mobilizer together, or connects one component of the embodiment to atmosphere or to an existing liquid storage or to an existing piping network. FIG. 1 shows the drain network 55 connecting the P.C.C. container 17 to the liquid storage container 51.

Referring to FIG. 1, the drain network isolating valve 56 is a valve that can allow discharge of liquid from the P.C.C. container 17 as desired.

Referring to FIG. 1, the upstream isolating valve 57 is a valve that can allow liquid flow through the drain network 55 as desired.

Referring to FIG. 1, the pressure relief valve 58 is a control valve that is activated by pressure; it is normally closed but becomes open when hydrostatic pressure acting on it reaches a desired magnitude.

Referring to FIG. 1, the downstream isolating valve 59 is a valve that can allow liquid flow through the drain network 55 as desired.

Referring to FIG. 1, the storage container drain isolating valve 60 is a valve that can allow liquid flow into the liquid storage container 51 as desired.

Referring to FIG. 1, the drain network filtering box 61 prevents particulate substances from exiting the P.C.C. container 17 as desired.

Referring to FIG. 1, the liquid storage container drain network 62 is a piping network that connects two components of the wet embodiment of the pollutant capturer and mobilizer together, or connects one component of the embodiment to atmosphere or to an existing liquid storage or to an existing piping network. The liquid storage container drain network 62 is connected at a low point of the liquid storage container 51 and is used to dispose the overflown liquid, which is collected in the liquid storage container 51, as desired.

Referring to FIG. 1, the liquid storage container drain valve 63 is a valve that can allow flow of liquid from the liquid storage container 51 as desired.

Referring to FIG. 1, the spare network 64 is a piping network that connects two components of the wet embodiment of the wet embodiment of the wet embodiment of the pollutant capturer and mobilizer together, or connects one component of the embodiment to atmosphere, or to an existing liquid storage, or to an existing piping network. One or multiple spare network 64 can be used with each P.C.C. container 17; FIG. 1 shows one spare network 64 connected to the P.C.C. container 17.

Referring to FIG. 1, the spare network valve 65 is a valve that can allow flow of liquid from the P.C.C. container 17 or into the container, as desired.

Referring to FIG. 1, the spare network filtering box 66 prevents particulate substances from exiting the P.C.C. container 17 as desired.

Referring to FIG. 1, the maintenance fill up network 67 is a piping network that connects an external source of water or compressed air to one component of the wet embodiment of the pollutant capturer and mobilizer to clean any particulates that might accumulate within components and flow paths of the wet embodiment of the pollutant capturer and mobilizer. FIG. 1 show the maintenance fill up network 67 connected to the adaptor 8.

Referring to FIG. 1, one or multiple maintenance drain networks 68 can be connected to each branch 12 or to each secondary distributor 11 or to a combination of the components, as desired, to allow draining any liquid or accumulated particulate substances from the components that are housed within the P.C.C. container 17 of the wet embodiment of the pollutant capturer and mobilizer. The maintenance drain network 68 is connected to a low point of either the branch 12 or the secondary distributor 11, or on both of them as desired. One maintenance drain network 68 is shown in FIG. 1; any other number of the maintenance drain network 68 may be used as desired.

Referring to FIG. 1, one maintenance window cover 69 is used to cover each inspection window on the walls of the P.C.C. container 17; the window provides access to the components of the wet embodiment of the pollutant capturer and mobilizer, that are housed inside the P.C.C. container 17, for necessary inspection and maintenance. One inspection window with its associated maintenance window cover 69 is shown in FIG. 1; any other number of the inspection windows and maintenance window cover 69 may be used for each P.C.C. container 17 as desired.

Referring to FIG. 1, an incoming body of polluted gaseous substance from atmosphere or any other external supply source, upon reaching the riser 10 by its on energy and speed or by the use of one or multiple flow establishing device boxes, flows through the riser 10, branches 12, branch connectors 14, the path extender 15, and perforated disk 16 that are submerged within the liquid P.C.C. 18 inside the P.C.C. container 17. As the body of polluted gaseous substance flows through the liquid P.C.C. 18, one or more types of polluting substances of the body of polluted gaseous substance will be captured by the liquid P.C.C. 18; the body of polluted gaseous substance then exits the wet embodiment of the pollutant capturer and mobilizer and enters into the atmosphere or its surroundings, through the P.C.C. container exit port 21, with no or less polluting substances. The capturing and thus the removal of the polluting substances from the body of polluted gaseous substance could be by means of physical deposition of particulate substances of the body of polluted gaseous substance within the liquid P.C.C. 18, or by means of absorption of the polluting substances by the liquid P.C.C. 18, or by means of formation of a solid substance due to a chemical reaction between the polluting substances of the body of polluted gaseous substance and the liquid P.C.C. 18 and the deposition of the formed solid substance, or by means of dissolution of the polluting substances within the liquid P.C.C. 18, or by means of the consumption of the polluting substances of the body of polluted gaseous substance by the liquid P.C.C. 18, or by means of denaturing the polluting substances by the liquid P.C.C. 18, or by means of altering the chemical properties of the polluting substances of the body of polluted gaseous substance by the liquid P.C.C. 18, or by a combination of some or all of the above said means, as the body of polluted gaseous substance flows through the liquid P.C.C. 18 within the P.C.C. container 17. The polluting substances that are captured by the liquid P.C.C. 18 accumulate in the P.C.C. container 17 and can be removed from the P.C.C. container 17 as desired. Also, the liquid P.C.C. 18 that is contained within the P.C.C. container 17 of the wet embodiment of the pollutant capturer and mobilizer may be replaced with fresh liquid P.C.C. 18 from time to time as desired.

Referring to FIG. 1, with both the P.C.C. pump inlet valve 40 and the P.C.C. pump outlet valve 44 open and the P.C.C. pump 42 operating, the liquid P.C.C. 18 can be taken out from the bottom of the P.C.C. container 17 and sprayed over the body of polluted gaseous substance, that is flowing through the P.C.C. container 17, through the spray nozzles 47. As the liquid P.C.C. 18 is sprayed within the P.C.C. container 17, it results in the capturing or removal of one or multiple types of polluting substances from the body of polluted gaseous substance that is flowing within the P.C.C. container 17; the body of polluted gaseous substance then exits the wet embodiment of the pollutant capturer and mobilizer and enters into the atmosphere or its surroundings, through the P.C.C. container exit port 21, with no or less polluting substances. The captured polluting substances become accumulated in the body of the liquid P.C.C 18 that fills up the bottom part of the P.C.C. container 17 to a desired height. The capturing and thus the removal of the polluting substances from the body of polluted gaseous substance could be by means of physical deposition and settlement of particulate substances of the body of polluted gaseous substance within the liquid P.C.C. 18, or by means of absorption of the polluting substances by the liquid P.C.C. 18, or by means of formation of a solid substance due to a chemical reaction between the polluting substances of the body of polluted gaseous substance and the liquid P.C.C. 18 and the deposition and settlement of the formed solid substance, or by means of dissolution of the polluting substances within the liquid P.C.C. 18, or by means of the consumption of the polluting substances of the body of polluted gaseous substance by the liquid P.C.C. 18, or by means of denaturing the polluting substances by the liquid P.C.C. 18, or by means of altering the chemical properties of the polluting substances of the body of polluted gaseous substance by the liquid P.C.C. 18, or by a combination of some or all of the above said means, as the liquid P.C.C. 18 is sprayed over the body of polluted gaseous substance within the P.C.C. container 17. The accumulated captured polluting substances can be removed from the P.C.C. container 17, as desired. Also, the liquid P.C.C. 18 that is contained within the P.C.C. container 17 will be replaced with fresh liquid P.C.C. 18 from time to time as desired.

Referring to FIG. 1, when water is used as the liquid P.C.C. 18 and the body of polluted gaseous substance that enters the wet embodiment of the pollutant capturer and mobilizer contains water vapor, the water vapor condenses as the body of polluted gaseous substance flows through the body of water that is used as the liquid P.C.C. 18. The condensation results in increase in the volume and height of the liquid contained within the P.C.C. container 17; the generated condensed water results in flow of liquid through the overflow network 50, thus a constant maximum height of water within the P.C.C. container 17 is maintained, as desired. Valves 52 and 53 are kept open while valves 25, 56, and 65 are kept closed to accommodate liquid flow only through the overflow network 50.

Referring to FIG. 1, when a single type of liquid P.C.C. 18 that is lighter than water and is immiscible in water is used to capture $CO_2$ from a body of polluted gaseous substance which also contains water vapor, or when a combination of both water as well as a lighter liquid that is immiscible with water are used as the P.C.C. 18, the water vapor that is contained in the incoming body of polluted gaseous substance becomes condensed and accumulated at the bottom of the P.C.C. container 17, under the body of the lighter P.C.C. 18 that is immiscible in water, resulting in gradually increasing the height of water column at the bottom of the P.C.C. container 17. The increase in hydrostatic pressure associated with the increase in the total height of the liquid contained within the P.C.C. container 17 activates the pressure relief valve 58 and opens the pressure relief valve momentarily so some liquid water can exit through the drain network 55. After the release of some liquid water and decrease of the total height of liquid in the P.C.C. container 17, the pressure relief valve 58 closes again; thus, the pressure relief valve 58 maintains a maximum height of water column within the P.C.C. container 17 as desired. The pressure relief valve 58 opens and closes at a range of total liquid heights that allows only the generated condensed water to exit the P.C.C. container 17 but not the lighter P.C.C. 18 that is immiscible with water and is on top of water column. Using a combination of two liquids as the P.C.C. 18 allows capturing of particulate substances as well as desired gases, such as $CO_2$, from a body of polluted gaseous substance. Valves 25, 52, and 65 are kept closed while valves 56, 57, 59, and 60 are kept open; the pressure relief valve 58 might become open or close, depending on the total height of liquid within the P.C.C. container 17, automatically thereby allowing only liquid water to exit the P.C.C. container 17 while keeping the lighter P.C.C. 18 inside the P.C.C. container 17.

Referring to FIG. 1, the liquid that enters the liquid storage container 51 through either the overflow network 50 or the drain network 55, will exit the liquid storage container 51 through the liquid storage container drain network 62 and will be disposed into a designated area, or into an existing liquid storage, or into an existing piping network as desired.

Referring to FIG. 1, two or more units of wet embodiment of the pollutant capturer and mobilizer may be connected to each other such that the body of the polluted gaseous substance that exits one unit of the wet embodiment of the pollutant capturer and mobilizer is fed into another unit of the wet embodiment of the pollutant capturer and mobilizer with the exit from the last unit of the wet embodiment of the pollutant capturer and mobilizer being released, as treated gaseous substance, into the surrounding atmosphere. Similar or dissimilar liquid P.C.C. 18 may be used in different interconnected said units of the wet embodiment of the pollutant capturer and mobilizer allowing different types of polluting substances to be removed from a body of polluted gaseous substance as the latter flows through different interconnected units of the wet embodiment of the pollutant capturer and mobilizer.

Referring to FIG. 1, during maintenance operations and with the maintenance drain network 68 open to fluid flow, water or compressed air may be injected through the maintenance fill up network 67 into the adaptor 8 to remove any particulates that might accumulate inside the riser 10, or the secondary distributor 11, or branches 12, or other components of the wet embodiment of the pollutant capturer and mobilizer in which particulate substances may accumulate. Also, the maintenance window cover 69 may be removed to get access to inside of the P.C.C. container 17 for cleaning and maintenance operations.

Referring to FIG. 1, one or multiple units of the wet embodiment of the pollutant capturer and mobilizer, with each of the units having the same or fewer number of components compared to those seen in FIG. 1, may be used at a desired location to draw an atmospheric body of polluted gaseous substance, that contains water vapor or fog, towards the unit of the wet embodiment of the pollutant capturer and mobilizer, thus capture fog and water vapor from the atmospheric body of polluted gaseous substance and therefore clear the location and other nearby locations from fog and water vapor.

Referring to FIG. 1, one or multiple large scale units of the wet embodiment of the pollutant capturer and mobilizer, with each of the units having the same or fewer number of components compared to those seen in FIG. 1, may be used at one or multiple locations with a desired pattern to move an atmospheric body of polluted gaseous substance, that contains water vapor, from one location towards another location thus reduce rainfall at one location therefore prevent flooding, or initiate rainfall at another location thus prevent drought, or accelerate or decelerate the movement of the atmospheric body of polluted gaseous substance to control the amount of rainfall at desired locations, or move an atmospheric body of polluted gaseous substance from one or multiple locations towards one or multiple other locations to disrupt a hurricane or formation of a hurricane or disrupt a tornado or formation of a tornado or disrupt severe weather or development of a severe weather condition, or disrupt heat and cold waves or formation of heat and cold waves.

4. General Description of the Dry Embodiment of the Invention

Referring to FIG. 2, the dry embodiment of the pollutant capturer and mobilizer utilizes a base structure 101, a distributor 102, one or multiple heat insulators 103, one or multiple secondary bird protection barriers 104, one or multiple secondary flow establishing device boxes 105, one or multiple dust boxes 106, one or multiple dust box caps 107, one or multiple filter houses 108, one or multiple pollutant removal filters 109, one or multiple rain shields 110, one or multiple thermal fins or arrays of thermal fins 111, one or multiple supply connector 112, one or multiple primary bird protection barriers 113, and one or multiple primary flow establishing device boxes 114 to remove different types of pollutants and particulate substances from a body of polluted gaseous substance. The order of arrangement of components might be different from what is shown in FIG. 2. Some applications of the dry embodiment of the pollutant capturer and mobilizer may require fewer components than those shown in FIG. 2.

Referring to FIG. 2, as a body of polluted gaseous substance flows through different components of the dry embodiment of pollutant capturer and mobilizer, it exits the embodiment with one or multiple types of its polluting substances being captured by the dry embodiment of pollutant capturer and mobilizer.

Referring to FIG. 2, the base structure 101 supports other components of the dry embodiment of the pollutant capturer and mobilizer, directly or indirectly, as desired. The base structure can be mounted on the ground or on a stationary foundation or on a concrete foundation or slab, or on an existing stationary or mobile structure, or at a desired point on a vehicle. The base structure 101 comprises wheels so the structure can be moved around as desired; it also comprises tethering ropes or chains to further secure the base structure in place.

Referring to FIG. 2, the distributor 102 is a flow passage that has one or multiple inlet ports and one or multiple exit ports. A distributor with one inlet port and two exit ports is shown in FIG. 2. Components connected to only one inlet port and one exit port of the distributor 102 are shown in FIG. 2; components connected to the other inlet and exit ports of the distributor will be similar to those shown in FIG. 2.

Referring to FIG. 2, one or multiple heat insulators 103 are used to connect the supply connector 12 to any existing chimney or stack, or vehicle's exhaust pipe, or a hot structure or surface or component, to thermally insulate the supply connector 112 from any of the above hot surface to which the supply connector 112 is connected or attached.

Referring to FIG. 2, one or multiple secondary bird protection barriers 104 are used to prevent birds and other species or undesired objects to enter the internal space of the dry embodiment of the pollutant capturer and mobilizer. Each of the secondary bird protection barriers 104 may have one or multiple screen layers with identical or different mesh or grid sizes. One secondary bird protection barrier 104 is shown in FIG. 2; any other desired number of secondary bird protection barriers may be used either in parallel or in series, or a combination of both in parallel and in series as desired.

Referring to FIG. 2, one or multiple secondary flow establishing device boxes 105 are used either in parallel or in series or a combination of both in parallel and in series, as desired, to force a body of polluted gaseous substance to flow through internal space of the dry embodiment of the pollutant capturer and mobilizer. A secondary flow establishing device box 105 may house one or multiple flow establishing devices. One secondary flow-establishing device box 105 housing one flow-establishing device is shown in in FIG. 2; any other desired number of flow-establishing devices may be used, side by side in parallel, in a single secondary flow-establishing device box 105.

Referring to FIG. 2, the dust box 106 is a flow passage with one or multiple dust wells with the dust wells used to hold the polluting particulate substances, that are removed from the body of polluted gaseous substance, until the polluting substances are removed from the dust box as desired. One dust box 106 comprising one dust well is shown in FIG. 2.

Referring to FIG. 2, one dust box cap 107 is used with each dust well of the dust box 106 to plug the dust well. The dust box cap 107 will be removed, temporarily, whenever it is desired to empty the dust well from the accumulated polluting substances.

Referring to FIG. 2, one or multiple filter houses 108 may be used with each dust box 106 of the dry embodiment of the pollutant capturer and mobilizer. Each of the filter houses is a flow passage that houses one or multiple pollutant removal filters such that the pollutant removal filters can be placed inside the filter house or removed from the filter house conveniently. The filter house 108 has vents, with desired angles, on at least one of its sides so it can release the polluted gaseous substance into the surrounding or atmosphere, in the form of a treated gaseous substance, in a desired direction.

Referring to FIG. 2, one or multiple pollutant removal filters 109 is used with each filter house of the dry embodiment of the pollutant capturer and mobilizer. The pollutant removal filter removes the polluting particulate substances from a body of polluted gaseous substance as the body of polluted gaseous substance flows through the pollutant removal filter of the dry embodiment of the pollutant capturer and mobilizer.

Referring to FIG. 2, one or multiple rain shields 110 are used to protect components of the dry embodiment of the pollutant capturer and mobilizer against rain or other undesired atmospheric conditions. One rain shield 110 is shown in FIG. 2; any other number of the rain shields may be used as desired. The rain shields may be mounted on either the base structure 101 or on any other component or combination of components of the dry embodiment of the pollutant capturer and mobilizer, or on any combination of the base structure and components of the dry embodiment of the pollutant capturer and mobilizer as desired.

Referring to FIG. 2, a desired number of thermal fins 111, or arrays of thermal fins 111, may be attached to the surfaces of the distributor 102 or the supply connector 112, or to any other hot surfaces of the dry embodiment of the pollutant capturer and mobilizer, with a desired pattern, to enhance dissipation of heat that might be carried into the dry embodiment of the pollutant capturer and mobilizer by a hot body of polluted gaseous substance.

Referring to FIG. 2, the dry embodiment of the pollutant capturer and mobilizer utilizes one or multiple supply connectors 112 by which the embodiment receives an atmospheric body of polluted gaseous substance, or by which the embodiment becomes connected to a vehicle's exhaust pipe or chimney or stack or any other conduit in which a body of polluted gaseous substance is flowing.

Referring to FIG. 2, one or multiple primary bird protection barriers 113 are used to prevent birds and other species or undesired objects to enter the internal space of the dry embodiment of the pollutant capturer and mobilizer. Each of the bird protection barriers 113 may have one or multiple screen layers with identical or different mesh or grid sizes. One primary bird protection barrier 113 is shown in FIG. 2; any other desired number of primary bird protection barriers 113 may be used either in parallel or in series, or a combination of both in parallel and in series as desired.

Referring to FIG. 2, one or multiple primary flow establishing device boxes 114 are used to force a body of polluted gaseous substance to flow through internal space of the dry embodiment of the pollutant capturer and mobilizer. A primary flow establishing device box 114 may house one or multiple flow establishing devices as desired. One primary flow-establishing device box 114 housing one flow-establishing device is shown in in FIG. 2; any other desired number of flow-establishing devices may be used, side by side in parallel, in a single primary flow-establishing device box 114.

Referring to FIG. 2, an incoming body of polluted gaseous substance from atmosphere or any other external supply source, upon reaching the distributor 102 by its on energy and speed or by the use of one or multiple flow establishing device boxes, flows through the distributor 102, the optional secondary bird protection barriers 104 and secondary flow establishing device boxes 105, the dust boxes 106, the pollutant removal filters 109 and exits through the vents of the filter houses 108 of the dry embodiment of the pollutant capturer and mobilizer with some or all of the polluting particulate substances of the body of polluted gaseous substance left behind on surfaces of the pollutant removal filters 109 or accumulated in the dust wells of the dust box 106. The accumulated polluting particulate substances will be removed from the dust wells by removing the dust box caps 107, temporarily, when needed and as desired. Also, the pollutant removal filters 109 of the dry embodiment of the pollutant capturer and mobilizer may be cleaned or replaced from time to time as desired.

Referring to FIG. 2, two or more units of dry embodiment of the pollutant capturer and mobilizer may be connected to each other such that the body of the polluted gaseous substance that exits one unit of the dry embodiment of the pollutant capturer and mobilizer is fed into another unit of the dry embodiment of the pollutant capturer and mobilizer with the exit from the last unit of the dry embodiment of the pollutant capturer and mobilizer being released, as treated gaseous substance, into the surrounding atmosphere.

Referring to FIG. 2, one or multiple units of the dry embodiment of the pollutant capturer and mobilizer, with each of the units having the same or fewer number of components compared to those seen in FIG. 2, may be used at a desired location, with a desired pattern, to draw an atmospheric body of polluted gaseous substance, that contains water vapor or fog, towards the units of the dry embodiment of the pollutant capturer and mobilizer, thus clear nearby locations from water vapor or fog.

Referring to FIG. 2, one or multiple large scale units of the dry embodiment of the pollutant capturer and mobilizer, with each of the units having the same or fewer number of components compared to those seen in FIG. 2, may be used at one or multiple locations with a desired pattern to move an atmospheric body of polluted gaseous substance, that contains water vapor, from one location towards another location thus reduce rainfall at one location therefore prevent flooding, or initiate rainfall at another location thus prevent drought, or accelerate or decelerate the movement of the atmospheric body of polluted gaseous substance to control the amount of rainfall at desired locations, or move an atmospheric body of polluted gaseous substance from one or multiple locations towards one or multiple other locations to disrupt a hurricane or formation of a hurricane or disrupt a tornado or formation of a tornado or disrupt severe weather or development of a severe weather condition or disrupt heat and cold waves or formation of heat and cold waves.

5. How to Make the Wet Embodiment of the Invention

Referring to FIG. 1, the primary supply connector 1 is a flow passage that connects two components of the wet embodiment of the pollutant capturer and mobilizer together, or is connected to one component of the wet embodiment of the pollutant capturer and mobilizer at one end but is open to an atmospheric body of polluted gaseous substance at its other end, or connects any component of the wet embodiment of the pollutant capturer and mobilizer to an existing polluted gaseous substance producing plant or vehicle, as desired. FIG. 1 show the primary supply connector 1 connected to a primary screen box 2 at one of its ends.

Referring to FIG. 1, when the primary supply connector 1 has one of its ends connected to one component of the wet embodiment of the pollutant capturer and mobilizer and its other end is open to an atmospheric body of polluted gaseous substance, then the end that opens to the atmospheric body of polluted gaseous substance can have a much larger cross sectional area than the end that is connected to another component of the wet embodiment of the pollutant capturer and mobilizer. This result in an increased velocity of the atmospheric body of polluted gaseous substance as it flows through the smaller end of the primary supply connector 1, thus the atmospheric body of polluted gaseous substance can enter into the liquid P.C.C. 18 on its own with no need to using any flow establishing device box. Additionally, the primary supply connector 1 can have one or multiple arrays of flappers mounted on its larger cross-sectional area. Each flapper can rotate about a pin only in one direction, thus flappers serve as check valves and allow the atmospheric body of polluted gaseous substance to only enter the primary supply connector 1 through its larger cross sectional area; upon passing through the flappers and entering into the primary supply connector 1 through its larger cross sectional area, the atmospheric body of polluted gaseous substance will then exit the primary supply connector 1 and enters into another component of the embodiment at an increased velocity. The flappers and their associated pins are not shown in FIG. 1.

Referring to FIG. 1, the primary screen box 2 is a flow passage and contains one or multiple screen layers to prevent birds and other species or undesired objects to enter the internal space of the wet embodiment of the pollutant capturer and mobilizer. Different screen layers may have identical or different mesh or grid sizes. The primary screen box 2 is used in only some applications of the wet embodiment of the pollutant capturer and mobilizer. Any desired number of primary screen boxes may be used in the flow pass either in parallel or in series, or a combination of both in parallel and in series, as desired. The primary screen box 2 comprises screen layers and other metal or non-metal structural components.

Referring to FIG. 1, the primary flow establishing device box 103 is a flow passage that may house one or multiple flow establishing devices, in parallel, i.e. side by side. Any desired number of primary flow-establishing device boxes 103 may be used in parallel or in series or a combination of both in series and in parallel as desired. Flow-establishing devices can be mounted on the primary flow-establishing device boxes 103 using metal or non-metal or a combination of metal and non-metal structural components, flanges, welding, soldering, bolts, nuts, washers, screws, U-bolts, anchor bolts, use of threaded features, pins, retaining rings, clamps, hangers, hinges, cables, ropes, chains, pivots, rivets, any other type of fasteners, sewing, adhesives, thermal fitting, press fitting, Snap-on features, magnets, hinges, spindles, any type of springs, any type of ball bearing or sliding bearings, or any combination of the above said means as desired.

Referring to FIG. 1, the primary distributor 4 is a flow passage and might have one or multiple inlet ports and one or multiple exit ports; each exit port directs the body of polluted gaseous substance towards other components of the wet embodiment of the pollutant capturer and mobilizer for further processing and removal of the pollutants. The primary distributor 4 can be attached to one or multiple primary distributor supports 35, or to the base structure 29, or to any other component of the wet embodiment of the pollutant capturer and mobilizer, or to any existing structure.

Referring to FIG. 1, the inlet connector 5 is a flow passage that connects two components of the wet embodiment of the pollutant capturer and mobilizer together, or is connected to one component of the wet embodiment of the pollutant capturer and mobilizer at one end but is open to an atmospheric body of polluted gaseous substance at its other end, or connects a component of the wet embodiment of the pollutant capturer and mobilizer to a vehicle's exhaust pipe or chimney or stack or to any existing polluted gaseous substance producing source, as desired. In FIG. 1, the inlet connector 5 connects one exit port of the primary distributor 4 to the secondary screen box 6. When the inlet connector 5 is connected to a vehicle's exhaust pipe directly, it will have an extra opening with a removable cap on the opening to allow access to inside the vehicle's exhaust pipe for checking emissions; the extra opening and its associated removable cap are not shown in FIG. 1.

Referring to FIG. 1, When the inlet connector 5 has one of its ends connected to one component of the wet embodiment of the pollutant capturer and mobilizer and its other end is open to an atmospheric body of polluted gaseous substance, then the end that opens to the atmospheric body of polluted gaseous substance can have a much larger cross sectional area than the end that is connected to another component of the wet embodiment of the pollutant capturer and mobilizer. This result in an increased velocity of the atmospheric body of polluted gaseous substance as it flows through the smaller end of the inlet connector 5, thus the atmospheric body of polluted gaseous substance can enter into the liquid P.C.C. 18 on its own with no need to using any flow establishing device box. Additionally, the inlet connector 5 can have one or multiple arrays of flappers mounted on its larger cross-sectional area. Each flapper can rotate about a pin only in one direction, thus flappers serve as check valves and allow the atmospheric body of polluted gaseous substance to only enter into the inlet connector 5 through its larger cross sectional area; upon passing through the flappers and entering the inlet connector 5 through its larger cross sectional area, the atmospheric body of polluted gaseous substance will then exit the inlet connector 5 and enters into another component of the embodiment with an increased velocity. The flappers and their associated pins are not shown in FIG. 1.

Referring to FIG. 1, the secondary screen box 6 is a flow passage and contains one or more screen layers to prevent birds or other living species or other undesired objects to enter the internal space of the wet embodiment of the pollutant capturer and mobilizer. Screen layers may have identical or different mesh or grid sizes. The secondary screen box 6 is used in only some applications of the wet embodiment of the pollutant capturer and mobilizer. Any desired number of secondary screen boxes may be used in the flow pass either in parallel or in series, or a combination of both in parallel and in series, as desired.

Referring to FIG. 1, the secondary flow-establishing device box 7 is a flow passage that may house one or multiple flow-establishing devices, in parallel; i.e., side by side. Any desired number of secondary flow-establishing device boxes 7 may be used in parallel or in series or a combination of both in series and in parallel as desired. Flow-establishing devices can be mounted on the secondary flow-establishing device box 7 using metal or non-metal or a combination of metal and non-metal structural components, flanges, welding, soldering, bolts, nuts, washers, screws, U-bolts, anchor bolts, use of threaded features, pins, retaining rings, clamps, hangers, hinges, cables, ropes, chains, pivots, rivets, any other type of fasteners, sewing, adhesives, thermal fitting, press fitting, Snap-on features, magnets, hinges, spindles, any type of springs, any type of ball bearing or sliding bearings, or any combination of the above said means as desired.

Referring to FIG. 1, the adaptor 8 is a flow passage that connects two components of the wet embodiment of the pollutant capturer and mobilizer together, or connects one component of the pollutant capturer and mobilizer to another existing device. In FIG. 1, the adaptor 8 connects the secondary flow-establishing device box 7 to the P.C.C. container cap 9. The adaptor 8 also has an opening for connecting to the maintenance fill up network 67, as desired. The adaptor 8 can be mounted on the base structure 29 or on any other structure of the wet embodiment of the pollutant capturer and mobilizer or on any other component or any combination of components of the pollutant capturer and mobilizer or on any other existing structure or device.

Figure 3A:
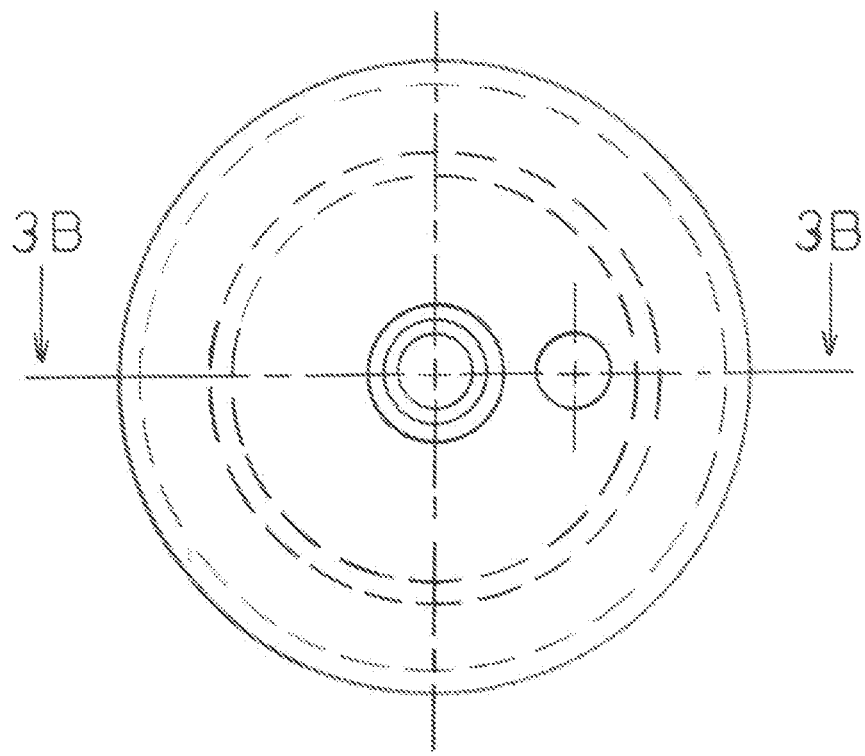
FIG. 3A and FIG. 3B are simplified schematics of the top and front views of the P.C.C. container cap (component 9) as seen in FIG. 1.
Figure 3B:
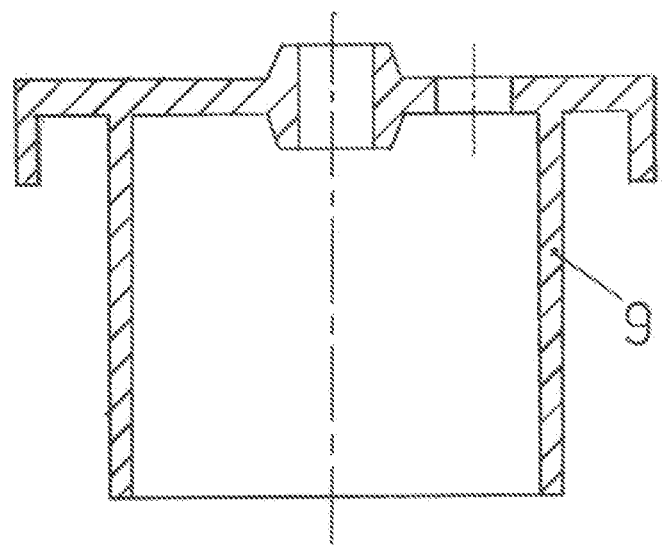

Referring to FIG. 1, the P.C.C. container cap 9 is mounted on the P.C.C. container 17. The P.C.C. container cap 9 has a desired number of openings to which other components of the wet embodiment of the pollutant capturer and mobilizer may be connected. In FIG. 1, the P.C.C. container cap 9 is shown with two openings; the P.C.C. container exit port 21 is connected to one of the openings while the adaptor 8 and the riser 10 are both connected to the second opening of the P.C.C. container cap 9. The P.C.C. container cap 9 has a partial barrier attached to it, with the partial barrier to have any desired shape or geometry or dimensions, and with the top portion of the partial barrier preventing flow of the polluted gaseous substance through the partial barrier, and with the bottom portion of the partial barrier allowing continuity of an occupying liquid at the bottom parts of the partial barrier and the P.C.C. container. The P.C.C. container cap 9 can be connected to the P.C.C. container 17 or to any other component of the wet embodiment of the pollutant capturer and mobilizer. The P.C.C. container cap 9 can be attached to the cap support 34 or to the base structure 29 or to any other structure of the pollutant capturer and mobilizer or to any combination of the structures or to any component or any combination of components of the pollutant capturer and mobilizer, or to any existing stationary or mobile structure or vehicle. Schematics of the top and front views of the P.C.C. container cap 9 are shown in FIGS. 3A and 3B. The P.C.C. container cap 9 can have one or multiple inspection windows; each of the windows being equipped with a maintenance window cover 69 to allow access to inside the liquid P.C.C. container for maintenance and repair operations. The inspection windows and their associated maintenance window covers are not shown in FIG. 1, FIG. 3A, and FIG. 3B.

Referring to FIG. 1, the riser 10 is a flow passage that connects two components of the wet embodiment of the pollutant capturer and mobilizer together. In FIG. 1, the riser 10 connects the P.C.C. container cap 9 to the secondary distributor 11. One or multiple perforated disks 16 may be mounted inside each riser 10 to cover its cross-sectional area at desired locations, thus divide the body of polluted gaseous substance into many small polluted gaseous bodies as the body of the polluted gaseous substance passes through the perforated disks within the liquid P.C.C. 18. Dividing the body of the polluted gaseous substance into small bodies enhances capturing of polluting substances of the polluted gaseous substance as the small bodies propagate through the liquid P.C.C. 18. Details of the perforated disks that are mounted inside the riser 10 are not shown in FIG. 1.

Figure 4A:
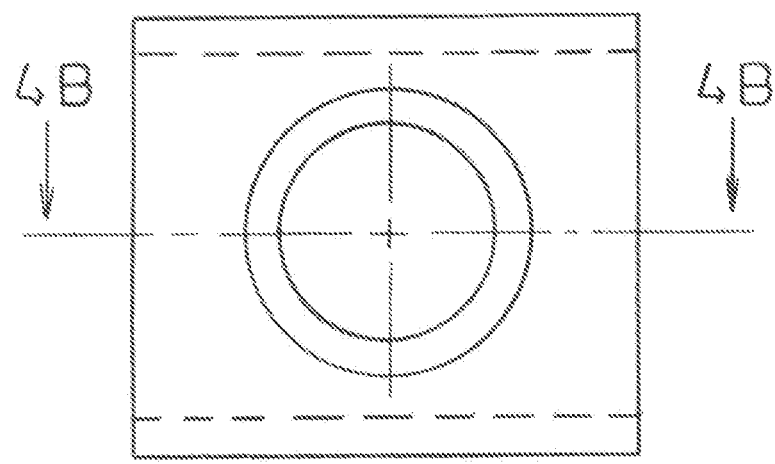
FIG. 4A and FIG. 4B are simplified schematics of the top and front views of the secondary distributor (component 11) as seen in FIG. 1.
Figure 4B:
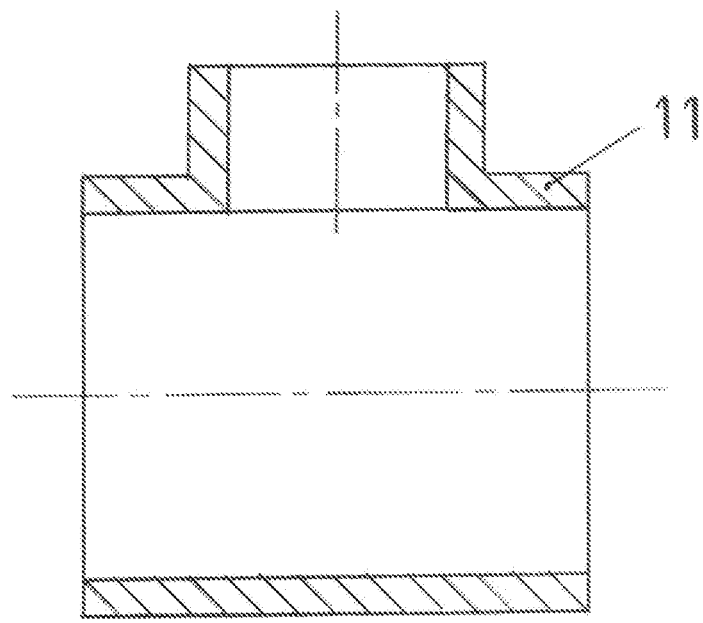

Referring to FIG. 1, the secondary distributor 11 is a flow passage with one inlet port and a desired number of exit ports; each exit port directs the body of polluted gaseous substance for further processing and removal of its polluting substances. The secondary distributor 11 can be attached to one or multiple secondary distributor supports 32, or to any other component of the wet embodiment of the pollutant capturer and mobilizer. Schematics of the top and front views of the secondary distributor 11 are shown in FIGS. 4A and 4B. FIGS. 4A and 4B show the secondary distributor 11 with one inlet port and two exit ports.

Referring to FIG. 1, one branch 12 is connected to each exit port of the secondary distributor 11. Each branch 12 has one upstream opening, one downstream opening, and one or multiple exit ports. Exit port of the branch 12 can be oriented in a desired direction so the body of polluted gaseous substance may exit the port in horizontal direction, or vertical upward direction, or vertical downward direction, or at any other angle with respect to a horizontal plane, or any combination of the above said directions. Each exit port of the branch 12 may be left open or connected to another component of the wet embodiment of the pollutant capturer and mobilizer, as desired.

Referring to FIG. 1, one plug 13 may be connected to the downstream opening of each branch 12 to prevent flow of the body of polluted gaseous substance through the downstream opening of the branch 12. The plug 13 may be replaced by an elbow or any other type of fittings, if desired.

Figure 5A:
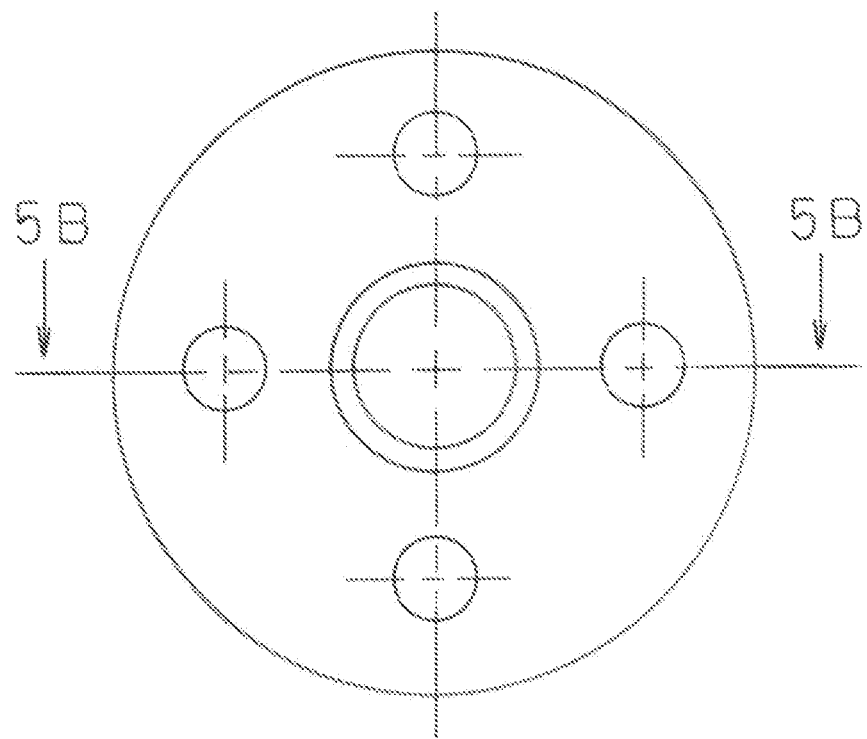
FIG. 5A and FIG. 5B are simplified schematics of the top and front views of the branch connector (component 14) as seen in FIG. 1.
Figure 5B:
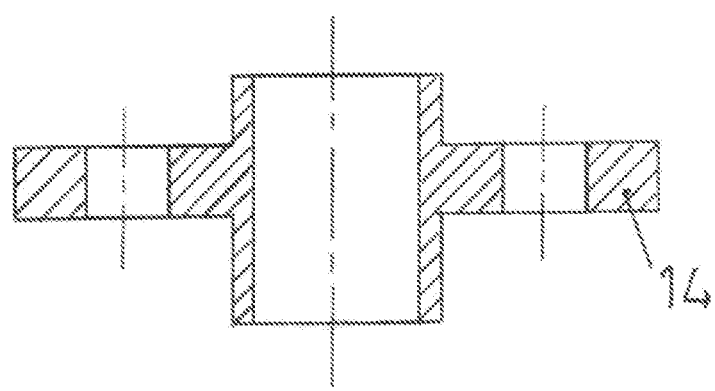

Referring to FIG. 1, the branch connector 14 has multiple flow passages; it has one flow passage in its central area and one or multiple flow passages distributed further away from its centerline. The central flow passage of the branch connector 14 is connected to an exit port of branch 12. The branch connector 14 can be connected to an exit port of the branch 12. Schematics of the top and front views of the branch connector 14 are shown in FIGS. 5A and 5B. FIGS. 5A and 5B show a branch connector 14 with four flow passages distributed further away from its centerline; any other desired number of the flow passages can be used as desired.

Referring to FIG. 1, the path extender 15 is a flow passage that is completely submerged in the liquid P.C.C. 18 and extends the flow path by which the body of polluted gaseous substance flows through the liquid P.C.C. 18. The path extender 15 is connected to a branch connector 14. The path extender 15 can be made of multiple coil segments connected to each other; each two adjacent coil segments are connected to each other by one perforated disk 16. Any desired number of the coil segments may be connected to each other, by the perforated disks, to make a path extender 15 with a desired flow path length. Each coil segment can have any desired number of turns or loops and can have one perforated disk 16 at each of its ending cross sectional areas. Each perforated disk 16 covers the entire cross-sectional area of the path extender 15 at a desired location, thus divide the body of polluted gaseous substance into many small polluted gaseous bodies as the body of polluted gaseous substance passes through the perforated disks that are submerged within the liquid P.C.C. 18. Dividing the body of polluted gaseous substance into many small polluted gaseous bodies enhances capturing of the polluting substances as the small polluted gaseous bodies propagate through the liquid P.C.C. 18.

Figure 6A:
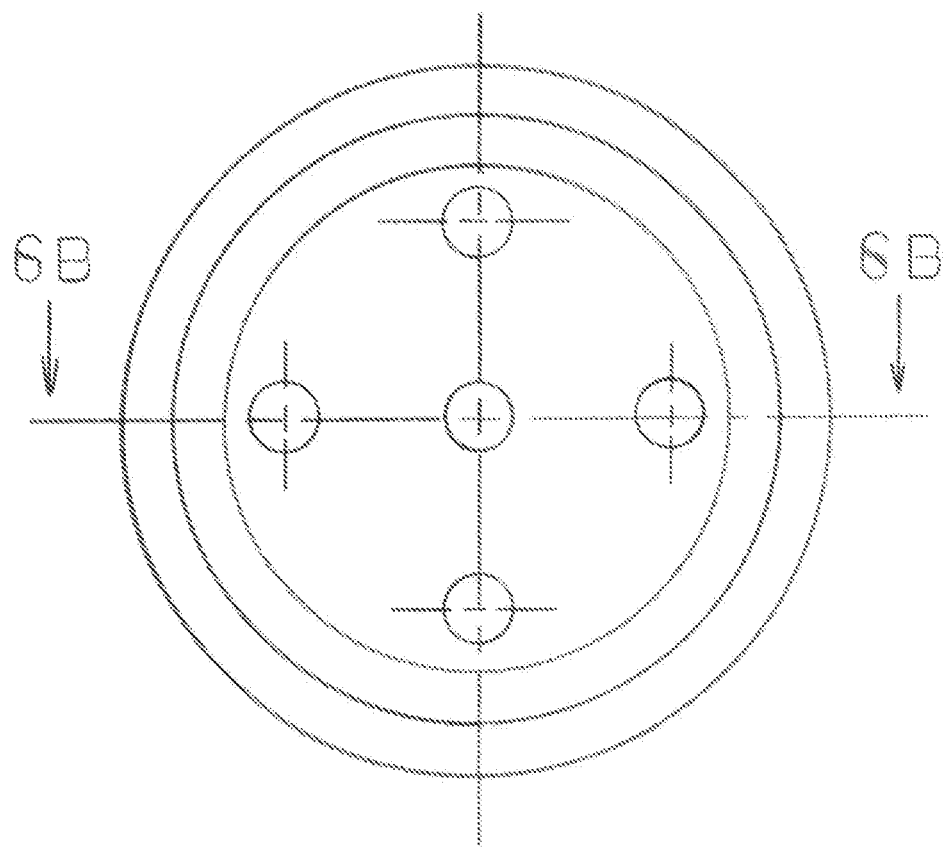
FIG. 6A and FIG. 6B are simplified schematics of the top and front views of the perforated disk (component 16) as seen in FIG. 1.
Figure 6B:
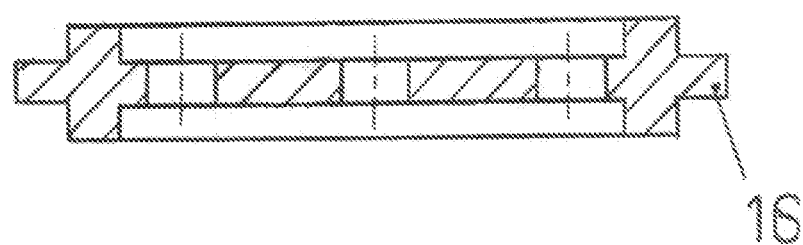

Referring to FIG. 1, the perforated disk 16 is a perforated flow passage that either connects two components of the wet embodiment of the pollutant capturer and mobilizer together or is mounted inside any component of the pollutant capturer and mobilizer as desired. The perforated disk can have any shape, dimensions, geometry, and any number of perforation holes. Schematics of the top and front views of the perforated disk 16 are shown in FIGS. 6A and 6B. FIGS. 6A and 6B show a perforated disk 16 with five perforation holes; any other desired number of the perforation holes can be used as desired.

Referring to FIG. 1, the P.C.C. container 17 is a container which contains a body of liquid P.C.C. 18 and has one or multiple other openings on its walls that can be used to connect other components of the wet embodiment of the pollutant capturer and mobilizer or used as inspection windows. Each inspection window is normally covered by a maintenance window cover 69; the maintenance window cover is removed temporarily to conduct inspection and maintenance operations as needed.

Referring to FIG. 1, the P.C.C. 18 of the wet embodiment of the pollutant capturer and mobilizer is a liquid or a mixture of liquids that can be used with or without any type of foaming agent, as desired, and can remove one or multiple types of polluting substances from a body of polluted gaseous substance as the body of polluted gaseous substance is brought in contact with the P.C.C. 18. The P.C.C. 18 fills up the P.C.C. container 17 up to a desired height. The P.C.C. 18 can remove one or multiple types of polluting substances of the body of polluted gaseous substance by dissolving or by absorbing or by formation of a solid substance or by denaturing or by consuming or by physical deposition or by altering the chemical properties of the polluting substances, or by a combination of some or all of the above said means.

Referring to FIG. 1, the gas divider 19 is a perforated component with any density of perforation holes, and with any size or combination of sizes of the perforation holes. Equivalently, the gas divider 19 may be built as a perforated tray or container with a natural or manufactured granular substance spread on the perforated tray or within the perforated container. The gas divider 19 is submerged in the body of the liquid P.C.C 18 and divides a body of polluted gaseous substance that flows through the P.C.C. 18 into many small polluted gaseous bodies to improve the effectiveness of capturing the polluting substances of the body of polluted gaseous substance as the body of polluted gaseous substance flows through the liquid P.C.C. 18. One or multiple gas dividers 19 can be used for each riser 10 of the wet embodiment of the pollutant capturer and mobilizer.

Referring to FIG. 1, the splash shield 20 is a perforated component and can be made with desired shape, size, geometry, with any population density of perforation holes, and with any size or combination of sizes of the perforation holes. Equivalently, the splash shield 20 may be built by a perforated tray or container with a natural or manufactured fibrous or spongy substance secured on the perforated tray or within the perforated container. The splash shield 20 is mounted at a level above the level of the liquid P.C.C. 18 inside the P.C.C. container 17 so it can prevent any liquid P.C.C. droplet from escaping the wet embodiment of the pollutant capturer and mobilizer and entering into the surrounding atmospheric air.

Referring to FIG. 1, the P.C.C. container exit port 21 is a flow passage that is mounted either on the P.C.C. container cap 9 or on the P.C.C. container 17 through which a gaseous substance can exit the P.C.C. container 17.

Referring to FIG. 1, the P.C.C. shield 22 is a flow passage that prevents any small quantities of liquid P.C.C 18 to be carried out of the wet embodiment of the pollutant capturer and mobilizer by the body of the polluted gaseous substance which exits the embodiment. The P.C.C. shield 22 might be a perforated disk or a body of natural or manufactured spongy or fibrous substance.

Referring to FIG. 1, the P.C.C. shield retainer 23 is a flow passage that secures the P.C.C. shield 22 in place. The P.C.C. shield retainer 23 is mounted on the P.C.C. container exit port 21.

Referring to FIG. 1, the float valve 24 controls the amount of the liquid P.C.C. 18 within the P.C.C. container 17. The float valve 24 can be mounted either on P.C.C. container 17 or on the P.C.C. container cap 9, or on any other component of the wet embodiment of the pollutant capturer and mobilizer; FIG. 1 shows the float valve 24 mounted on the P.C.C. container 17. The float valve 24 is also connected to an external source of liquid P.C.C. supply. When the amount of the liquid P.C.C. in the P.C.C. container 17 decreases, the level of the liquid P.C.C. in the P.C.C. container 17 drops; the drop in the level of the liquid P.C.C. 18 activates the float valve 24 to open and allow more liquid P.C.C. to enter into the P.C.C. container 17. When the height of the liquid P.C.C. in the P.C.C. container 17 reaches a desired level, the float valve 24 closes to stop the flow of the liquid P.C.C. into the P.C.C. container 17. The external source of liquid P.C.C. supply is not shown in FIG. 1. When a wet embodiment of the pollutant capturer and mobilizer includes multiple P.C.C. containers 17, a piping network can be used to connect all of the float valves to one or multiple external sources of liquid P.C.C. supply. The piping network connecting all the float valves is not shown in FIG. 1. Float valve 24 may have any desired structural details and made from desired materials or combination of materials.

Referring to FIG. 1, the fill up valve 25 is used to supply more P.C.C. 18 to the P.C.C. container 17 as desired. The fill up valve 25 can be mounted on either P.C.C. container 17 or on the P.C.C. container cap 9, or on any other component of the wet embodiment of the pollutant capturer and mobilizer; FIG. 1 shows the fill up valve 25 mounted on the P.C.C. container 17. When a wet embodiment of the pollutant capturer and mobilizer includes multiple P.C.C. containers 17, a piping network can be used to fill up all the liquid P.C.C. containers with liquid P.C.C. through the piping network. The piping network is not shown in FIG. 1. The fill up valve 25 may be any type of valve with any desired structural details and may be made from desired materials or combination of materials; it may be operated manually or by the use of one or any combination of electrical, magnetic, pneumatic, and hydraulic actuators.

Referring to FIG. 1, the P.C.C. container drain network 26 is a piping network that connects two components of the wet embodiment of the pollutant capturer and mobilizer together, or connects one component of the embodiment to atmosphere, or to an existing liquid storage, or to an existing piping network. The P.C.C. container drain network 26 is mounted at a low point of the P.C.C. container 17 and is used to empty the P.C.C. 18 from the P.C.C. container 17 as desired. When multiple P.C.C. containers 17 are used, a collecting piping network can be used to empty all of the P.C.C. containers from the liquid P.C.C., by their individual P.C.C. container drain network 26, through the collecting piping network. The collecting piping network is not shown in FIG. 1. The P.C.C. container drain network 26 can be mounted on the base structure 29, or on any other component or structure of the wet embodiment of the pollutant capturer and mobilizer, or on any combination of components and structures of the embodiment, or on any other existing structure. The P.C.C. container drain network 26 can include one or multiple valves; each valve may be any desired type of valves and may be made from desired materials or combination of materials. Each of the valves may be operated manually or by the use of one or any combination of electrical, magnetic, pneumatic, and hydraulic actuators. FIG. 1 shows the P.C.C. container drain network 26 with one valve, any other number of valves may be used as desired.

Referring to FIG. 1, a desired number of thermal fins 27, or arrays of the thermal fins, are attached to desired parts of the P.C.C. container 17, with a desired pattern, to enhance dissipation of heat and thermal energy that might be carried into the liquid P.C.C. 18 within the P.C.C. container 17 by a high-temperature body of polluted gaseous substance. The thermal fins 27, or array of thermal fins, can be built either as a single component or their combination with one or multiple other components of the wet embodiment of the pollutant capturer and mobilizer can be built as a single component by any desired manufacturing process.

Referring to FIG. 1, one or multiple sight glasses 28 can be connected to the P.C.C. container 17 to show level of different liquids that might be inside the P.C.C. container.

Referring to FIG. 1, the base structure 29 supports other components of the wet embodiment of the pollutant capturer and mobilizer, directly or indirectly, as desired. The base structure can be mounted on the ground or on a stationary foundation, or on any other existing stationary or mobile structure or on any type of vehicles. The base structure 29 includes rotary and sliding features which allow mounting, removal, or replacing other components of the wet embodiment of the pollutant capturer and mobilizer conveniently.

Referring to FIG. 1, one or multiple rain shields 30 are used to protect desired components of the wet embodiment of the pollutant capturer and mobilizer against rain or other undesired atmospheric conditions. Each rain shield can include one or multiple shield segments; shield segments can be built and/or attached to each other, or attached to any other component or structure of the wet embodiment of the pollutant capturer and mobilizer.

Referring to FIG. 1, the P.C.C. container support 31 is a structure that supports the P.C.C. container 17. The P.C.C. container support 31 can be mounted on the base structure 29 or on any other existing stationary or mobile structure or on any type of vehicles as desired. One or multiple P.C.C. container supports 31 may be used for each P.C.C. container 17; only one P.C.C. container support 31 is shown in FIG. 1.

Referring to FIG. 1, the secondary distributor support 32 is a structure that supports the secondary distributor 11. The secondary distributor support 32 can be mounted on the P.C.C. container 17 or on any other component of the wet embodiment of the pollutant capturer and mobilizer as desired. One or multiple secondary distributor supports 32 may be used for each secondary distributor 11; only one secondary distributor support 32 is shown in FIG. 1.

Referring to FIG. 1, the branch support 33 is a structure that supports the branch 12. The branch support 33 can be mounted on the P.C.C. container 17 or on any other component or structure of the wet embodiment of the pollutant capturer and mobilizer as desired. One or multiple branch supports 33 may be used for each branch 12; only one branch support 33 is shown in FIG. 1.

Referring to FIG. 1, the cap support 34 is a structure that supports the P.C.C. container cap 9. The cap support 34 can be mounted on the base structure 29 or on any other existing stationary or mobile structure or any type of vehicles as desired. One or multiple cap supports 34 may be used for each P.C.C. container cap 9; only one cap support 34 is shown in FIG. 1.

Referring to FIG. 1, the primary distributor support 35 is a structure that supports the primary distributor 4. The primary distributor support 35 can be mounted on the base structure 29 or on any other existing foundation or stationary or mobile structure or on any type of vehicle as desired. One or multiple primary distributor supports 35 may be used for each primary distributor 4; only one primary distributor support 35 is shown in FIG. 1.

Referring to FIG. 1, the liquid P.C.C. surface 36 shows the level of the liquid P.C.C. 18 inside the P.C.C. container 17. The liquid P.C.C. surface 36 is maintained at a desired level by supplying liquid P.C.C. 18, from an external supply source, to the P.C.C. container 17 through the float valve 24 or the fill up valve 25.

Referring to FIG. 1, the path extender support 37 is a structure that supports the path extender 15. The path extender support 37 can be mounted on the P.C.C. container 17 or on any other component or structure of the wet embodiment of the pollutant capturer and mobilizer as desired. One or multiple path extender supports 37 may be used for each path extender 15; only one path extender support 37 is shown in FIG. 1.

Referring to FIG. 1, the odor removal substance container 38 may be attached to any component of the wet embodiment of the pollutant capturer and mobilizer, as desired. The odor removal substance container 38 may contain a desired amount of a desired type of solid or liquid odor removal substance to generate a pleasant smell in the location where the wet embodiment of the pollutant capturer and mobilizer is in operation. The odor removal substance container 38 may be attached to any component or combination of components of the wet embodiment of the pollutant capturer and mobilizer as desired. The odor removal substance may also be added to the liquid P.C.C. 18 directly, as desired. One or multiple odor removal substance containers 38 may be used with the wet embodiment of the pollutant capturer and mobilizer; FIG. 1 shows only one odor removal substance container 38 mounted on the P.C.C. container cap 9. The odor removal substance container 38 can be mounted on any component or structure or any combination of components and structures of the wet embodiment of the pollutant capturer and mobilizer.

Referring to FIG. 1, the odor removal substance container 38, the P.C.C. container exit port 21, the riser 10, the P.C.C. container cap 9, and the adaptor 8 can all be combined together to form a single component with the single component to be built from any desired material and by any manufacturing processor or processes as desired.

Referring to FIG. 1, the P.C.C. outlet network 39 is a flow passage that connects two components of the pollutant capturer and mobilizer together. In FIG. 1, the P.C.C. outlet network 39 connects the P.C.C. container 17 to the P.C.C. pump inlet valve 40. The P.C.C. outlet network 39 can be mounted on the base structure 29, or on any other component or structure or on any combination of components and structures of the wet embodiment of the pollutant capturer and mobilizer.

Referring to FIG. 1, the P.C.C. pump inlet valve 40 is a valve that connects two components of the pollutant capturer and mobilizer together. In FIG. 1, the P.C.C. pump inlet valve 40 connects the P.C.C. outlet network 39 to the P.C.C. pump inlet network 41. The valve can be used to restrict flow of the liquid P.C.C. 18 out of the P.C.C. container 17, as desired. The P.C.C. pump inlet valve 40 may be any desired type of valves and may be made from desired materials or combination of materials; it may be operated manually or by the use of one or any combination of electrical, magnetic, pneumatic, and hydraulic actuators. The P.C.C. pump inlet valve 40 can be mounted on the base structure 29, or on any other component or structure of the wet embodiment of the pollutant capturer and mobilizer.

Referring to FIG. 1, the P.C.C. pump inlet network 41 is a flow passage that connects two components of the wet embodiment of the pollutant capturer and mobilizer together. In FIG. 1, the P.C.C. pump inlet network 41 connects the P.C.C. pump inlet valve 40 to the P.C.C. pump 42. The P.C.C. pump inlet network 41 can be mounted on the base structure 29, or on any other structure or component of the wet embodiment of the pollutant capturer and mobilizer.

Referring to FIG. 1, the P.C.C. pump 42 connects two components of the wet embodiment of the pollutant capturer and mobilizer together. In FIG. 1, the P.C.C. pump 42 connects the P.C.C. pump inlet network 41 to the P.C.C. pump outlet network 43 together to circulate the liquid P.C.C. 18 into and out of the P.C.C. container 17, as desired. Any type of commercially available pumps with their driving source of power can be used. The P.C.C. pump 42 and its driving source of power can be mounted on the base structure 29, or on any combination of other structures and components of the wet embodiment of the pollutant capturer and mobilizer.

Referring to FIG. 1, the P.C.C. pump outlet network 43 is a flow passage that connects two components of the wet embodiment of the pollutant capturer and mobilizer together. In FIG. 1, the P.C.C. pump outlet network 43 connects the P.C.C. pump 42 to the P.C.C. pump outlet valve 44 together. The P.C.C. pump outlet network 43 can be mounted on the base structure 29, or on any combination of other structures and components of the wet embodiment of the pollutant capturer and mobilizer.

Referring to FIG. 1, the P.C.C. pump outlet valve 44 is a valve that connects two components of the wet embodiment of the pollutant capturer and mobilizer together. In FIG. 1, the P.C.C. pump outlet valve 44 connects the P.C.C. pump outlet network 43 to the P.C.C. inlet network 45. The valve can restrict flow of the liquid P.C.C. 18 out of the P.C.C. container 17, as desired. The P.C.C. pump outlet valve 44 may be any desired type of valve and may be made from desired materials or combination of materials; it may be operated manually or by the use of one or any combination of electrical, magnetic, pneumatic, and hydraulic actuators. The P.C.C. pump outlet valve 44 can be mounted on the base structure 29 or any other structure or component of the pollutant capturer and mobilizer.

Referring to FIG. 1, the P.C.C. inlet network 45 is a flow passage that connects two components of the wet embodiment of the pollutant capturer and mobilizer together. In FIG. 1, the P.C.C. inlet network 45 connects the P.C.C. pump outlet valve 44 to the spray network 46 through an opening on the wall of the of the P.C.C. container 17, as desired. The P.C.C. inlet network 45 can be mounted on the base structure 29, or on any other structure or component of the wet embodiment of the pollutant capturer and mobilizer.

Referring to FIG. 1, the spray network 46 is a flow passage that includes a desired number of branches with a desired number of spray nozzles 47 mounted on each of the branches. The spray network 46 is connected to the P.C.C. inlet network 45 through an opening on the wall of the of the P.C.C. container 17, as desired. The spray network 46 can be mounted on the spray network supports 48 or on any other structure or component of the wet embodiment of the pollutant capturer and mobilizer. One or multiple spray network 46 may be used with a single P.C.C. container 17; only one spray network 46 is shown in FIG. 1.

Referring to FIG. 1, the spray nozzles 47 can be any type of commercially available nozzles and are mounted on the branches of the spray network 46 as desired. The number of spray nozzles 47 and distance between them is such that they can spray the liquid P.C.C. 18 over the entire cross-sectional area of the P.C.C. container 17, as desired. The spray nozzles 47 can be mounted on the spray network 46 or on the P.C.C. container 17 or on any other structure or component of the wet embodiment of the pollutant capturer and mobilizer.

Referring to FIG. 1, one or multiple spray network supports 48 may be used to support the spray network 46. The spray network supports 48 can be attached to the P.C.C. container 17 or to any other structure or component of the wet embodiment of the pollutant capturer and mobilizer. One or multiple spray network supports 48 may be used for each spray network 46; only one spray network support 48 is shown in FIG. 1.

Referring to FIG. 1, one or multiple riser support 49 may be used to secure the riser 10 in place, as desired. The riser supports 49 may be attached to the P.C.C. container 17 or to any other component or structure of the wet embodiment of the pollutant capturer and mobilizer. One or multiple riser supports 49 may be used for each riser 10; only one riser supports 49 is shown in FIG. 1.

Referring to FIG. 1, the overflow network 50 is a piping network that connects two components of the wet embodiment of the pollutant capturer and mobilizer together, or connects one component of the embodiment to atmosphere or to an existing liquid storage or to an existing piping network. In FIG. 1, the overflow network 50 connects the P.C.C. container 17 to the liquid storage container 51 to allow flow of the overflow liquid from the P.C.C. container 17 into the liquid storage container 51. The overflow network 50 can be mounted on the base structure 29 or on any combination of other structures and components of the wet embodiment of the pollutant capturer and mobilizer.

Referring to FIG. 1, the liquid storage container 51 is a container that stores any liquid that is discharged from the P.C.C. container 17 through the overflow network 50. The liquid storage container 51 is equipped with one or multiple vents to maintain it at atmospheric pressure; the liquid storage container 51 is also equipped with one or multiple sight glasses to show the level of liquid within the liquid storage container. The vents and sight glasses are not shown in FIG. 1. The liquid storage container 51 can be mounted on the base structure 29 or on any combination of the other components and structures of the wet embodiment of the pollutant capturer and mobilizer.

Referring to FIG. 1, the overflow network isolating valve 52 is a valve that connects two components of the wet embodiment of the pollutant capturer and mobilizer together, or connects one component of the wet embodiment of the pollutant capturer and mobilizer to atmosphere or to an existing facility or to an existing piping network. In FIG. 1, the overflow network isolating valve 52 connects two components of the overflow network 50 together and can restrict discharge of liquid from the P.C.C. container 17 as desired. The overflow network isolating valve 52 may be any desired type of valves and may be made from desired materials or combination of materials; it may be operated manually or by the use of one or any combination of electrical, magnetic, pneumatic, and hydraulic actuators. The overflow network isolating valve 52 can be mounted on the base structure 29 or on any combination of other components and structures of the wet embodiment of the pollutant capturer and mobilizer.

Referring to FIG. 1, the liquid storage container overflow isolating valve 53 is a valve that connects two components of the wet embodiment of the pollutant capturer and mobilizer together, or connects one component of the wet embodiment of the pollutant capturer and mobilizer to atmosphere or to an existing facility or to an existing piping network. In FIG. 1, the liquid storage container overflow isolating valve 53 connects two components of the overflow network 50 together and can restrict flow of liquid into the liquid storage container 51 as desired. The liquid storage container overflow isolating valve 53 may be any desired type of valves and may be made from desired materials or combination of materials; it may be operated manually or by the use of one or any combination of electrical, magnetic, pneumatic, and hydraulic actuators. The liquid storage container overflow isolating valve 53 can be mounted on the base structure 29, or on any other component or structure of the wet embodiment of the pollutant capturer and mobilizer.

Referring to FIG. 1, the overflow network filtering box 54 includes one or multiple filtering components and is used to prevent particulate substances from exiting the P.C.C. container 17 through the overflow network 50. One overflow network filtering box 54 is shown in FIG. 1; any other number of the overflow network filtering box 54 can be used as desired. Each filtering component of the overflow network filtering box 54 can be a perforated disk, or a porous substance or cloth or porous paper, or a body of natural or manufactured spongy or fibrous substance. The filtering component can be mounted on a frame; the frame of the overflow network filtering box 54 is not shown in FIG. 1. The overflow network filtering box 54 can be mounted on the base structure 29, or on any combination of other components and structures of the wet embodiment of the pollutant capturer and mobilizer as desired. The frame of the overflow network filtering box 54 can be made from structural components and with metal or non-metal materials or a combination of metal and non-metal materials. The frame of the overflow network filtering box 54 can be built as a single component or assembly of multiple components connected to each other. The frame of the overflow network filtering box 54 can be attached to the overflow network filtering box 54 as desired.

Referring to FIG. 1, the drain network 55 is a piping network that connects two components of the wet embodiment of the pollutant capturer and mobilizer together, or connects one component of the embodiment to atmosphere or to an existing liquid storage or to an existing piping network. FIG. 1 shows the drain network 55 connecting the P.C.C. container 17 to the liquid storage container 51. The drain network 55 can be mounted on the base structure 29, or on any combination of other components and structures of the wet embodiment of the pollutant capturer and mobilizer.

Referring to FIG. 1, the drain network isolating valve 56 is a valve that connects two components of the wet embodiment of the pollutant capturer and mobilizer together, or connects one component of the wet embodiment of the pollutant capturer and mobilizer to atmosphere or to an existing facility or to an existing piping network. In FIG. 1, the drain network isolating valve 56 connects two components of the drain network 55 together and can restrict discharge of liquid from the P.C.C. container 17 as desired. The drain network isolating valve 56 may be any desired type of valves and may be made from desired materials or combination of materials; it may be operated manually or by the use of one or any combination of electrical, magnetic, pneumatic, and hydraulic actuators. The drain network isolating valve 56 can be mounted on the base structure 29, or on any combination of other components and structures of the wet embodiment of the pollutant capturer and mobilizer.

Referring to FIG. 1, the upstream isolating valve 57 is a valve that connects two components of the wet embodiment of the pollutant capturer and mobilizer together, or connects one component of the wet embodiment of the pollutant capturer and mobilizer to atmosphere or to an existing facility or to an existing piping network. In FIG. 1, the upstream isolating valve 57 connects two components of the drain network 55 together and can restrict discharge of liquid from the P.C.C. container 17 as desired. The upstream isolating valve 57 may be any desired type of valves and may be made from desired materials or combination of materials; it may be operated manually or by the use of one or any combination of electrical, magnetic, pneumatic, and hydraulic actuators. The upstream isolating valve 57 can be mounted on the base structure 29, or on any combination of other components and structures of the wet embodiment of the pollutant capturer and mobilizer.

Referring to FIG. 1, the pressure relief valve 58 is activated by its upstream pressure; it becomes open when hydrostatic pressure acting on it reaches a desired magnitude. The pressure relief valve 58 connects two components of the wet embodiment of the pollutant capturer and mobilizer together, or connects one component of the wet embodiment of the pollutant capturer and mobilizer to atmosphere or to an existing facility or to an existing piping network. In FIG. 1, the pressure relief valve 58 connects two components of the drain network 55 together and can allow flow of liquid from the P.C.C. container 17 upon activation, as desired. The pressure relief valve 58 may have any desired structural details and may be made from desired materials or combination of materials; it is actuated to open by the use of one or any combination of electrical, magnetic, pneumatic, and hydraulic actuators when its upstream hydrostatic pressure reaches a desired magnitude. The pressure relief valve 58 can be mounted on the base structure 29, or on any combination of other components and structures of the wet embodiment of the pollutant capturer and mobilizer.

Referring to FIG. 1, the downstream isolating valve 59 is a valve that connects two components of the wet embodiment of the pollutant capturer and mobilizer together, or connects one component of the wet embodiment of the pollutant capturer and mobilizer to atmosphere or to an existing facility or to an existing piping network. In FIG. 1, the downstream isolating valve 59 connects two components of the drain network 55 together and can restrict discharge of liquid from the P.C.C. container 17 as desired. The downstream isolating valve 59 may be any desired type of valves and may be made from desired materials or combination of materials; it may be operated manually or by the use of one or any combination of electrical, magnetic, pneumatic, and hydraulic actuators. The downstream isolating valve 59 can be mounted on the base structure 29, or on any combination of other components and structures of the wet embodiment of the pollutant capturer and mobilizer.

Referring to FIG. 1, the storage container drain isolating valve 60 is a valve that connects two components of the wet embodiment of the pollutant capturer and mobilizer together, or connects one component of the wet embodiment of the pollutant capturer and mobilizer to atmosphere or to an existing facility or to an existing piping network. In FIG. 1, the storage container drain isolating valve 60 connects two components of the drain network 55 together and can restrict discharge of liquid from the P.C.C. container 17 as desired. The storage container drain isolating valve 60 may be any desired type of valves and may be made from desired materials or combination of materials; it may be operated manually or by the use of one or any combination of electrical, magnetic, pneumatic, and hydraulic actuators. The storage container drain isolating valve 60 can be mounted on the base structure 29 or on any combination of other components and structures of the wet embodiment of the pollutant capturer and mobilizer.

Referring to FIG. 1, the drain network filtering box 61 includes one or multiple filtering components and is used to prevent particulate substance from exiting the P.C.C. container 17 through the drain network 55. One drain network filtering box 61 is shown in FIG. 1; any other number of the drain network filtering box 61 can be used as desired. The filtering component of the drain network filtering box 61 can be a perforated disk, or a porous substance, cloth or porous paper as desired, or a body of natural or manufactured spongy or fibrous substance. The filtering component can be mounted on a frame; the frame of the drain network filtering box 61 is not shown in FIG. 1. The drain network filtering box 61 can be mounted on the base structure 29 or on any combination of the other components and structures of the wet embodiment of the pollutant capturer and mobilizer. The frame of the drain network filtering box 61 can be made from structural components; it can be made from metal or non-metal materials or a combination of metal and non-metal materials. The frame of the drain network filtering box 61 can be built as a single component or assembly of multiple components connected to each other as desired. The frame of the drain network filtering box 61 can be attached to the drain network filtering box 61 as desired.

Referring to FIG. 1, the liquid storage container drain network 62 is a piping network that connects two components of the wet embodiment of the pollutant capturer and mobilizer together, or connects one component of the embodiment to atmosphere or to an existing facility or to an existing piping network. The liquid storage container drain network 62 is mounted at a low point of the liquid storage container 51 and is used to dispose the overflown liquid which is collected in the liquid storage container 51, as desired.

Referring to FIG. 1, the liquid storage container drain valve 63 is included in the liquid storage container drain network 62 and can control flow of liquid from the liquid storage container 51 as desired. The liquid storage container drain valve 63 is a valve that connects two components of the wet embodiment of the pollutant capturer and mobilizer together, or connects one component of the wet embodiment of the pollutant capturer and mobilizer to atmosphere or to an existing facility or to an existing piping network, as desired. The existing facility or piping network is not shown in FIG. 1. In FIG. 1, the liquid storage container drain valve 63 connects two components of the liquid storage container drain network 62 together and can restrict discharge of liquid from the liquid storage container 51 as desired. The liquid storage container drain valve 63 may be any desired type of valves and may be made from desired materials or combination of materials; it may be operated manually or by the use of one or any combination of electrical, magnetic, pneumatic, and hydraulic actuators. The liquid storage container drain valve 63 can be mounted on the base structure 29, or on any combination of the other components and structures of the wet embodiment of the pollutant capturer and mobilizer as desired.

Referring to FIG. 1, the spare network 64 is a piping network that connects two components of the wet embodiment of the pollutant capturer and mobilizer together, or connects one component of the wet embodiment of the pollutant capturer and mobilizer to atmosphere or to an existing facility or to an existing piping network. The existing facility or piping network is not shown in FIG. 1. One or multiple spare network 64 can be used with each P.C.C. container 17; FIG. 1 shows one spare network 64 connected to the P.C.C. container 17. The spare network 64 can be mounted on the base structure 29, or on any combination of the other components and structures of the wet embodiment of the pollutant capturer and mobilizer as desired.

Referring to FIG. 1, the spare network valve 65 is included in the spare network 64 and can control flow of any liquid from or into the P.C.C. container 17 as desired. The spare network valve 65 can connect two components of the wet embodiment of the pollutant capturer and mobilizer together, or can connect one component of the wet embodiment of the pollutant capturer and mobilizer to atmosphere or to an existing facility or to an existing piping network, as desired. The existing facility or piping network is not shown in FIG. 1. In FIG. 1, the spare network valve 65 connects two components of the spare network 64 together. The spare network valve 65 may be any desired type of valves and may be made from desired materials or combination of materials; it may be operated manually or by the use of one or any combination of electrical, magnetic, pneumatic, and hydraulic actuators. The spare network valve 65 can be mounted on the base structure 29, or on any combination of the other components and structures of the wet embodiment of the pollutant capturer and mobilizer.

Referring to FIG. 1, the spare network filtering box 66 includes one or multiple filtering components and is used to prevent particulate substance from exiting the P.C.C. container 17 through the spare network 64. One spare network filtering box 66 is shown in FIG. 1; any other number of the spare network filtering box 66 can be used as desired. The filtering component of the spare network filtering box 66 can be a perforated disk, or a porous substance, cloth or porous paper as desired, or a body of natural or manufactured spongy or fibrous substance. The filtering component can be mounted on a frame; the frame of the spare network filtering box 66 is not shown in FIG. 1. The spare network filtering box 66 can be mounted on the base structure 29, or on any combination of the other components and structures of the wet embodiment of the pollutant capturer and mobilizer. The frame of the spare network filtering box 66 can be made from structural components; it can be made from metal or non-metal materials or a combination of metal and non-metal materials. The frame of the spare network filtering box 66 can be built as a single component or assembly of multiple components connected to each other. The frame of the spare network filtering box 66 can be attached to the spare network filtering box 66 as desired.

Referring to FIG. 1, the maintenance fill up network 67 is a piping network that connects an external source of pressurized water or compressed air to one component of the wet embodiment of the pollutant capturer and mobilizer to inject pressurized water or compressed air into components and flow paths of the wet embodiment of the pollutant capturer and mobilizer and clean the components and flow paths from any particulate substances that might accumulate within the components and flow paths. FIG. 1 show the maintenance fill up network 67 connected to the adaptor 8. The maintenance fill-up network 67 can be mounted on the base structure 29, or on any combination of the other components and structures of the wet embodiment of the pollutant capturer and mobilizer. The maintenance fill-up network 67 can include one or multiple valves; each of the valves may be any desired type of valves and may be made from desired materials or combination of materials; it may be operated manually or by the use of one or any combination of electrical, magnetic, pneumatic, and hydraulic actuators. FIG. 1 shows the maintenance fill-up network 67 with one valve, any other number of valves may be used as desired.

Referring to FIG. 1, one or multiple maintenance drain network 68 can be connected to the branch 12 or the secondary distributor 11, as desired, to allow draining of the injected pressurized water or air or any other cleaning fluid and any accumulated particulate substances from the riser, secondary distributor, branch, and their interconnected components that are housed within the P.C.C. container 17. The maintenance drain network 68 is mounted at a low point of either the branch 12 or the secondary distributor 11, or on both of them as desired. One maintenance drain network 68 is shown in FIG. 1; any other number of the maintenance drain network 68 may be used as desired. The maintenance drain network 68 can include one or multiple valves; each of the valves may be any desired type of valves and may be made from desired materials or combination of materials; it may be operated manually or by the use of one or any combination of electrical, magnetic, pneumatic, and hydraulic actuators. FIG. 1 shows the maintenance drain network 68 with one valve, any other number of valves may be used as desired.

Referring to FIG. 1, one maintenance window cover 69 is used to cover each inspection window on the walls of the P.C.C. container 17; the window provides access to the components of the wet embodiment of the pollutant capturer and mobilizer, that are housed inside the P.C.C. container 17, for necessary inspection and maintenance operations. One inspection window with its associated maintenance window cover 69 is shown in FIG. 1; any other number of the inspection windows and maintenance window cover 69 may be used for each P.C.C. container 17 as desired. The maintenance window cover 69 can be mounted on the inspection window of the P.C.C. container 17 as desired. One or multiple inspection windows; each of the windows being equipped with a maintenance window cover 69 may also be built into the P.C.C. container cap 9 to allow access to inside the liquid P.C.C. container 17 for maintenance and repair operations. The inspection windows and their associated maintenance window covers 69 are not shown in FIGS. 3A and 3B.

Referring to FIG. 1, all other necessary equipment and instrumentation will be used to assure that the wet embodiment of the pollutant capturer and mobilizer for all applications function safely and expectedly, as desired.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, any component of the wet embodiment of the pollutant capturer and mobilizer for any of its applications can be built by any type of manufacturing processes such as welding, soldering, casting, die casting, forging, extrusion, sewing, thermal fitting, press fitting, cutting, bending, punching, use of adhesives, Snap-on, or any other existing manufacturing process, or any combination of the manufacturing processes.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, any component of the wet embodiment of the pollutant capturer and mobilizer for any of its applications can be built as a single part or assembly of multiple parts connected to each other by flanges, use of threaded features, bolts, nuts, and washers, U-bolts, anchor bolts, screws, pivots, rivets, pins, retaining rings, clamps, hangers, hinges, cables, ropes, chains, any type of quick release fitting and couplings, any type of adjustable quick tie strap, any type of twist tie, any type of cable tie, any type of buttons or Snap buttons, any type of zippers, any other type of fasteners, welding, soldering, adhesives, sewing, thermal fitting, press fitting, Snap-on features, magnets, hinges, spindles, any type of springs, any type of ball bearing or sliding bearings, or any combination of the above said means.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, any component of the wet embodiment of the pollutant capturer and mobilizer for any of its applications can be built either as a single component or its combination with one or multiple other components of the embodiment can be built as a single component.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, each component of the wet embodiment of the pollutant capturer and mobilizer for any of its applications can have any desired shape, geometry, and dimensions and can be made from metal or non-metal materials, or a combination of metal and non-metal materials.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, any component of the wet embodiment of the pollutant capturer and mobilizer for any of its applications can have a uniform cross sectional area or a variable cross sectional area, or a combination of both uniform and variable cross sectional areas as desired.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, any component of the wet embodiment of the pollutant capturer and mobilizer for any of its applications can have a desired number of attachments by which the component can be lifted for installation or maintenance operations or by which the component can be mounted on or attached to another component of the embodiment or any existing structure or chimney or stack or a vehicle or a vehicle's exhaust pipe, if desired; the attachments are not shown FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, any component of the wet embodiment of the pollutant capturer and mobilizer for any of its applications can be connected to other components of the embodiment or to any existing structure or plant or facility or piping network or chimney or stack or vehicle's exhaust pipe by flanges, use of threaded feature, bolts, nuts, and washers, U-bolts, anchor bolts, screws, pivots, rivets, pins, retaining rings, clamps, hangers, hinges, cables, ropes, chains, any type of quick release fitting and couplings, any type of adjustable quick tie strap, any type of twist tie, any type of cable tie, any type of buttons or Snap buttons, any type of zippers, any other type of fasteners, welding, soldering, adhesives, sewing, thermal fitting, press fitting, Snap-on features, magnets, hinges, spindles, any type of springs, any type of ball bearing or sliding bearings, or any combination of the above said means.

Referring to FIG. 1, FIG. 3A and FIG. 3B, FIG. 4A and FIG. 4B, FIG. 5A and FIG. 5B, FIG. 6A and FIG. 6B, FIG. 7, FIG. 8A and FIG. 8B, FIG. 16, FIG. 17A and FIG. 17B, and FIG. 18, any component of the wet embodiment of the pollutant capturer and mobilizer for any of its applications can be attached to or mounted on another component or structure of the embodiment or any combination of components and structures of the embodiment or any other existing structure or chimney or stack or vehicle or vehicle's exhaust pipe using metal or non-metal or a combination of metal and non-metal structural components, flanges, welding, soldering, bolts, nuts, washers, screws, U-bolts, anchor bolts, use of threaded features, pins, retaining rings, clamps, hangers, hinges, cables, ropes, chains, pivots, rivets, any type of quick release fitting and couplings, any type of adjustable quick tie strap, any type of twist tie, any type of cable tie, any type of buttons or Snap buttons, any type of zippers, any other type of fasteners, sewing, adhesives, thermal fitting, press fitting, Snap-on features, magnets, hinges, spindles, any type of springs, any type of ball bearing or sliding bearings, or any combination of the above said means as desired.

Figure 7:
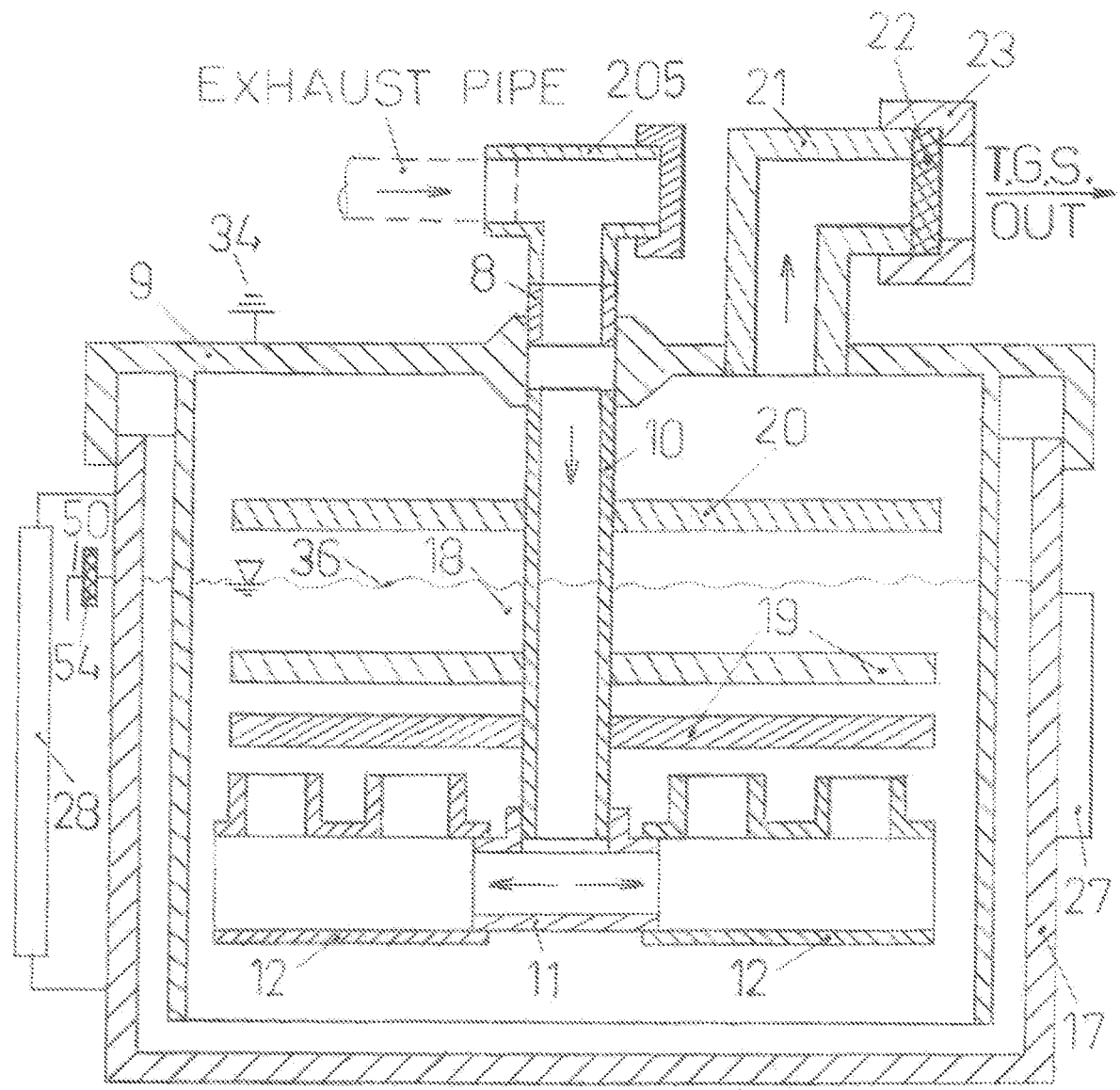
FIG. 7 is a simplified schematic of the simplified wet embodiment of the pollutant capturer and mobilizer that can be used to capture polluting substances from a body of polluted gaseous substance that flows in a vehicle's exhaust pipe.

Referring to FIG. 7, a wet embodiment of the pollutant capturer and mobilizer with fewer components can be connected to a vehicle's exhaust pipe to capture polluting substances from a body of polluted gaseous substance that flows within the exhaust pipe. The inlet connector 205 is connected to the vehicle's exhaust pipe; the inlet connector is equipped with a removable cap with the cap being removed temporarily to get access to inside the exhaust pipe for emission testing that is required for vehicle registration. Some of the components shown in FIG. 7 might be excluded from the wet embodiment of the pollutant capturer and mobilizer for vehicle's exhaust pipe application as desired. The inclusion of other components of the wet embodiment of the pollutant capturer and mobilizer, as seen in FIG. 1, is optional for the wet embodiment of the pollutant capturer and mobilizer for vehicle's exhaust pipe application.

Figure 8A:
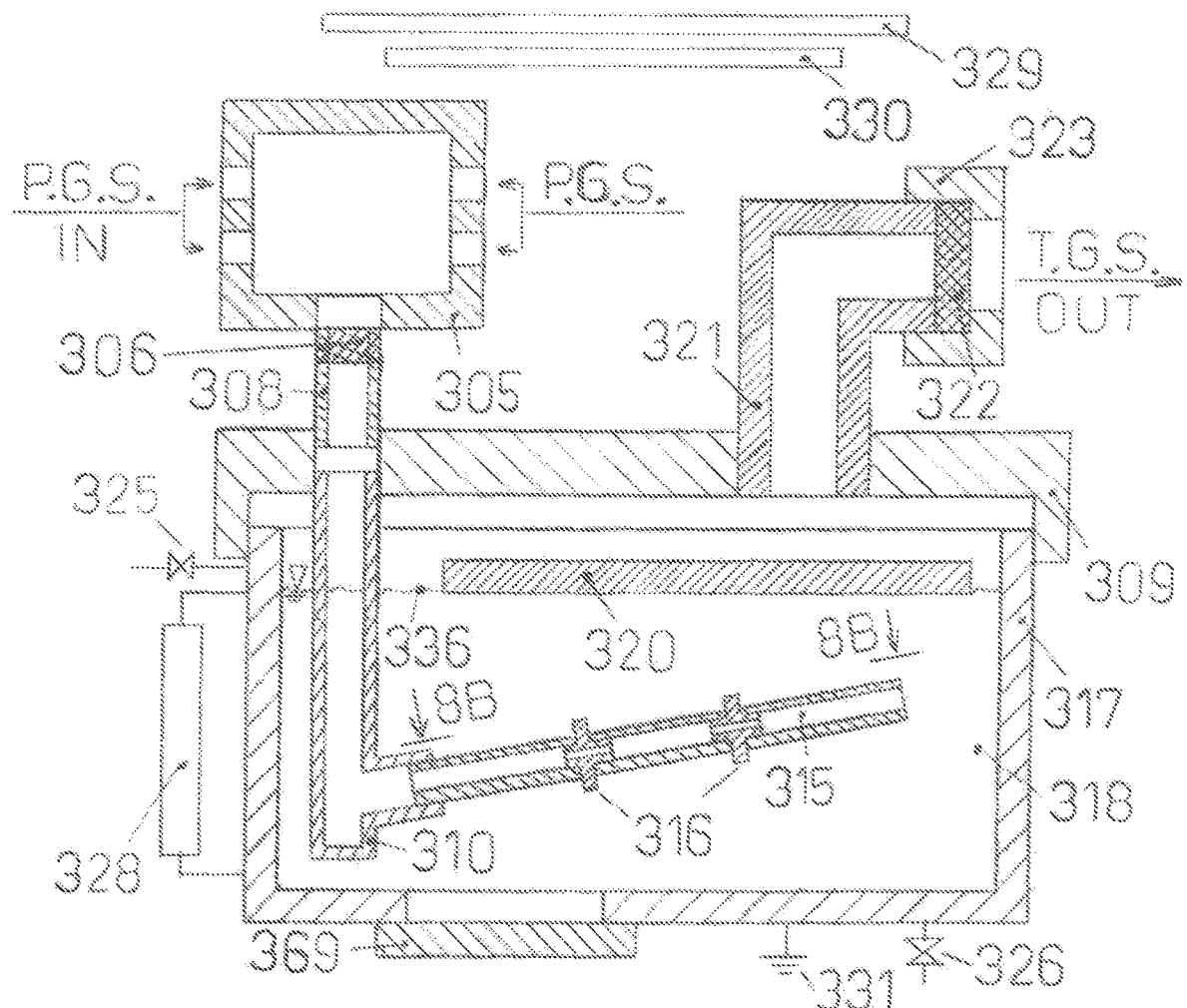
FIG. 8A and FIG. 8B are simplified schematics of the front and auxiliary view of the simplified wet embodiment of the pollutant capturer and mobilizer that can be used to capture $CO_2$ and other gaseous or particulate polluting substances from atmospheric air without using any type of power driven flow establishing device such as pump, fan, or compressor.
Figure 8B:
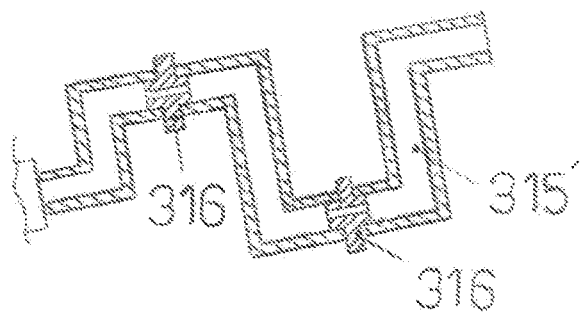

Referring to FIG. 8A and FIG. 8B, a wet embodiment of the pollutant capturer and mobilizer with fewer components, and with produced crude oil, or other types of synthetic or manufactured oil used as the liquid P.C.C. 318, can be used to capture particulate and gaseous polluting substances such as $CO_2$ from atmospheric air without using any flow-establishing device box or flow-establishing devices such as pumps, fans, and compressors. Exclusion of one or more components as seen in FIG. 8A and FIG. 8B is optional; addition of one or more components, as seen in FIG. 1, to FIG. 8A and FIG. 8B is optional.

Referring to FIG. 8A and FIG. 8B, the inlet connector 305 has one of its ends connected to one component of the wet embodiment of the pollutant capturer and mobilizer and has one or multiple other openings on its surfaces, with the openings being exposed to an atmospheric body of polluted gaseous substance, and with the openings having a much larger total cross-sectional area than the smaller end that is connected to another component of the wet embodiment of the pollutant capturer and mobilizer. Additionally, the inlet connector 305 can have one or multiple arrays of flappers mounted on each of the openings on its surface; each flapper can rotate about a pin only in one direction, thus flappers serve as check valves and allow the atmospheric body of polluted gaseous substance to only enter into the inlet connector 305 through the openings on its surface. The flappers and their associated pins are not shown in FIG. 8A and FIG. 8B. Secondary screen boxes 306 might also be mounted on the openings on the surfaces of the inlet connector 305 if desired; the screen boxes 306 are not shown in FIG. 8A and FIG. 8B.

Referring to FIG. 8A and FIG. 8B, upon passing through the flappers and entering into the inlet connector 305 through the openings on its surface, the atmospheric body of polluted gaseous substance will then exit the inlet connector 305 through its smaller end, thus with an increased velocity, and flows through other components of the wet embodiment of the pollutant capturer and mobilizer and can enter into the liquid P.C.C. 318, because of its increased velocity on its own with no need to any flow-establishing device box or flow-establishing devices such as pumps, fans, or compressors.

Referring to FIG. 8A and FIG. 8B, because of the path extender 315 that is completely submerged within the body of the liquid P.C.C. 318, the body of the polluted gaseous substance flows through a greater length in a small P.C.C. container 317. The path extender 315 is mounted at some upward angle to allow the body of polluted gaseous substance to flow upward as it flows within the path extender. The splash shield 320 is partially or totally built with a low-density material so it can stay afloat on any liquid that may occupy the P.C.C. container 317.

Referring to FIG. 8A and FIG. 8B, the riser 310 is partially or totally built with flexible materials; with its said flexible part the riser is connected to the path extender 315 that is completely submerged within the body of the liquid P.C.C. 318. The path extender 315 is also attached to the splash shield 320 by at least two pieces of ropes or other flexible strings with different lengths to keep the path extender 315 at an angle and at a small distance below the splash shield 320 which is afloat on the surface of the liquid P.C.C. 318. The ropes or other flexible strings are not shown in FIG. 8A and FIG. 8B.

Referring to FIG. 8A and FIG. 8B, an increase in the volume, thus the height, of liquid within the P.C.C. container 317 results in an upward movement of the splash shield 320 as well as the path extender 315, that is completely submerged within the body of the liquid P.C.C. 318, which is attached to the splash shield 320. Therefore, the height of liquid above the path extender 315 and the associated magnitude of hydrostatic pressure acting on the liquid P.C.C. 318 within the path extender 315 remains constant as volume of liquid within the P.C.C. container 317 increases. As a result, the body of polluted gaseous substance can flow through the liquid P.C.C. 318 within the path extender 315 as the volume and height of liquid within the P.C.C. container 317 increases, thus the wet embodiment of the pollutant capturer and mobilizer remains functional as the volume and height of liquid within the P.C.C. container 317 increases.

Referring to FIG. 8A and FIG. 8B, the P.C.C. container cap 309 can have one or multiple inspection windows; each of the windows being equipped with a maintenance window cover 369 to allow access to inside the liquid P.C.C. container 317 for maintenance and repair operations. The inspection windows and their associated maintenance window covers 369 on the P.C.C. container cap 309 are not shown in FIG. 8A and FIG. 8B.

Referring to FIG. 8A and FIG. 8B, instead of using the P.C.C. container 317 and some or all other components that are attached to the P.C.C. container 317, the riser 310 and the path extender 315 may deliver the atmospheric body of polluted gaseous substance to a body of water that is used as the liquid P.C.C. 318 and with the liquid P.C.C. 318 to be contained in a man-made pool or lake to capture particulate polluting substances from the atmospheric body of polluted gaseous substance. Also, when a body of produced crude oil, or other types of synthetic or manufactured oil is used as the liquid P.C.C. 318, the embodiment can capture $CO_2$ and particulate polluting substances from the atmospheric body of polluted gaseous substance without using any flow-establishing device box or flow-establishing devices such as pumps, fans, and compressors. Exclusion of one or more components as seen in FIG. 8A and FIG. 8B is optional; addition of one or more components, as seen in FIG. 1, to FIG. 8A and FIG. 8B is optional.

Figure 16:
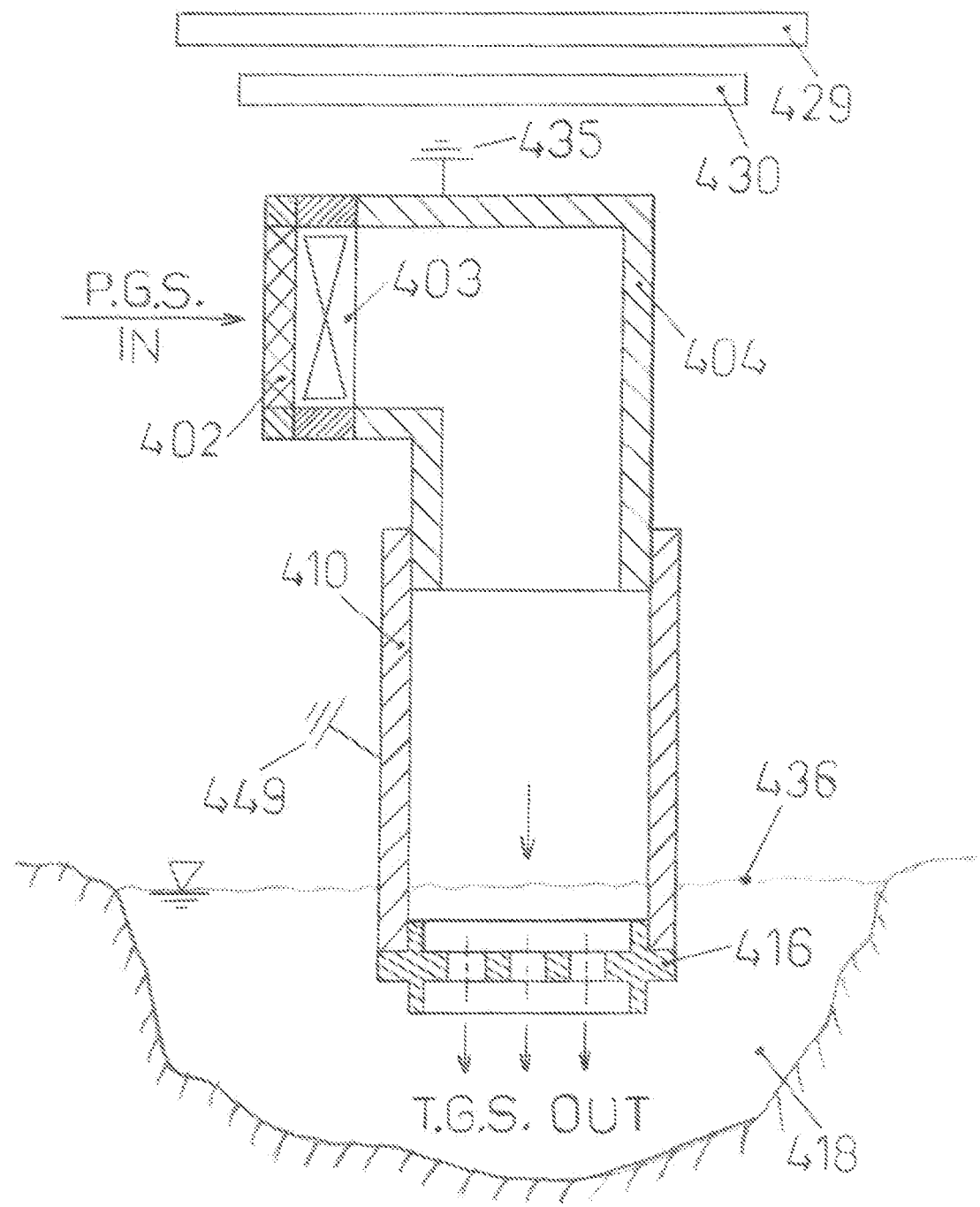
FIG. 16 is a simplified schematic of the simplified wet embodiment of the pollutant capturer and mobilizer that can be used to capture polluting substances from atmospheric air or mobilize an atmospheric body of polluted gaseous substance from one location towards another location.

Referring to FIG. 16, a wet embodiment of the pollutant capturer and mobilizer with fewer components can be used to draw an atmospheric body of polluted gaseous substance and deliver it into a body of liquid P.C.C 418 that is contained in a man-made pool or lake to capture particulate polluting substances from the atmospheric body of polluted gaseous substance and with a body of water to be used as the liquid P.C.C. 418. The man-made pool or lake can have a cover on it if desired. Equivalently, the embodiment can be used to draw an atmospheric body of polluted gaseous substance and deliver it into a body of water in an existing pool or lake or river or ocean to capture particulate polluting substances from the atmospheric body of polluted gaseous substance. Exclusion of one or more components as seen in FIG. 16 is optional; addition of one or more components, as seen in FIG. 1, to FIG. 16 is optional.

Referring to FIG. 16, a wet embodiment of the pollutant capturer and mobilizer with fewer components can be used to draw an atmospheric body of polluted gaseous substance and deliver it into a body of liquid P.C.C. 418 that is contained in a man-made pool or lake to capture gaseous polluting substances such as $CO_2$ and other desired gases from the atmospheric body of polluted gaseous substance, and with Produced crude oil or other types of synthetic or manufactured oil to be used as the liquid P.C.C. 418. The man-made pool or lake can have a cover on it if desired. Exclusion of one or more components as seen in FIG. 16 is optional; addition of one or more components, as seen in FIG. 1, to FIG. 16 is optional.

6. How to Make the Dry Embodiment of the Invention

Referring to FIG. 2, the base structure 101 supports other components of the dry embodiment of the pollutant capturer and mobilizer, directly or indirectly, as desired. The base structure can be mounted on the ground, or on a stationary foundation on the ground, or on a concrete foundation or slab, or on any other existing stationary or mobile structure, or on any type of vehicle. The base structure 101 may comprise rotary and sliding structural segments which allow mounting, removing, or replacing the other components of the dry embodiment of the pollutant capturer and mobilizer conveniently. Any component of the dry embodiment of the pollutant capturer and mobilizer can be attached to the base structure 101 or any other existing structure or facility or any type of vehicle as desired.

Figure 9A:
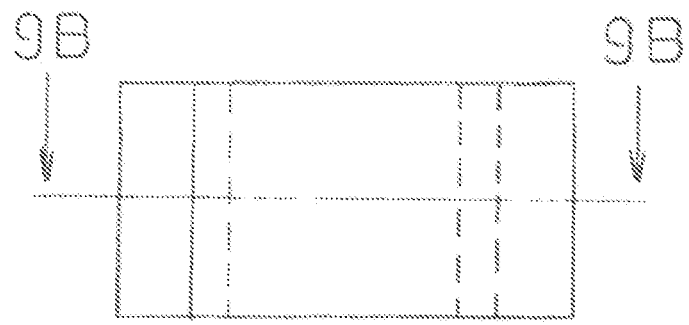
FIG. 9A and FIG. 9B are simplified schematics of the top and front views of the distributor (component 2) as seen in FIG. 2.
Figure 9B:
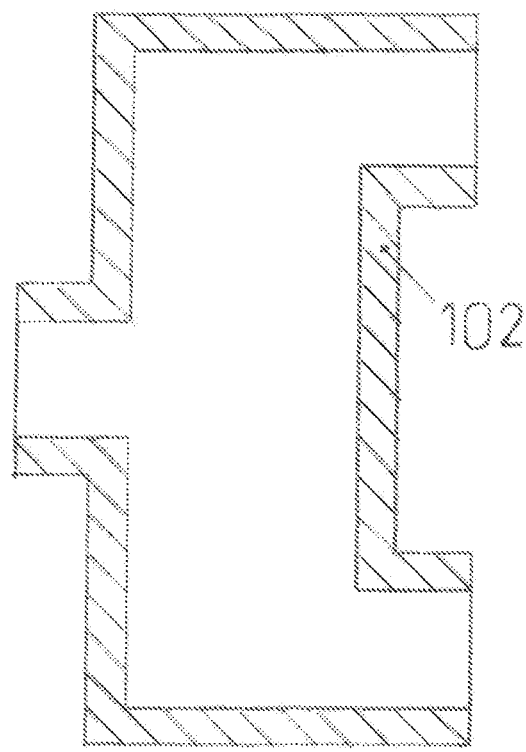
Figure 10:
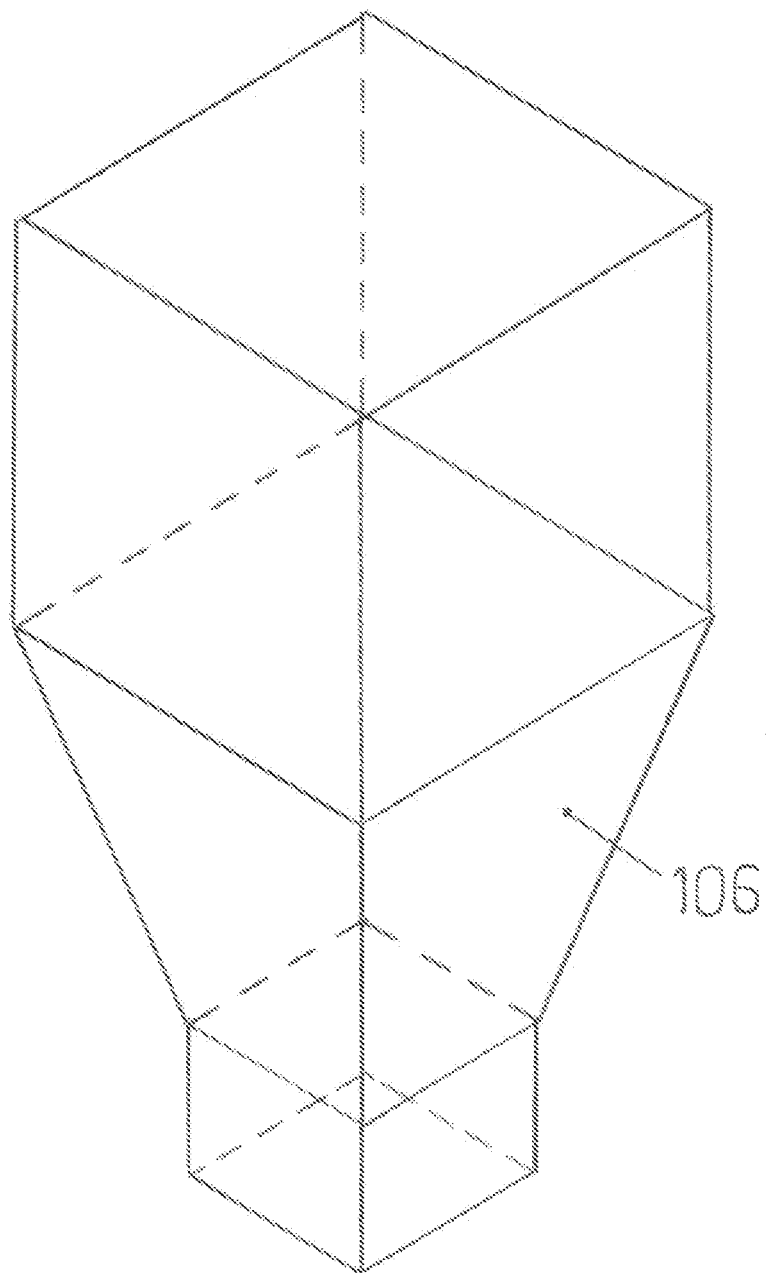
FIG. 10 is a simplified schematic of the dust box (component 6) as seen in FIG. 2.
Figure 11:
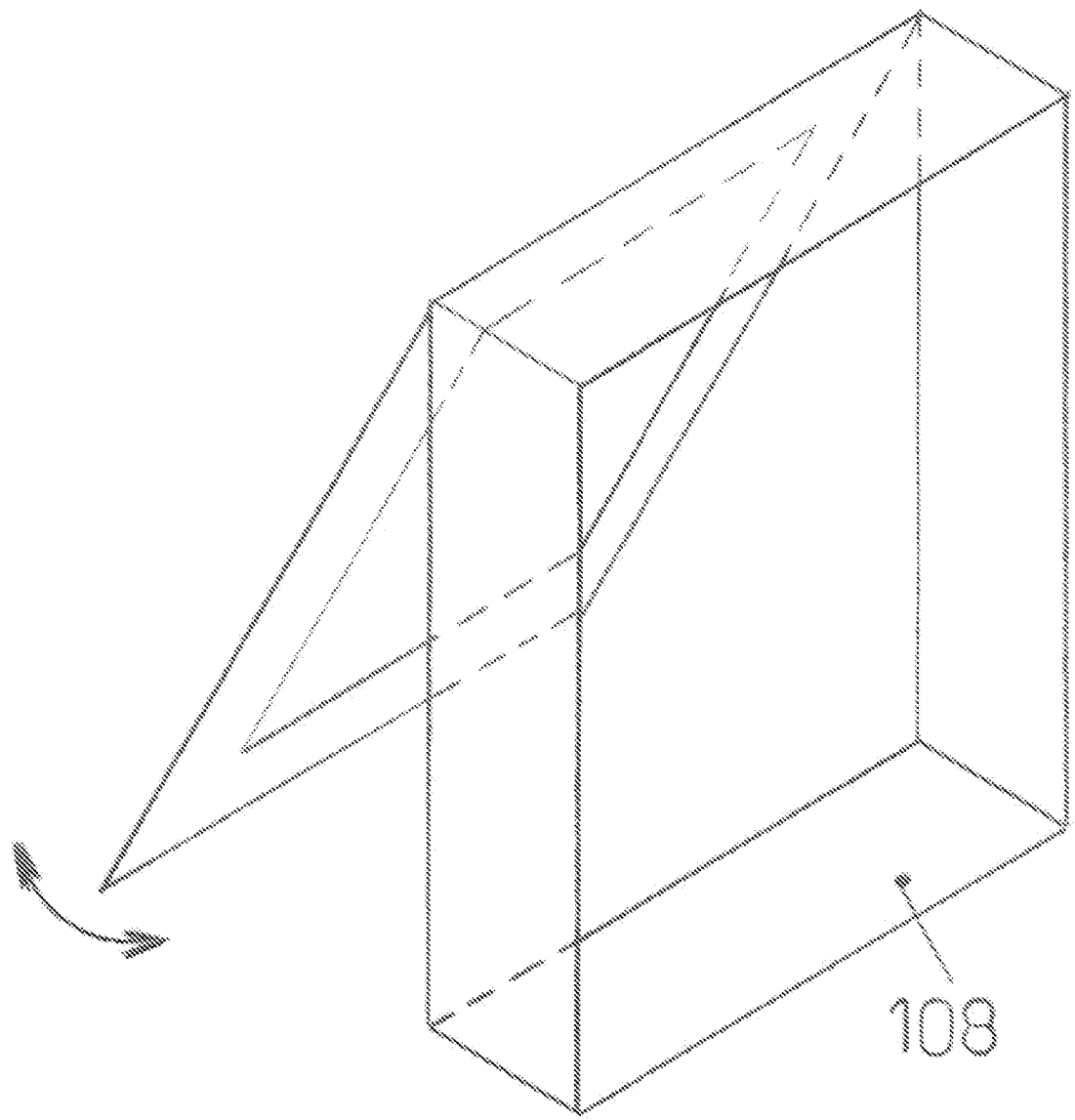
FIG. 11 is a simplified schematic of the filter house (component 8) as seen in FIG. 2.

Referring to FIG. 2, the distributor 102 is a flow passage that has one or multiple inlet ports and one or multiple exit ports. A distributor with one inlet port and two exit ports is shown in FIG. 2; any other desired number of inlet and exit ports may be used with the distributor as desired. FIG. 2 shows components connected to only one inlet port and one of the exit ports of the distributor 102; components connected to the other inlet or exit ports of the distributor will be similar to those shown connected to the inlet port and the exit port as seen in FIG. 2. Schematics of the top and front views of the distributor 102 with one inlet port and two exit ports are shown in FIGS. 9A and 9B.

Referring to FIG. 2, one or multiple heat insulators 103 are used to connect the supply connector 112 to any existing structure or component that might be at a high temperature, to thermally insulate the supply connector from the hot structure or component. The heat insulator 103 can be made with any type of heat resistant material, in the form of a flexible sheet or strap or ring or hollow cylinder or moldable substance, and with any desired size or dimensions so it can be placed between surfaces of the inlet ports of the supply connector 112 and an existing hot chimney or stack or a vehicle's exhaust pipe or any other hot surface to insulate the surfaces of the dry embodiment of the pollutant capturer and mobilizer from the existing hot surfaces thermally.

Referring to FIG. 2, the secondary bird protection barrier 104 is a flow passage that contains one or more screen or perforated layers to prevent birds and other undesired objects to enter the internal space of the dry embodiment of the pollutant capturer and mobilizer. The screen or perforated layers might be used as stand-alone or mounted on a frame as desired. Screens or nets with identical or different mesh or grid sizes may be used as the screen or perforated layers of the secondary bird protection barrier 104. One secondary bird protection barrier 104 is shown in FIG. 2; any other desired number of secondary bird protection barriers 104 may be used in series or in parallel or a combination of in series and in parallel to prevent birds and other undesired objects to enter the internal space of the dry embodiment of the pollutant capturer and mobilizer. The secondary bird protection barrier 104 can be attached to, or mounted on, the base structure 101 or on any other component of the dry embodiment of the pollutant capturer and mobilizer, or on any combination of the base structure and other components of the dry embodiment of the pollutant capturer and mobilizer as desired.

Referring to FIG. 2, the secondary flow-establishing device box 105 is a flow passage that may house one or multiple flow-establishing devices, in parallel, i.e. side by side. Any desired number of secondary flow-establishing device boxes 105 may be used in parallel or in series or a combination of both in series and in parallel as desired. Flow-establishing devices can be mounted on the secondary flow-establishing device box 105 as desired.

Referring to FIG. 2, the dust box 106 is a flow passage with one or multiple dust wells with each of the dust wells holding the captured particulate polluting substances, that are removed from the body of polluted gaseous substance, until the captured polluting substances are removed from the dust box as desired. Each dust well is an internal cavity of the dust box 106 located at the bottom part of the dust box. One dust box 106 with one dust well is shown in FIG. 2; any other desired number of dust wells may be used with a single dust box 106 as desired. The dust box 106 may also have one or multiple openings on its walls that can be used as inspection windows. Each inspection window is plugged by a removable cover; the cover may be removed temporarily to get access to internal spaces of the dust box 106 for inspection, repair, and maintenance operations. The inspection windows and their associated removable covers are not shown in FIG. 2. Schematic of the dust box 106 is shown in FIG. 10. The inspection windows and their associated removable covers are not shown in FIG. 10.

Referring to FIG. 2, one dust box cap 107 is used with each dust well of the dust box 106 to plug the dust well and allow accumulation of the captured particulate polluting substances within the dust well. The dust box cap 107 will be removed, temporarily, whenever it is desired to empty the dust well from the accumulated particulate polluting substances.

Referring to FIG. 2, one or multiple filter houses 108 may be used with each dust box of the dry embodiment of the pollutant capturer and mobilizer. The filter house 108 has vents at desired angles, on at least one of its sides so it can release the treated gaseous substance into the surrounding or atmosphere at the desired angles or directions. Each of the filter houses is a flow passage that houses one or multiple pollutant removal filters; each of the pollutant removal filters can be placed inside or removed from the filter house conveniently as desired. Two of the opposing sides of the filter house 108, which are not parallel with the direction of the flow of the polluted gaseous substance within the filter house 108, are perforated surfaces so they allow the passage of the polluted gaseous substance into and out of the filter house. At least one of the sides of the filter house 108 is attached to another side of the filter house, as desired, so the side can be rotated or slid relative to another side of the filter house thus allowing access to internal space of the filter house 108 to accommodate maintenance and replacement of the pollutant removal filters. A schematic of the filter houses 108 is shown in FIG. 11.

Referring to FIG. 2, one or multiple pollutant removal filters 109 are used with each filter house of the dry embodiment of the pollutant capturer and mobilizer. The pollutant removal filters 109 may be used in parallel or in series or a combination of both in series and in parallel as desired. Each of the pollutant removal filters removes the particulate polluting substances from a body of polluted gaseous substance as the body of polluted gaseous substance flows through the pollutant removal filter of the dry embodiment of the pollutant capturer and mobilizer. The pollutant removal filter 109 may be made with one or multiple layers of any type of filtering substance such as perforated solid or rigid sheet or a cloth sheet or a porous paper sheet or a body of natural or manufactured spongy or fibrous substance or any combination of the above; the filtering substance may be used as a stand-alone component or mounted on a frame. The pollutant removal filter 109 can be mounted on the filter house 108 or on any other component or structure of the dry embodiment of the pollutant capturer and mobilizer or on any combination of components and structures of the dry embodiment of the pollutant capturer and mobilizer or on any other existing structure or building or vehicle or vehicle's exhaust pipe or chimney or stack as desired.

Referring to FIG. 2, one or multiple rain shields 110 are used to protect desired components of the dry embodiment of the pollutant capturer and mobilizer against rain or other undesired atmospheric conditions. One rain shield 110 is shown in FIG. 2; any other desired number of the rain shields may be used. The rain shields may be mounted on either the base structure 101 or on any other component of the dry embodiment of the pollutant capturer and mobilizer, or on any combination of the structure and components of the dry embodiment of the pollutant capturer and mobilizer as desired. Each rain shield 110 can include one or multiple shield segments; the shield segments can be built or attached to each other using metal or non-metal structural components, as desired. Rain shields 110 may be attached to, or mounted on, the base structure 101 or on any other component of the dry embodiment of the pollutant capturer and mobilizer or on any combination of the base structure and other components of the dry embodiment of the pollutant capturer and mobilizer or on any existing structure or vehicle as desired.

Referring to FIG. 2, a desired number of thermal fins 111, or arrays of thermal fins, may be attached to the supply connector 112 or the distributor 2 or to any other hot surface of the dry embodiment of the pollutant capturer and mobilizer, with a desired pattern, to enhance dissipation of heat that might be carried into the dry embodiment of the pollutant capturer and mobilizer by a body of high-temperature polluted gaseous substance. The thermal fins 111 may be attached to the supply connector 112 or the distributor 2 or to any other hot surface of the dry embodiment of the pollutant capturer and mobilizer as desired.

Referring to FIG. 2, the dry embodiment of the pollutant capturer and mobilizer utilizes one or multiple supply connectors 112 by which the embodiment receives an atmospheric body of polluted gaseous substance, or by which the embodiment becomes connected to a vehicle's exhaust pipe or a chimney or stack or to any other conduit in which a body of polluted gaseous substance is flowing. The supply connector 112 is a flow passage that receives the body of polluted gaseous substance and directs it towards other components of the dry embodiment of the pollutant capturer and mobilizer. The supply connector 112 can be mounted on the base structure 101 or on any other component or structure of the dry embodiment of the pollutant capturer and mobilizer or on any combination of components and structures of the dry embodiment of the pollutant capturer and mobilizer or on any existing structure or vehicle as desired.

Referring to FIG. 2, the primary bird protection barrier 113 is a flow passage that contains one or more screen or perforated layers to prevent birds and other undesired objects to enter the internal space of the dry embodiment of the pollutant capturer and mobilizer. The screen or perforated layers might be used as stand-alone or mounted on a frame as desired. Screens or nets with identical or different mesh or grid sizes may be used as the screen or perforated layers of the primary bird protection barrier 113. One primary bird protection barrier 113 is shown in FIG. 2; any other desired number of primary bird protection barriers 113 may be used in series or in parallel or a combination of in series and in parallel to prevent birds and other undesired objects to enter the internal space of the dry embodiment of the pollutant capturer and mobilizer. The primary bird protection barrier 113 can be attached to, or mounted on, the base structure 101 or on any other component of the dry embodiment of the pollutant capturer and mobilizer, or on any combination of the base structure and other components of the dry embodiment of the pollutant capturer and mobilizer as desired.

Referring to FIG. 2, the primary flow-establishing device box 114 is a flow passage that may house one or multiple flow-establishing devices, in parallel, i.e. side by side. Any desired number of primary flow-establishing device boxes 114 may be used in parallel or in series or a combination of both in series and in parallel as desired. Flow-establishing devices can be mounted on the primary flow-establishing device box 114 as desired. The primary flow-establishing device box 114 can be mounted on any component or structure or any combination of components and structures of the dry embodiment of the pollutant capturer and mobilizer, or on any other existing structure, using metal or non-metal structural components as desired.

Referring to FIG. 2, all other necessary equipment and instrumentation will be used to assure that the dry embodiment of the pollutant capturer and mobilizer for all applications function safely and expectedly, as desired.

Referring to FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18 any component of the dry embodiment of the pollutant capturer and mobilizer for any of its applications can be built by any type of manufacturing processes such as welding, soldering, casting, die casting, forging, extrusion, sewing, thermal fitting, press fitting, cutting, bending, punching, use of adhesives, Snap-on, or any other existing manufacturing process, or any combination of the manufacturing processes.

Referring to FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18 any component of the dry embodiment of the pollutant capturer and mobilizer for any of its applications can be built as a single part or assembly of multiple parts connected to each other by flanges, use of threaded features, bolts, nuts, and washers, U-bolts, anchor bolts, screws, pivots, rivets, pins, retaining rings, clamps, hangers, hinges, cables, ropes, chains, any type of quick release fitting and couplings, any type of adjustable quick tie strap, any type of twist tie, any type of cable tie, any type of buttons or Snap buttons, any type of zippers, any other type of fasteners, welding, soldering, adhesives, sewing, thermal fitting, press fitting, Snap-on features, magnets, hinges, spindles, any type of springs, any type of ball bearing or sliding bearings, or any combination of the above said means.

Referring to FIG. 2, FIG. 9A and FIG. 9B, FIG. 10, FIG. 11, FIG. 12, FIG. 13, FIG. 14A and FIG. 14B, FIG. 15, FIG. 17A, and FIG. 17B, and FIG. 18 any component of the dry embodiment of the pollutant capturer and mobilizer for any of its applications can be built either as a single component or its combination with one or multiple other components of the embodiment can be built as a single component.

Referring to FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18 each component of the dry embodiment of the pollutant capturer and mobilizer for any of its applications can have any desired shape, geometry, and dimensions and can be made from metal or non-metal materials, or a combination of metal and non-metal materials.

Referring to FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18 any component of the dry embodiment of the pollutant capturer and mobilizer for any of its applications can have a uniform cross sectional area or a variable cross sectional area, or a combination of both uniform and variable cross sectional areas as desired.

Referring to FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18 any component of the dry embodiment of the pollutant capturer and mobilizer for any of its applications can have a desired number of attachments by which the component can be lifted for installation or maintenance operations or by which the component can be mounted on or attached to another component of the embodiment or any existing structure or chimney or stack or a vehicle or a vehicle's exhaust pipe, if desired; the attachments are not shown in FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18.

Referring to FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18 any component of the dry embodiment of the pollutant capturer and mobilizer for any of its applications can be connected to other components of the embodiment or to any existing structure or plant or facility or piping network or chimney or stack or vehicle's exhaust pipe by flanges, use of threaded feature, bolts, nuts, and washers, U-bolts, anchor bolts, screws, pivots, rivets, pins, retaining rings, clamps, hangers, hinges, cables, ropes, chains, any type of quick release fitting and couplings, any type of adjustable quick tie strap, any type of twist tie, any type of cable tie, any type of buttons or Snap buttons, any type of zippers, any other type of fasteners, welding, soldering, adhesives, sewing, thermal fitting, press fitting, Snap-on features, magnets, hinges, spindles, any type of springs, any type of ball bearing or sliding bearings, or any combination of the above said means.

Referring to FIG. 2, FIG. 9A and FIG. 9B, FIG. 10, FIG. 11, FIG. 12, FIG. 13, FIG. 14A and FIG. 14B, FIG. 15, FIG. 17A and FIG. 17B, and FIG. 18 any component of the dry embodiment of the pollutant capturer and mobilizer for any of its applications can be attached to or mounted on another component or structure of the embodiment or any combination of components and structures of the embodiment or any other existing structure or chimney or stack or vehicle or vehicle's exhaust pipe using metal or non-metal or a combination of metal and non-metal structural components, flanges, welding, soldering, bolts, nuts, washers, screws, U-bolts, anchor bolts, use of threaded features, pins, retaining rings, clamps, hangers, hinges, cables, ropes, chains, pivots, rivets, any type of quick release fitting and couplings, any type of adjustable quick tie strap, any type of twist tie, any type of cable tie, any type of buttons or Snap buttons, any type of zippers, any other type of fasteners, sewing, adhesives, thermal fitting, press fitting, Snap-on features, magnets, hinges, spindles, any type of springs, any type of ball bearing or sliding bearings, or any combination of the above said means as desired.

Figure 12:
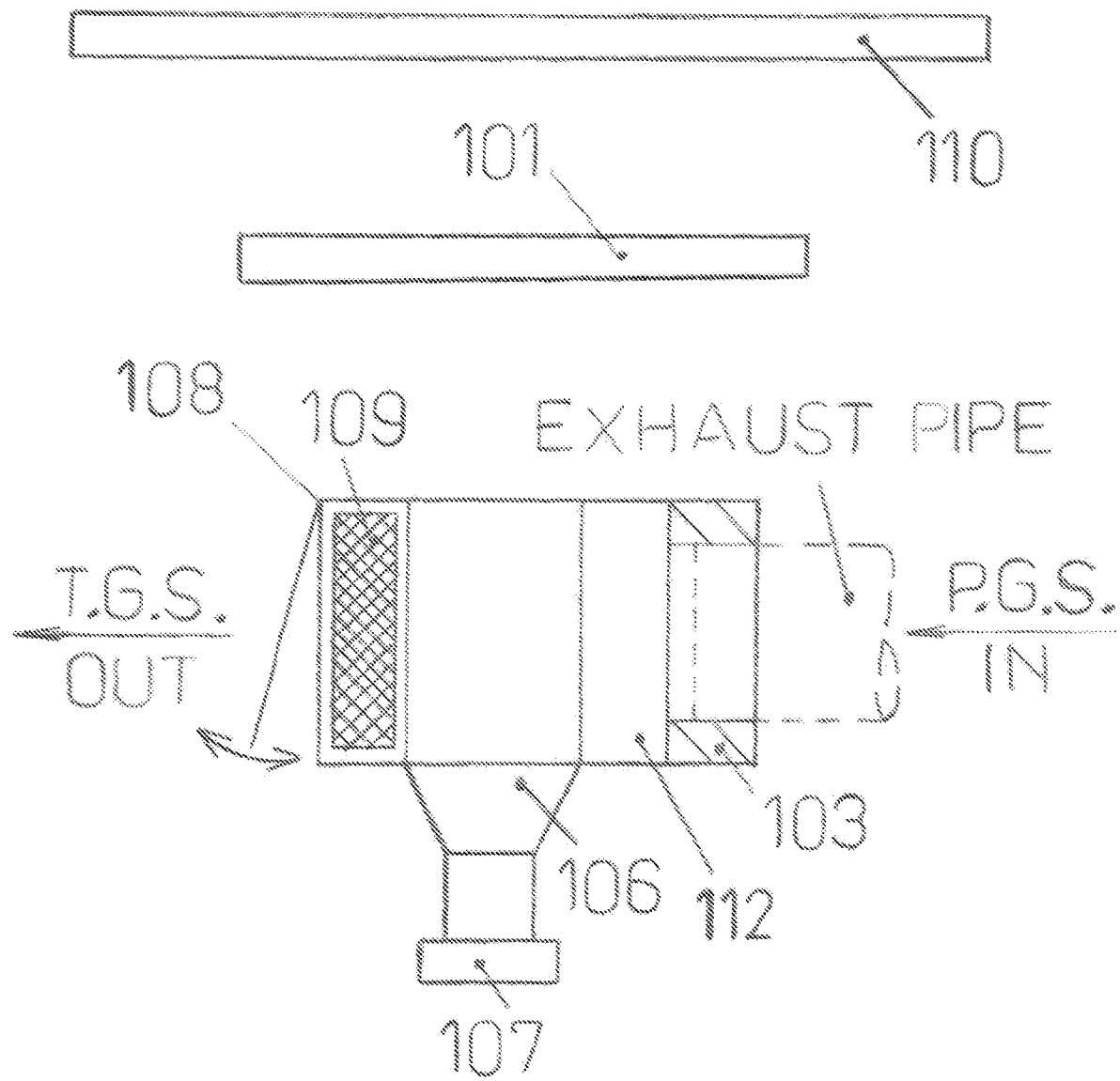
FIG. 12 is a simplified schematic of the simplified dry embodiment of the pollutant capturer and mobilizer that can be used to capture polluting substances from a body of polluted gaseous substance that flows in a vehicle's exhaust pipe.

Referring to FIG. 12, a dry embodiment of the pollutant capturer and mobilizer with fewer components can be connected to a vehicle's exhaust pipe to capture polluting substances from a body of polluted gaseous substance that flows within the exhaust pipe. Heat insulators 103 are used to connect the supply connector 112 to the vehicle's exhaust pipe; the pollutant removal filter 109 can be removed temporarily to get access to inside the exhaust pipe for emission testing that is required for vehicle registration. Some of the components shown in FIG. 12 might be excluded from the dry embodiment of the pollutant capturer and mobilizer for vehicle's exhaust pipe application as desired. The inclusion of other components of the dry embodiment of the pollutant capturer and mobilizer, as seen in FIG. 2, is optional for the dry embodiment of the pollutant capturer and mobilizer for vehicle's exhaust pipe application.

Figure 13:
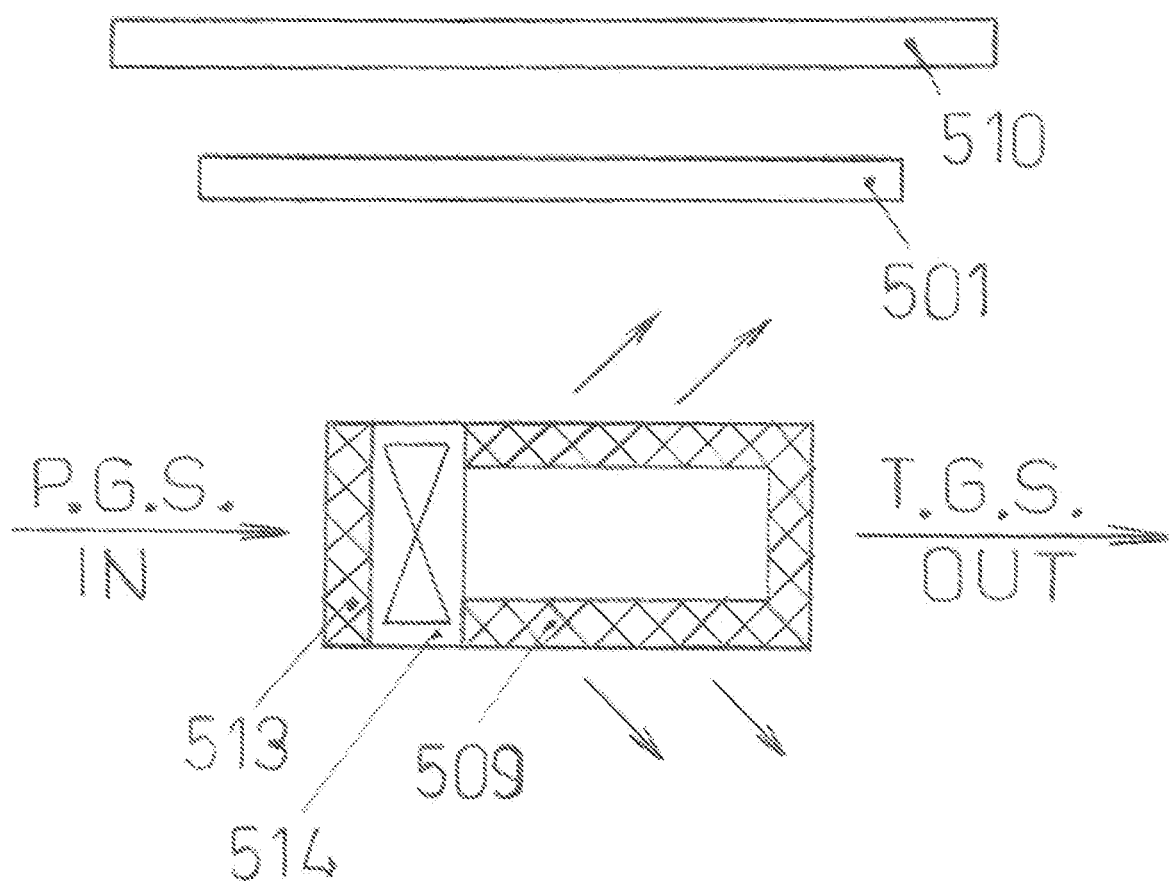
FIG. 13 is a simplified schematic of the simplified dry embodiment of the pollutant capturer and mobilizer that can be used to capture particulate pollutants from atmospheric air or mobilize an atmospheric body of polluted gaseous substance from one location towards another location.

Referring to FIG. 13, a dry embodiment of the pollutant capturer and mobilizer with fewer components can be used to capture polluting substances from an atmospheric body of polluted gaseous substance, or mobilize and move an atmospheric body of polluted gaseous substance from one location towards another location. Exclusion of one or more components as seen in FIG. 13 is optional; addition of one or more components, as seen in FIG. 2, to FIG. 13 is optional. The pollutant removal filter 509 can form a cylindrical shell, or spherical shell, or part cylindrical and part spherical shell in shape or any other shape with an internal space so it can hold the captured particulate polluting substances, with a part of the shell area being fully open to the flow of an atmospheric body of polluted gaseous substance.

Figure 14A:
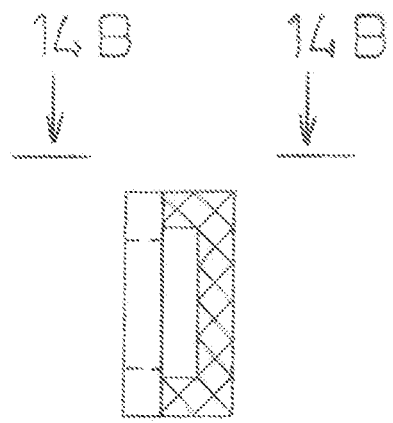
FIG. 14A and FIG. 14B are simplified schematics of the top and front views of the simplified dry embodiment of the pollutant capturer and mobilizer that can be mounted on any type of vehicles, ground, gates, or buildings to capture particulate polluting substances from atmospheric air without using any type of power driven flow establishing device such as pump, fan, or compressor.
Figure 14B:
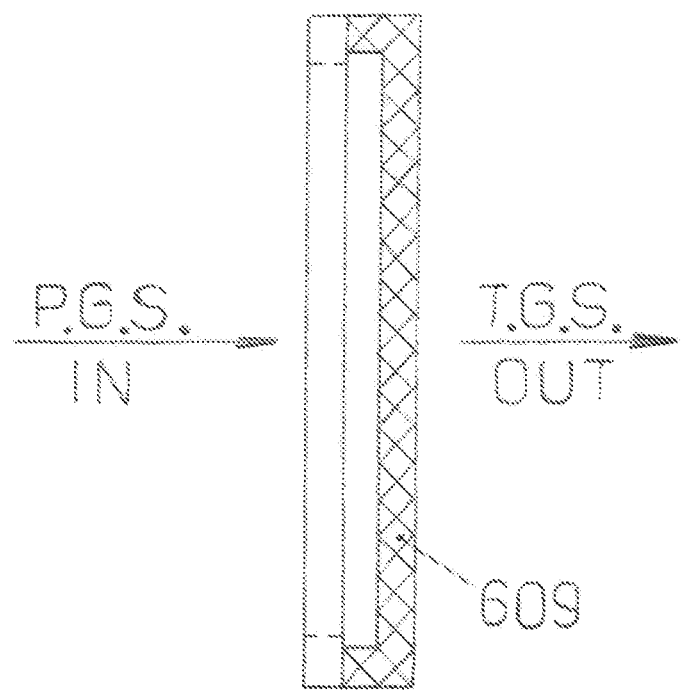

FIG. 14A and FIG. 14B show schematics of the top and front views of a dry embodiment of the pollutant capturer and mobilizer comprised of a pollutant removal filter 609, mounted on a frame, that can be mounted on any type of vehicle or on a structure on the ground or on an existing structure or on buildings using a combination of straps and Snap-on buttons, as desired, to capture particulate polluting substances from an atmospheric body of polluted gaseous substance. The straps and Snap-on buttons are not shown in FIGS. 14A and 14B. The pollutant removal filter 609 can form a rectangular cylindrical shell or any other desired shape with an internal space for holding the captured particulate polluting substances and with one of the sides of the shell being fully open to the flow of the atmospheric body of polluted gaseous substance. Multiple pollutant removal filters with their associated frames can be used side by side to form a large area against flow of the atmospheric body of polluted gaseous substance.

Figure 15:
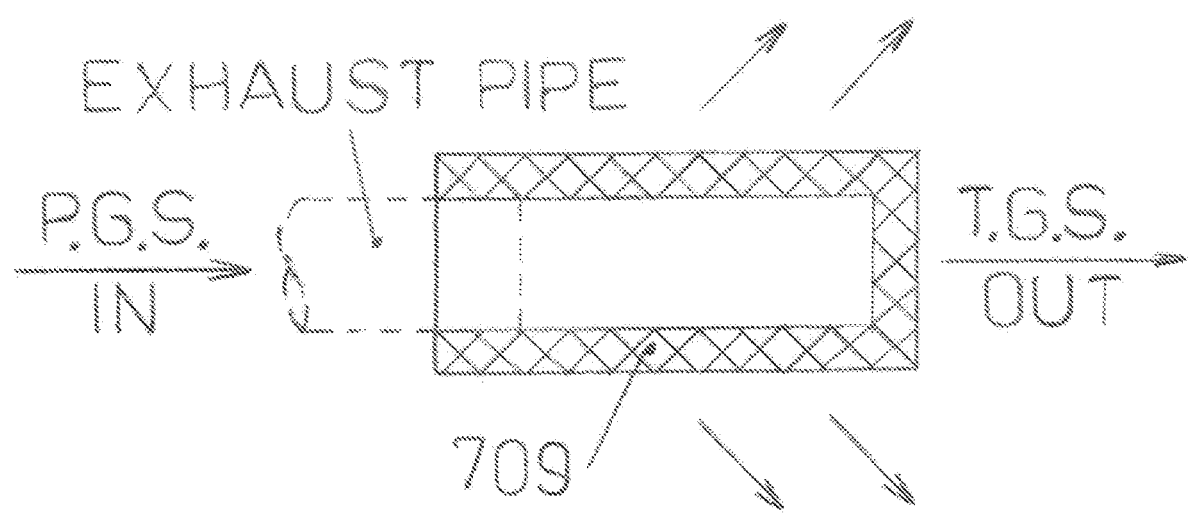
FIG. 15 is a simplified schematic of the simplified dry embodiment of the pollutant capturer and mobilizer that can be used to capture polluting substances from a body of polluted gaseous substance that flows in a vehicle's exhaust pipe.

FIG. 15 shows schematic of a dry embodiment of the pollutant capturer and mobilizer comprised of a pollutant removal filter 709 that can be connected to a vehicle's exhaust pipe to capture particulate polluting substances from a body of polluted gaseous substance that flows within the vehicle's exhaust pipe. The pollutant removal filter 709 can be secured to the vehicle's exhaust pipe by clamps; the clamps are not shown in FIG. 15. The pollutant removal filter 709 can form a cylindrical shell, or spherical shell, or part cylindrical and part spherical shell in shape, or any other shape with an internal space for holding the captured particulate polluting substances and with a part of the area of the shell being fully open to the flow of the body of polluted gaseous substance and connected to the vehicle's exhaust pipe. Heat insulators 103, as seen in FIG. 2, may be used to thermally insulate the pollutant removal filter 709 from the vehicle's exhaust pipe if desired. The heat insulators 103 are not shown in FIG. 15. Addition of one or more components of the dry embodiment of the pollutant capturer and mobilizer, as seen in FIG. 2, to FIG. 15 is optional.

Figure 17A:
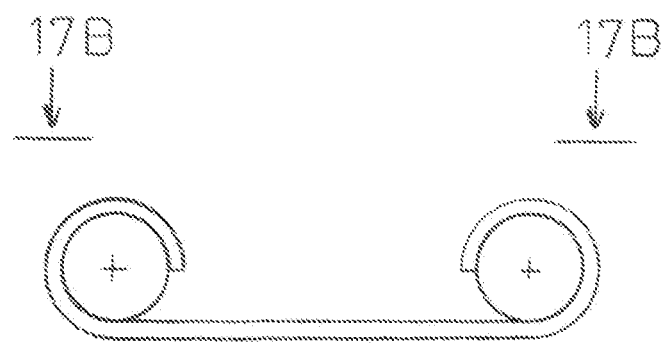
FIG. 17A and FIG. 17B are simplified schematics of the top and front views of a simple structure that can be used to mount a wet or a dry embodiment of the pollutant capturer and mobilizer on a vehicle's exhaust pipe.
Figure 17B:
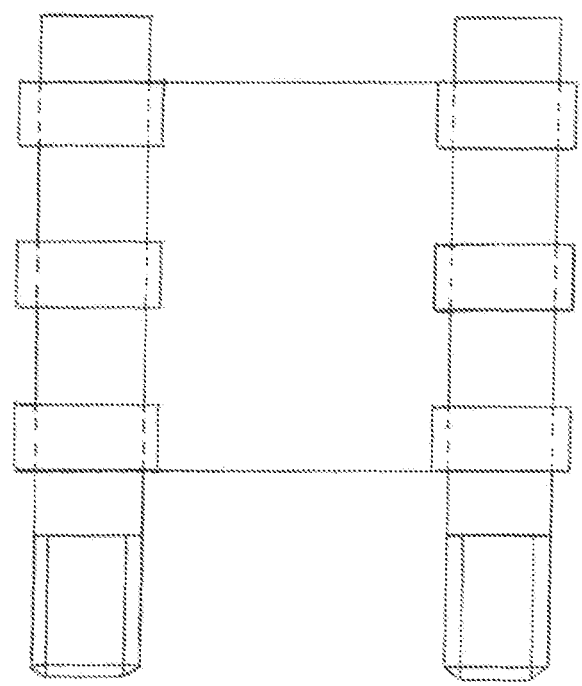

FIG. 17A and FIG. 17B show schematics of top and front views of a simple structure that can be used to attach any component of a wet or dry embodiment of the pollutant capturer and mobilizer to an existing vehicle's exhaust pipe. The simple structure comprises two metal rods with each of the rods to be threaded at one end and with the rods to be secured on a base that is made with a flexible substrate, such as sheet metal, by bending some parts of the base on the rods to cover some parts of each of the rods along their lengths. The assembly of the two rods and the base can be mounted on a vehicle's exhaust pipe, using at least two clamps, such that the threaded ends of both of the rods point towards the rear of the vehicle. With the assembly of the two rods and the base placed on the vehicle's exhaust pipe, the clamps go around the vehicle's exhaust pipe and the uncovered lengths of the two rods before the clamps are tightened in place. With the assembly secured on the vehicle's exhaust pipe, any component of wet or dry embodiments of the pollutant capturer and mobilizer, thus the wet or dry embodiments of the pollutant capturer and mobilizer, can be attached to the threaded ends of the rods and secured in place by nuts, washers, or any other desired types of fasteners. The clamps are not shown in FIG. 17A and FIG. 17B.

Figure 18:
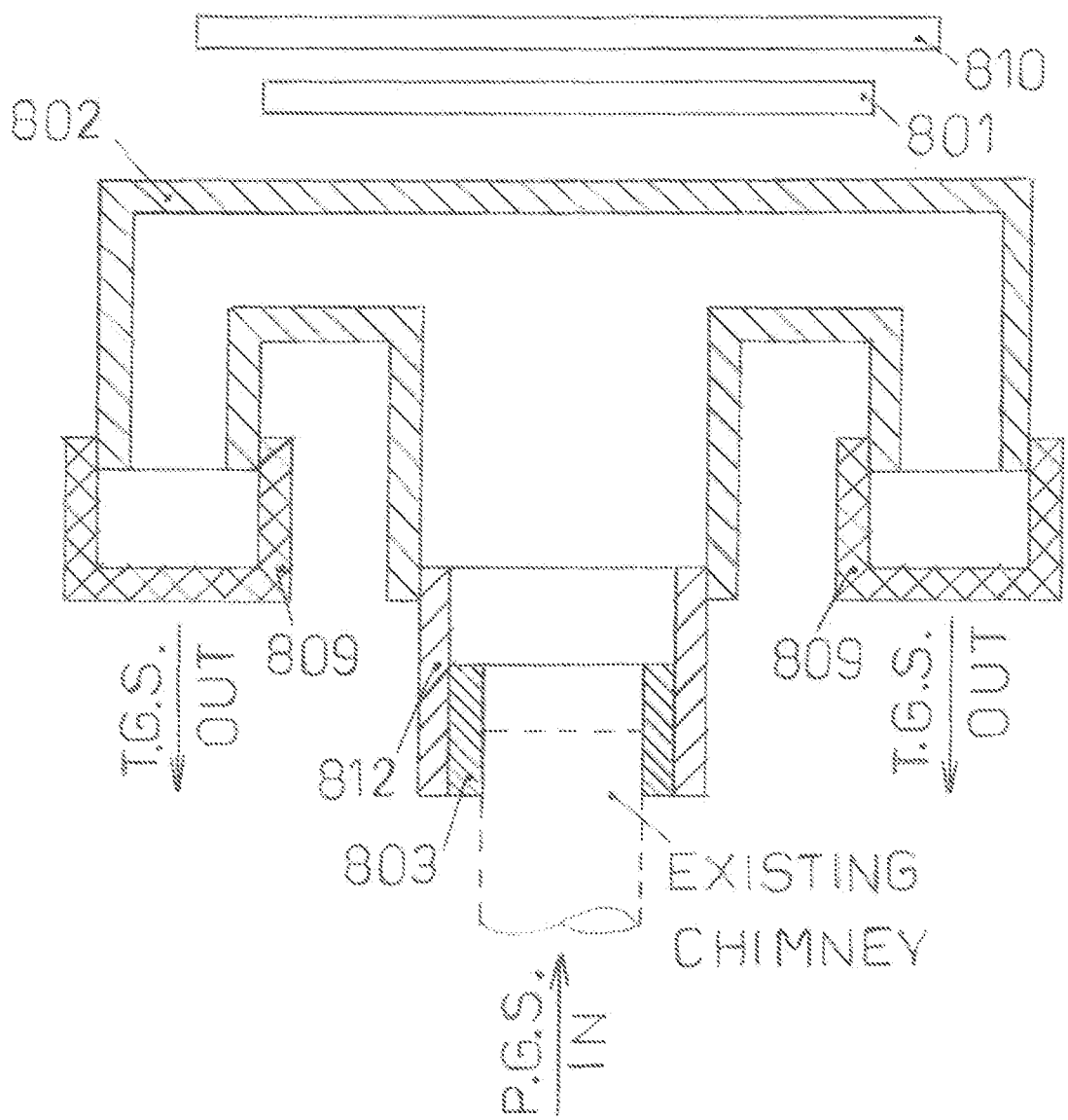
FIG. 18 is a simplified schematic of the simplified dry embodiment of the pollutant capturer and mobilizer that can be used to capture polluting substances from a body of polluted gaseous substance that flows in a chimney or stack.

Referring to FIG. 18, a dry embodiment of the pollutant capturer and mobilizer with fewer components can be connected to an existing chimney or stack to capture particulate polluting substances from a body of polluted gaseous substance that flows within the chimney or stack. The supply connector 812 can be connected to an existing chimney or stack and with the heat insulators 803 being used to insulate the supply connector 812 from the chimney or stack thermally. Some of the components shown in FIG. 18 might be excluded from the dry embodiment of the pollutant capturer and mobilizer for chimney or stack application as desired. Addition of one or more components of the dry embodiment of the pollutant capturer and mobilizer, as seen in FIG. 2, to FIG. 18 is optional. The pollutant removal filter 809 can form a cylindrical shell or spherical shell or part cylindrical and part spherical shell in shape or any other shape with an internal space for holding the captured particulate polluting substances, and with a part of the area of the shell being fully open to the flow of the body of polluted gaseous substance and being connected to the chimney or stack.

7. Function of the Wet Embodiment of the Invention for Stationary Applications Referring to FIG. 1, the wet embodiment of the pollutant capturer and mobilizer may be used as a stationary unit mounted on the ground or on a foundation or structure on rooftops or on streets, or in industrial parks, or in proximity of industrial plants and facilities, or in proximity of wildfires or active volcanos, or on ships and other floating structures, or at any other desired location to remove one or multiple types of polluting substances from an atmospheric body of polluted gaseous substance.

Referring to FIG. 1, the primary distributor 4 might have one or multiple inlet ports and one or multiple exit ports as desired; each of the exit ports is connected to a P.C.C. container 17. When a primary distributor 4 with only one inlet port and one exit port is needed, then the distributor and its associated primary supply connectors 1, primary screen boxes 2, and primary flow-establishing device boxes 3 will not have to be included in the wet embodiment of the pollutant capturer and mobilizer; the polluted gaseous substance will enter the embodiment directly through the inlet connector 5.

Referring to FIG. 1, after flowing through the secondary screen box 6 and with the secondary flow-establishing device box 7 operating, the polluted gaseous substance is forced to flow through the adaptor 8, the P.C.C. container cap 9, the riser 10, the secondary distributor 11, the branch 12, the branch connector 14, the path extender 15 that is completely submerged within the body of the liquid P.C.C. 18, the perforated disk 16, the gas dividers 19, the splash shield 20, the P.C.C. container exit port 21, the P.C.C. shield 22, the P.C.C. shield retainer 23, and is released, in the form of a treated gaseous substance, into the surrounding atmosphere after one or multiple of its polluting agents have been captured by the liquid P.C.C. 18 which is contained within the P.C.C. container 17 and some other components of the wet embodiment of the pollutant capturer and mobilizer which are housed within the P.C.C. container 17.

Referring to FIG. 1, when water is used as the liquid P.C.C. 18, the wet embodiment of the pollutant capturer and mobilizer can capture airborne particulate matter from a body of polluted gaseous substance as the polluted gaseous substance flows within the liquid P.C.C. 18 of the wet embodiment of the pollutant capturer and mobilizer. Produced crude oil, or other types of synthetic or manufactured oil may be used as the P.C.C. 18 of the wet embodiment of the pollutant capturer and mobilizer to capture carbon dioxide, $CO_2$, from a body of polluted gaseous substance. Any other desired type of liquid or combinations of liquids may be used as the P.C.C. 18 of the wet embodiment of the pollutant capturer and mobilizer provided that the liquid or combination of liquids can react with desired polluting substances of the body of polluted gaseous substance resulting in the removal of at least one type of the polluting substances from the body of polluted gaseous substance by dissolving or by absorbing or by formation of a solid substance or by denaturing or by consuming or by physical deposition or by altering the chemical properties of the polluting substances.

Referring to FIG. 1, when water is used as the P.C.C. 18 and the body of the polluted gaseous substance that enters the wet embodiment of the pollutant capturer and mobilizer contains water vapor, the water vapor condenses as the body of polluted gaseous substance flows through the body of water that is used as the liquid P.C.C. 18. The condensation results in increase in the volume and height of column of the liquid water that is contained within the P.C.C. container 17; the increased volume of water results in exit of water through the overflow network 50, thus a constant maximum height of water within the P.C.C. container 17 is maintained, as desired. Valves 52 and 53 are open while valves 25, 56, and 65 are kept closed. The overflow water can be disposed into a designated area, or into an existing facility or piping network as desired. Equivalently, the overflow water flowing within the overflow network 50 may be stored in the liquid storage container 51 before being disposed through the liquid storage container drain network 62 and the liquid storage container drain valve 63, as desired.

Referring to FIG. 1, when a single type of P.C.C. 18 that is lighter than water and is immiscible in water is used to capture $CO_2$ from a body of polluted gaseous substance which also contains water vapor, or when a combination of both water and a lighter liquid that is immiscible with water are used as the P.C.C. 18, the water vapor that is contained in the incoming body of polluted gaseous substance becomes condensed and accumulated at the bottom of the P.C.C. container 17, under the body of the lighter P.C.C. 18 that is immiscible in water, resulting in gradually increasing the height of water column at the bottom of the P.C.C. container 17. The increase in hydrostatic pressure associated with the increase in the total height of the liquid within the P.C.C. container 17 activates the pressure relief valve 58 and opens the pressure relief valve momentarily so some water can exit through the drain network 55. After the release of some water and decrease of the total height of liquid in the P.C.C. container 17, the pressure relief valve 58 closes again; thus, the pressure relief valve 58 maintains a maximum height of water column within the P.C.C. container 17 as desired. The pressure relief valve 58 opens and closes at a range of total liquid heights that allows only the generated condensed water to exit the P.C.C. container 17 but not the lighter P.C.C. 18 that is immiscible with water and is on top of water column. This combination of two liquids as the P.C.C. 18 allows capturing of particulate substances as well as desired gases, such as $CO_2$, from a body of polluted gaseous substance. Valves 25, 52, and 65 are kept closed while valves 56, 57, 59, and 60 are kept open; the pressure relief valve 58 might become open or close, automatically, depending on the total height of liquid within the P.C.C. container 17.

Referring to FIG. 1, the liquid water that enters the liquid storage container 51 through either the overflow network 50 or the drain network 55 can exit the liquid storage container 51 through the liquid storage container drain network 62 and the liquid storage container drain valve 63 to be disposed into a designated area, or into an existing liquid storage, or into an existing facility or piping network as desired.

Referring to FIG. 1, the float valve 24 is used to control the amount of the liquid P.C.C. 18 that is inside the P.C.C. container 17. The float valve 24 can be connected to an external supply source of the liquid P.C.C. 18 so more of the liquid P.C.C. can flow into the P.C.C. container 17 when necessary. Multiple float valves 24 may be used for a single P.C.C. container 17, mounted at different locations as desired.

Referring to FIG. 1, thermal fins 27, or arrays of the thermal fins, are used to enhance heat transfer from the P.C.C. container 17 when the body of the polluted gaseous substance, that enters the P.C.C. container 17, is at a high temperature.

Referring to FIG. 1, one or multiple fill-up valve 25 are used to add any liquid into the P.C.C. container 17, as desired.

Referring to FIG. 1, one or multiple P.C.C. container drain network 26 is used to empty the P.C.C. container 17 from any liquid, as desired.

Referring to FIG. 1, one or multiple sight glasses 28 are mounted on the P.C.C. container 17, as desired, to see the level of liquid(s) inside the P.C.C. container 17.

Referring to FIG. 1, one or multiple sets of spare network 64 and spare network valve 65 are mounted on the P.C.C. container 17 as desired, and used to add any liquid into, or draw any liquid from, the P.C.C. container 17 as desired.

Referring to FIG. 1, two or more units of the wet embodiment of the pollutant capturer and mobilizer may be connected to each other such that the body of the polluted gaseous substance that exits one unit of the wet embodiment of the pollutant capturer and mobilizer is fed into another unit of the wet embodiment of the pollutant capturer and mobilizer with the exit from the last unit of the wet embodiment of the pollutant capturer and mobilizer being released, as treated gaseous substance, into the surrounding atmosphere. Similar or dissimilar liquid P.C.C. 18 may be used in different interconnected units of the wet embodiment of the pollutant capturer and mobilizer, allowing particulate substances as well as different types of gaseous polluting substances to be removed from a body of polluted gaseous substance as the latter flows through different interconnected units of the wet embodiment of the pollutant capturer and mobilizer.

Referring to FIG. 1, instead of making the body of the polluted gaseous substance to flow through the liquid P.C.C. 18, the liquid P.C.C. may be sprayed over the body of polluted gaseous substance as the latter flows through the P.C.C. container 17. The P.C.C. outlet network 39, the P.C.C. pump inlet valve 40, the P.C.C. pump inlet network 41, the P.C.C. pump 42, the P.C.C. pump outlet network 43, the P.C.C. pump outlet valve 44, the P.C.C. inlet network 45, the spray network 46, and the spray nozzles 47 are used to draw water, or the lighter liquid P.C.C. 18 that is immiscible with water and is on top of water, from the bottom of the P.C.C. container 17 and spray it over the body of polluted gaseous substance that is flowing through the P.C.C. container 17, as desired. The inclusion of the secondary distributor 11, branch 12, plug 13, branch connector 14, path extender 15, perforated disks 16, gas dividers 19, and their associated supports is optional for this mode of operation.

Referring to FIG. 1, during maintenance operations and with the maintenance drain network 68 open to fluid flow, pressurized water or air or any other cleaning fluid may be injected through the maintenance fill-up network 67 into the adaptor 8 to remove any particulate substances that might accumulate inside the riser 10 or the secondary distributor 11 or branches 12 or their interconnected components that are housed within the P.C.C. container, where captured polluting particulate substances may accumulate. Also, the maintenance window cover 69 may be removed to allow access to inside of the P.C.C. container 17 for cleaning and maintenance operations.

Referring to FIG. 1, when any component of the wet embodiment of the pollutant capturer and mobilizer is not included, the remaining components will be connected to each other with one of the remaining components being open to the flow of the body of the polluted gaseous substance so the functionality of the embodiment with fewer components is still maintained.

Referring to FIG. 1, when the primary supply connector 1 has one of its ends connected to one component of the wet embodiment of the pollutant capturer and mobilizer and its other end is open to an atmospheric body of polluted gaseous substance, then the end that opens to the atmospheric body of polluted gaseous substance can be much larger than the end that is connected to another component of the wet embodiment of the pollutant capturer and mobilizer and with the cross sectional area of the primary supply connector 1 gradually decreasing from its larger end towards its smaller end. A variable cross sectional area accelerates the atmospheric body of polluted gaseous substance as it flows from the larger end towards the smaller end of the primary supply connector 1, thus the accelerated atmospheric body of polluted gaseous substance can enter into the liquid P.C.C. 18 on its own with no need to using any flow-establishing device box. Additionally, the primary supply connector 1 can have one or multiple arrays of flappers mounted on its larger cross-sectional area. Each flapper can rotate about a pin only in one direction, thus flappers serve as check valves and allow the atmospheric body of polluted gaseous substance to only enter the primary supply connector 1 through its larger cross sectional area; upon passing through the flappers and entering the primary supply connector 1 through its larger cross sectional area, the atmospheric body of polluted gaseous substance will then have to accelerate within the primary supply connector 1 as it flows from the larger cross sectional area towards the smaller cross sectional area. The flappers and their associated pins are not shown in FIG. 1.

Referring to FIG. 1, When the inlet connector 5 has one of its ends connected to one component of the wet embodiment of the pollutant capturer and mobilizer and its other end is open to an atmospheric body of polluted gaseous substance, then the end that opens to the atmospheric body of polluted gaseous substance can be much larger than the end that is connected to another component of the wet embodiment of the pollutant capturer and mobilizer and with the cross sectional area of the inlet connector 5 gradually decreasing from its larger end towards its smaller end. A variable cross sectional area accelerates the atmospheric body of polluted gaseous substance as it flows from the larger end towards the smaller end of the inlet connector 5, thus the accelerated atmospheric body of polluted gaseous substance can enter into the liquid P.C.C. 18 on its own with no need to using any flow-establishing device box. Additionally, the inlet connector 5 can have one or multiple arrays of flappers mounted on its larger cross-sectional area. Each flapper can rotate about a pin only in one direction, thus flappers serve as check valves and allow the atmospheric body of polluted gaseous substance to only enter the inlet connector 5 through its larger cross sectional area; upon passing through the flappers and entering the inlet connector 5 through its larger cross sectional area, the atmospheric body of polluted gaseous substance will then have to accelerate within the inlet connector 5 as it flows from the larger cross sectional area towards the smaller cross sectional area. The flappers and their associated pins are not shown in FIG. 1.

8. Function of the Wet Embodiment of the Invention for Chimney or Stack Application Referring to FIG. 1, the wet embodiment of the pollutant capturer and mobilizer may be used to remove one or multiple types of polluting substances from a body of polluted gaseous substance that is flowing in a chimney or stack.

Referring to FIG. 1, the primary distributor 4 might have one or multiple inlet ports and one or multiple exit ports as desired; each of the exit ports directs a body of polluted gaseous substance to a P.C.C. container 17.

Referring to FIG. 1, the primary supply connector 1 of the wet embodiment of the pollutant capturer and mobilizer is attached to an existing chimney or stack. The body of the polluted gaseous substance that flows within the chimney or stack, enters into the primary supply connector 1 and flows through the primary screen box 2, the primary flow-establishing device box 3, the primary distributor 4, the inlet connector 5, the secondary screen box 6, the secondary flow-establishing device box 7, the adaptor 8, the P.C.C. container cap 9, the riser 10, the secondary distributor 11, the branch 12, the branch connector 14, the path extender 15 that is completely submerged within the body of the liquid P.C.C. 18, the perforated disks 16, the gas dividers 19, the splash shield 20, the P.C.C. container exit port 21, the P.C.C. shield 22, the P.C.C. shield retainer 23, and is released, in the form of a treated gaseous substance, into the surrounding atmosphere after one or multiple types of its polluting substances have been captured by the liquid P.C.C. 18 which is contained within the P.C.C. container 17 and some other components of the wet embodiment of the pollutant capturer and mobilizer which are housed within the P.C.C. container 17.

Referring to FIG. 1, the use of the primary screen box 2 and the secondary screen box 6 is optional for chimney or stack application of the wet embodiment of the pollutant capturer and mobilizer. Similarly, if the body of the polluted gaseous substance that exits the chimney or stack has sufficient energy to flow through different components of the wet embodiment of the pollutant capturer and mobilizer, the use of the primary flow-establishing device box 3 and the secondary flow-establishing device box 7 is also optional. Also, when a primary distributor 4 with only one inlet port and one exit port is needed, then the distributor 4, supply connectors 1, the primary and secondary screen boxes, and the primary and secondary flow-establishing device boxes do not have to be included in the wet embodiment of the pollutant capturer and mobilizer for the chimney or stack application of the wet embodiment of the pollutant capturer and mobilizer; the inlet connector 5 can be connected directly to the existing chimney or stack at one of its ends and to the adaptor 8 at its other end.

Referring to FIG. 1, when water is used as the liquid P.C.C. 18, the wet embodiment of the pollutant capturer and mobilizer can capture airborne particulate matter from the body of polluted gaseous substance as the polluted gaseous substance flows through the liquid P.C.C. 18 of the wet embodiment of the pollutant capturer and mobilizer. Produced crude oil, or other types of synthetic or manufactured oil may be used as the P.C.C. 18 of the wet embodiment of the pollutant capturer and mobilizer to capture $CO_2$ from the body of polluted gaseous substance. Any other desired type of liquid or combinations of liquids may be used as the P.C.C. 18 of the wet embodiment of the pollutant capturer and mobilizer provided that the liquid or combination of liquids can react with desired polluting substances of the body of polluted gaseous substance resulting in the removal of at least one type of the polluting substances from the body of polluted gaseous substance by dissolving or by absorbing or by formation of a solid substance or by denaturing or by consuming or by physical deposition or by altering the chemical properties of the polluting substances.

Referring to FIG. 1, when water is used as the P.C.C. 18 and the body of the polluted gaseous substance that enters the wet embodiment of the pollutant capturer and mobilizer contains water vapor, the water vapor condenses as the body of polluted gaseous substance flows through the body of water that is used as the liquid P.C.C. 18. The condensation results in increase in the volume and height of column of the liquid water that is contained within the P.C.C. container 17; the increased volume of water results in exit of water through the overflow network 50, thus a constant maximum height of water within the P.C.C. container 17 is maintained, as desired; valves 52 and 53 are open while valves 25, 56, and 65 are kept closed. The overflow water can be disposed into a designated area, or into an existing container, or facility, or piping network as desired. Equivalently, the overflow water flowing through the overflow network 50 may be stored in the liquid storage container 51 before being disposed through the liquid storage container drain network 62 and liquid storage container drain valve 63, as desired.

Referring to FIG. 1, when a single type of P.C.C. 18 that is lighter than water and is immiscible in water is used to capture $CO_2$ from a body of polluted gaseous substance which also contains water vapor, or when a combination of both water and a lighter liquid that is immiscible with water are used as the P.C.C. 18, the water vapor that is contained in the incoming body of polluted gaseous substance becomes condensed and accumulated at the bottom of the P.C.C. container 17, under the body of the lighter P.C.C. 18 that is immiscible in water, resulting in gradually increasing the height of water column at the bottom of the P.C.C. container 17. The increase in hydrostatic pressure associated with the increase in the total height of the liquid within the P.C.C. container 17 can activate the pressure relief valve 58 and open the pressure relief valve momentarily so some water can exit through the drain network 55. After the release of some water and decrease of the total height of liquid in the P.C.C. container 17, the pressure relief valve 58 closes again; thus, the pressure relief valve 58 maintains a maximum height of water column within the P.C.C. container 17 as desired. The pressure relief valve 58 opens and closes at a pre-set range of total liquid heights that allows only the generated condensed water to exit the P.C.C. container 17 but not the lighter P.C.C. 18 that is immiscible with water and is on top of water column. This combination of two liquids as the P.C.C. 18 allows capturing of particulate substance as well as desired gases, such as $CO_2$, from a body of polluted gaseous substance. Valves 25, 52, and 65 are kept closed while valves 56, 57, 59, and 60 are kept open; the pressure relief valve 58 might become open or close, automatically, depending on the total height of liquid within the P.C.C. container 17.

Referring to FIG. 1, the liquid water that enters the liquid storage container 51 through either the overflow network 50 or the drain network 55 can exit the liquid storage container 51 through the liquid storage container drain network 62 and the liquid storage container drain valve 63 to be disposed into a designated area, or into an existing liquid storage, or into an existing facility or piping network as desired.

Referring to FIG. 1, the float valve 24 is used to control the amount of the liquid P.C.C. 18 that is inside the P.C.C. container 17. The float valve 24 can be connected to an external supply source of the liquid P.C.C. 18 so more of the liquid P.C.C. can flow into the P.C.C. container 17 when necessary. Multiple float valves 24 may be used for a single P.C.C. container 17, mounted at different locations as desired.

Referring to FIG. 1, thermal fins 27, or arrays of the thermal fins, are used to enhance heat transfer from the P.C.C. container 17 when the body of the polluted gaseous substance, that enters the P.C.C. container 17, is at a high temperature.

Referring to FIG. 1, one or multiple fill-up valve 25 are used to add any liquid into the P.C.C. container 17, as desired.

Referring to FIG. 1, one or multiple P.C.C. container drain network 26 is used to empty the P.C.C. container 17 from any liquid, as desired.

Referring to FIG. 1, one or multiple sight glasses 28 are mounted on the P.C.C. container 17, as desired, to monitor the level of liquid(s) inside the P.C.C. container 17.

Referring to FIG. 1, one or multiple sets of spare network 64 and spare network valve 65 are mounted on the P.C.C. container 17 as desired, and used to add any liquid into, or draw any liquid from, the P.C.C. container 17 as desired.

Referring to FIG. 1, two or more units of the wet embodiment of the pollutant capturer and mobilizer may be connected to each other such that the body of the polluted gaseous substance that exits one unit of the wet embodiment of the pollutant capturer and mobilizer is fed into another unit of the wet embodiment of the pollutant capturer and mobilizer with the exit from the last unit of the wet embodiment of the pollutant capturer and mobilizer being released, as treated gaseous substance, into the surrounding atmosphere. Similar or dissimilar liquid P.C.C. 18 may be used in different interconnected units of the wet embodiment of the pollutant capturer and mobilizer, allowing particulate substances as well as different types of gaseous polluting substances to be removed from a body of polluted gaseous substance as the latter flows through different interconnected units of the wet embodiment of the pollutant capturer and mobilizer.

Referring to FIG. 1, instead of making the body of the polluted gaseous substance to flow through the liquid P.C.C. 18, the liquid P.C.C. may be sprayed over the body of polluted gaseous substance as the latter flows through the P.C.C. container 17. The P.C.C. outlet network 39, the P.C.C. pump inlet valve 40, the P.C.C. pump inlet network 41, the P.C.C. pump 42, the P.C.C. pump outlet network 43, the P.C.C. pump outlet valve 44, the P.C.C. inlet network 45, the spray network 46, and the spray nozzles 47 are used to draw water, or the lighter liquid P.C.C. 18 that is immiscible with water and is on top of water, from the bottom of the P.C.C. container 17 and spray it over the body of polluted gaseous substance that is flowing through the P.C.C. container 17, as desired. The inclusion of the secondary distributor 11, branch 12, plug 13, branch connector 14, path extender 15, perforated disks 16, gas dividers 19, and their associated supports is optional for this mode of operation.

Referring to FIG. 1, during maintenance operations and with the maintenance drain network 68 open to fluid flow, pressurized water or air or any other cleaning fluid may be injected through the maintenance fill-up network 67 into the adaptor 8 to remove any captured polluting particulate substances that might accumulate inside the riser 10 or the secondary distributor 11 or branches 12 or their interconnected components that are housed within the P.C.C. container, where the captured polluting particulate substances may accumulate. Also, the maintenance window cover 69 may be removed, temporarily, to allow access to inside of the P.C.C. container 17 for cleaning and maintenance operations.

Referring to FIG. 1, when any component of the wet embodiment of the pollutant capturer and mobilizer is not included, the remaining components will be connected to each other with one of the remaining components being open to the flow of the body of the polluted gaseous substance so the functionality of the embodiment with fewer components is still maintained.

9. Function of the Wet Embodiment of the Invention for Vehicle's Exhaust Pipe Application Referring to FIG. 1, the wet embodiment of the pollutant capturer and mobilizer may be used to remove one or multiple types of polluting substances from a body of polluted gaseous substance that is flowing in a vehicle's exhaust pipe.

Referring to FIG. 1, the primary distributor 4 might have one or multiple inlet ports and one or multiple exit ports as desired; each of the exit ports is connected to a P.C.C. container 17.

Referring to FIG. 1, each of the primary supply connectors 1 of the wet embodiment of the pollutant capturer and mobilizer are attached to an existing vehicle's exhaust pipe, as desired. The body of polluted gaseous substance, that flows within the vehicle's exhaust pipe, enters into the primary supply connector 1 and flows through the primary screen box 2, the primary flow-establishing device box 3, the primary distributor 4, the inlet connector 5, the secondary screen box 6, the secondary flow-establishing device box 7, the adaptor 8, the P.C.C. container cap 9, the riser 10, the secondary distributor 11, the branch 12, the branch connector 14, the path extender 15 that is completely submerged within the body of the liquid P.C.C. 18, the perforated disks 16, the gas dividers 19, the splash shield 20, the P.C.C. container exit port 21, the P.C.C. shield 22, the P.C.C. shield retainer 23, and is released in the form of a treated gaseous substance into the surrounding atmosphere after one or multiple types of its polluting substances have been captured by the liquid P.C.C. 18 which is contained within the P.C.C. container 17 and some other components of the wet embodiment of the pollutant capturer and mobilizer which are housed within the P.C.C. container 17.

Referring to FIG. 1, the use of the primary screen box 2 and the secondary screen box 6 is optional for vehicle's exhaust pipe application. Similarly, if the body of the polluted gaseous substance that exits the vehicle's exhaust pipe has sufficient energy to flow through different components of the wet embodiment of the pollutant capturer and mobilizer, the use of the primary flow-establishing device box 3 and the secondary flow-establishing device box 7 is also optional. Also, when a primary distributor 4 with only one inlet port and one exit port is needed, then the distributor and its remaining associated primary supply connectors 1 do not have to be included in the wet embodiment of the pollutant capturer and mobilizer for the vehicle's exhaust pipe application; the inlet connector 5 can be connected directly to the existing vehicle's exhaust pipe at one of its ends and to the adaptor 8 at its other end.

Referring to FIG. 1, when water is used as the liquid P.C.C. 18, the wet embodiment of the pollutant capturer and mobilizer can capture airborne particulate matter from the body of polluted gaseous substance as the polluted gaseous substance flows through the liquid P.C.C. 18 of the wet embodiment of the pollutant capturer and mobilizer. Produced crude oil, or other types of synthetic or manufactured oil may be used as the P.C.C. 18 of the wet embodiment of the pollutant capturer and mobilizer to capture $CO_2$ from the body of polluted gaseous substance. Any other desired type of liquid or combinations of liquids may be used as the P.C.C. 18 of the wet embodiment of the pollutant capturer and mobilizer provided that the liquid or combination of liquids can react with desired polluting substances of the body of polluted gaseous substance resulting in the removal of at least one type of the polluting substances from the body of polluted gaseous substance by dissolving or by absorbing or by formation of a solid substance or by denaturing or by consuming or by physical deposition or by altering the chemical properties of the polluting substances.

Referring to FIG. 1, when water is used as the P.C.C. 18 and the body of the polluted gaseous substance that enters the wet embodiment of the pollutant capturer and mobilizer contains water vapor, the water vapor condenses as the body of polluted gaseous substance flows through the body of water that is used as the liquid P.C.C. 18. The condensation results in increase in the volume and height of column of the liquid water that is contained within the P.C.C. container 17. The increased volume of water results in exit of water through the overflow network 50, thus a constant maximum height of water within the P.C.C. container 17 is maintained, as desired; valves 52 and 53 are open while valves 25, 56, and 65 are kept closed. The overflow water can be disposed as desired. Equivalently, the overflow water flowing within the overflow network 50 may be stored in the liquid storage container 51 before being disposed through the liquid storage container drain network 62 and liquid storage container drain valve 63, as desired.

Referring to FIG. 1, when a single type of P.C.C. 18 that is lighter than water and is immiscible in water is used to capture $CO_2$ from the body of polluted gaseous substance which contains also water vapor, or when a combination of both water and a lighter liquid that is immiscible with water are used as the P.C.C. 18, the water vapor that is contained in the incoming body of polluted gaseous substance becomes condensed and accumulated at the bottom of the P.C.C. container 17, under the body of the lighter P.C.C. 18 that is immiscible in water, resulting in gradually increasing the height of water column at the bottom of the P.C.C. container 17. The increase in hydrostatic pressure associated with the increase in the total height of the liquid within the P.C.C. container 17 can activate the pressure relief valve 58 and open the pressure relief valve momentarily so some water can exit through the drain network 55. After the release of some water and decrease of the total height of liquid in the P.C.C. container 17, the pressure relief valve 58 closes again; thus, the pressure relief valve 58 maintains a maximum height of water column within the P.C.C. container 17 as desired. The pressure relief valve 58 opens and closes at a pre-set range of total liquid height that allows only the generated condensed water to exit the P.C.C. container 17 but not the lighter P.C.C. 18 that is immiscible with water and is on top of water column. This combination of two liquids as the P.C.C. 18 allows capturing of particulate matter as well as desired gases, such as $CO_2$, from a body of polluted gaseous substance. Valves 25, 52, and 65 are kept closed while valves 56, 57, 59, and 60 are kept open; the pressure relief valve 58 might become open or close, automatically, depending on the total height of liquid within the P.C.C. container 17.

Referring to FIG. 1, the liquid water that enters the liquid storage container 51 through either the overflow network 50 or the drain network 55 can exit the liquid storage container 51 through the liquid storage container drain network 62 and the liquid storage container drain valve 63 to be disposed into a designated area, or into an existing liquid storage, or into an existing facility or piping network as desired.

Referring to FIG. 1, the float valve 24 is used to control the amount of the liquid P.C.C. 18 that is inside the P.C.C. container 17. The float valve 24 can be connected to an external supply source of the liquid P.C.C. 18 so more of the liquid P.C.C. can flow into the P.C.C. container 17 when necessary. Multiple float valves 24 may be used for a single P.C.C. container 17, mounted at different locations as desired.

Referring to FIG. 1, thermal fins 27, or arrays of the thermal fins, are used to enhance heat transfer from the P.C.C. container 17 when the body of polluted gaseous substance, that enters the P.C.C. container 17, is at a high temperature.

Referring to FIG. 1, one or multiple fill-up valve 25 are used to add any liquid into the P.C.C. container 17, as desired.

Referring to FIG. 1, one or multiple P.C.C. container drain network 26 can be used to empty the P.C.C. container 17 from any liquid, as desired.

Referring to FIG. 1, one or multiple sight glasses 28 are mounted on the P.C.C. container 17, as desired, to monitor the level of liquid(s) inside the P.C.C. container 17.

Referring to FIG. 1, one or multiple sets of spare network 64 and spare network valve 65 can be mounted on the P.C.C. container 17, as desired, to use to add any liquid into, or draw any liquid from, the P.C.C. container 17 as desired.

Referring to FIG. 1, two or more units of the wet embodiment of the pollutant capturer and mobilizer may be connected to each other such that the body of the polluted gaseous substance that exits one unit of the wet embodiment of the pollutant capturer and mobilizer is fed into another unit of the wet embodiment of the pollutant capturer and mobilizer with the exit from the last unit of the wet embodiment of the pollutant capturer and mobilizer being released, as treated gaseous substance, into the surrounding atmosphere. Similar or dissimilar liquid P.C.C. 18 may be used in different interconnected units of the wet embodiment of the pollutant capturer and mobilizer, allowing different polluting substances to be removed from the body of polluted gaseous substance as the latter flows through different interconnected units of the wet embodiment of the pollutant capturer and mobilizer for vehicle's exhaust pipe application.

Referring to FIG. 1, when any component of the wet embodiment of the pollutant capturer and mobilizer is not included, the remaining components will be connected to each other with one of the remaining components connected to the open end of the existing vehicle's exhaust pipe so the functionality of the wet embodiment of the pollutant capturer and mobilizer, in capturing the polluting substances of the body of polluted gaseous substance, with fewer components is still maintained.

Referring to FIG. 7, a wet embodiment of the pollutant capturer and mobilizer with fewer components can be connected to a vehicle's exhaust pipe to capture polluting substances from a body of polluted gaseous substance that flows within the exhaust pipe. The inlet connector 5 is connected to the vehicle's exhaust pipe; the inlet connector is equipped with a removable cap with the cap being removed temporarily to get access to inside the exhaust pipe for emission testing that is required for vehicle registration. Some of the components shown in FIG. 7 might be excluded from the wet embodiment of the pollutant capturer and mobilizer for vehicle's exhaust pipe application as desired. The inclusion of other components of the wet embodiment of the pollutant capturer and mobilizer, as seen in FIG. 1, is optional for the wet embodiment of the pollutant capturer and mobilizer for vehicle's exhaust pipe application.

10. Function of the Wet Embodiment of the Invention for Vehicle-Mount Application Referring to FIG. 1, the wet embodiment of the pollutant capturer and mobilizer for vehicle-mount application can be mounted at a desired point on a vehicle, such as on the vehicle's top or on the side or on the front or on the rear or under the hood of the vehicle, and is used to remove one or multiple types of polluting substances from an atmospheric body of polluted gaseous substance as desired.

Referring to FIG. 1, the primary distributor 4 can have one or multiple inlet ports and one or multiple exit ports as desired; each of the exit ports can be connected to a P.C.C. container 17.

Referring to FIG. 1, each of the primary supply connectors 1 is open to the atmospheric body of polluted gaseous substance, as desired. The atmospheric body of polluted gaseous substance enters into the primary supply connector 1 and flows through the primary screen box 2, the primary flow-establishing device box 3, the primary distributor 4, the inlet connector 5, the secondary screen box 6, the secondary flow-establishing device box 7, the adaptor 8, the P.C.C. container cap 9, the riser 10, the secondary distributor 11, the branch 12, the branch connector 14, the path extender 15 that is completely submerged within the body of the liquid P.C.C. 18, the perforated disks 16, the gas dividers 19, the splash shield 20, the P.C.C. container exit port 21, the P.C.C. shield 22, and the P.C.C. shield retainer 23 and is released, in the form of a treated gaseous substance, into the surrounding atmosphere after one or multiple types of its polluting substances have been captured by the liquid P.C.C. 18 which is contained within the P.C.C. container 17 and some other components of the wet embodiment of the pollutant capturer and mobilizer which are housed within the P.C.C. container 17.

Referring to FIG. 1, the use of the primary screen box 2 and the secondary screen box 6 is optional for vehicle-mount application.

Referring to FIG. 1, as the vehicle moves at its speed, the atmospheric body of polluted gaseous substance enters the primary supply connectors 1 at the vehicle's speed. If the vehicle's speed, thus the speed and energy with which the atmospheric body of polluted gaseous substance enters the primary supply connectors 1, is sufficient for the atmospheric body of polluted gaseous substance to flow through the wet embodiment of the pollutant capturer and mobilizer, the use of the primary flow-establishing device box 3 and the secondary flow-establishing device box 7 is also optional. Also, when a primary distributor 4 with only one inlet port and one exit port is needed, then the distributor 4 and its associated primary supply connectors 1, the primary screen boxes 2, and the primary flow-establishing device boxes 3 do not have to be included in the wet embodiment of the pollutant capturer and mobilizer for the vehicle-mount application; the inlet connector 5 can then be open directly to the atmospheric body of polluted gaseous substance which delivers the atmospheric body of polluted gaseous substance to the secondary screen box 6 and the adaptor 8.

Referring to FIG. 1, when water is used as the liquid P.C.C. 18, the wet embodiment of the pollutant capturer and mobilizer can capture aerosol and airborne particulate matter from the atmospheric body of polluted gaseous substance as the atmospheric body of polluted gaseous substance flows through the liquid P.C.C. 18 of the wet embodiment of the pollutant capturer and mobilizer. Produced crude oil, or other types of synthetic or manufactured oil may be used as the P.C.C. 18 of the wet embodiment of the pollutant capturer and mobilizer for vehicle-mount application to capture $CO_2$ from the atmospheric body of polluted gaseous substance. Any other desired type of liquid or combinations of liquids may be used as the P.C.C. 18 of the wet embodiment of the pollutant capturer and mobilizer provided that the liquid or combination of liquids can react with desired polluting substances of the atmospheric body of polluted gaseous substance resulting in the removal of at least one type of the polluting substances from the atmospheric body of polluted gaseous substance by dissolving or by absorbing or by formation of a solid substance or by denaturing or by consuming or by physical deposition or by altering the chemical properties of the polluting substances.

Referring to FIG. 1, when water is used as the liquid P.C.C. 18 and the atmospheric body of polluted gaseous substance that enters the wet embodiment of the pollutant capturer and mobilizer contains water vapor, the water vapor condenses as the atmospheric body of polluted gaseous substance flows through the body of water that is used as the liquid P.C.C. 18. The condensation results in increase in the volume and height of column of the liquid water that is contained within the P.C.C. container 17. The increased volume of water results in exit of water through the overflow network 50, thus a constant maximum height of water within the P.C.C. container 17 is maintained, as desired; valves 52 and 53 are open while valves 25, 56, and 65 are kept closed. The overflow water can be disposed as desired. Equivalently, the overflow water flowing within the overflow network 50 may be stored in the liquid storage container 51 before being disposed through the liquid storage container drain network 62 and valve 63, as desired.

Referring to FIG. 1, when a single type of liquid P.C.C. 18 that is lighter than water and is immiscible in water is used to capture $CO_2$ from an atmospheric body of polluted gaseous substance which contains also water vapor, or when a combination of both water and a lighter liquid that is immiscible with water are used as the P.C.C. 18, the water vapor that is contained in the incoming atmospheric body of polluted gaseous substance becomes condensed and accumulated at the bottom of the P.C.C. container 17, under the body of the lighter liquid P.C.C. 18 that is immiscible in water, resulting in gradually increasing the height of water column at the bottom of the P.C.C. container 17. The increase in hydrostatic pressure associated with the increase in the total height of the liquid within the P.C.C. container 17 can activate the pressure relief valve 58 and open the pressure relief valve momentarily so some water can exit through the drain network 55. After the release of some water and decrease of the total height of liquid in the P.C.C. container 17, the pressure relief valve 58 closes again; thus, the pressure relief valve 58 maintains a maximum height of water column within the P.C.C. container 17 as desired. The pressure relief valve 58 opens and closes at a pre-set range of total liquid height that allows only the generated condensed water to exit the P.C.C. container 17 but not the lighter liquid P.C.C. 18 that is immiscible with water and is on top of water column. This combination of two liquids as the liquid P.C.C. 18 allows capturing of particulate matter as well as desired gases, such as $CO_2$, from an atmospheric body of polluted gaseous substance. Valves 25, 52, and 65 are kept closed while valves 56, 57, 59, and 60 are kept open; the pressure relief valve 58 might become open or close automatically, depending on the total height of liquid within the P.C.C. container 17.

Referring to FIG. 1, the liquid water that enters the liquid storage container 51 through either the overflow network 50 or the drain network 55 can exit the liquid storage container 51 through the liquid storage container drain network 62 and the valve 63 to be disposed as desired, or to be disposed into a designated area, or into an existing liquid storage container, or into an existing facility or piping network as desired.

Referring to FIG. 1, the float valve 24 is used to control the amount of the liquid that is inside the P.C.C. container 17. The float valve 24 can be connected to an external supply source of any desired liquid so more of the liquid can flow into the P.C.C. container 17 when necessary. Multiple float valves 24, with their associated liquid supply source, may be used for a single P.C.C. container 17, mounted at different locations as desired. The liquid supply source is not shown in FIG. 1.

Referring to FIG. 1, thermal fins 27, or arrays of the thermal fins, are used to enhance heat transfer from the P.C.C. container 17 when the atmospheric body of polluted gaseous substance that enters the P.C.C. container 17 is at a high temperature.

Referring to FIG. 1, one or multiple fill-up valves 25 are used to add any liquid into the P.C.C. container 17, as desired.

Referring to FIG. 1, one or multiple P.C.C. container drain network 26 is used to empty the P.C.C. container 17 from any liquid, as desired.

Referring to FIG. 1, one or multiple sight glasses 28 can be mounted on the P.C.C. container 17, as desired, to see the level of liquid(s) inside the P.C.C. container 17.

Referring to FIG. 1, one or multiple sets of spare network 64 and spare network valve 65 can be mounted on the P.C.C. container 17, as desired, and used to add any liquid into, or draw any liquid from, the P.C.C. container 17 as desired.

Referring to FIG. 1, two or multiple units of the wet embodiment of the pollutant capturer and mobilizer may be connected to each other such that the body of polluted gaseous substance that exits one unit of the wet embodiment of the pollutant capturer and mobilizer is fed into another unit of the wet embodiment of the pollutant capturer and mobilizer with the exit from the last unit of the interconnected units of the wet embodiment of the pollutant capturer and mobilizer being released, as treated gaseous substance, into the surrounding atmosphere. Similar or dissimilar liquid P.C.C. 18 may be used in each of the interconnected units of the wet embodiment of the pollutant capturer and mobilizer, allowing different types of polluting substances to be removed from the atmospheric body of polluted gaseous substance as the latter flows through different interconnected units of the wet embodiment of the pollutant capturer and mobilizer for vehicle-mount application.

Referring to FIG. 1, when any component of the wet embodiment of the pollutant capturer and mobilizer is not included, the remaining components will be connected to each other with one of the remaining components being open to the flow of the body of polluted gaseous substance so the functionality of the wet embodiment of the pollutant capturer and mobilizer, in capturing the polluting substances of the body of polluted gaseous substance, with fewer components is still maintained.

11. Function of the Dry Embodiment of the Invention for Stationary Applications Referring to FIG. 2, the dry embodiment of the pollutant capturer and mobilizer may be used as a stationary unit mounted on the ground or on a foundation or structure on streets, or in industrial parks, or in proximity of industrial plants and facilities, or in proximity of wildfires or active volcanos, or on rooftops, or on ships and other floating structures, or on trailers or other mobile platforms at desired locations to remove particulate polluting substances from an atmospheric body of polluted gaseous substance.

Referring to FIG. 2, the distributor 102 might have one or multiple inlet ports and one or multiple exit ports as desired; each of the exit ports is connected to a secondary bird protection barrier 104 or another component of the dry embodiment of the pollutant capturer and mobilizer. A distributor with only one inlet port and two exit ports is shown in FIG. 2. Components connected to only one inlet port and one exit port of the distributor 102 are shown in FIG. 2; components connected to other inlet and exit ports of the distributor will be similar to those shown in FIG. 2. When a distributor 102 with only one inlet port and one exit port is needed, then the inclusion of the secondary bird protection barrier 104 and the secondary flow-establishing device box 105 in the dry embodiment of the pollutant capturer and mobilizer will be optional and the exit port of the distributor 102 can be connected directly to the dust box 106.

Referring to FIG. 2, with the supply connector 112 open to the flow of the body of polluted gaseous substance, and one or both of the primary flow-establishing device boxes 114 and the secondary flow-establishing device boxes 105 in operation, the body of polluted gaseous substance is taken into the dry embodiment of the pollutant capturer and mobilizer. After flowing through the supply connector 112, the primary bird protection barrier 113, the primary flow-establishing device box 114, the distributor 102, the secondary bird protection barriers 104, the secondary flow-establishing device box 105, the dust box 106, the filter house 108, and the pollutant removal filter 109, the body of polluted gaseous substance is released, in the form of a treated gaseous substance, into the surrounding atmosphere in a desired direction that is dictated by the angles of the vents of the filter house 108, after its particulate polluting substances have been captured by the pollutant removal filter 109 of the dry embodiment of the pollutant capturer and mobilizer.

Referring to FIG. 2, the dust box cap 107 is removed at desired intervals, temporarily, to empty its associated dust well of the dust box 106 from the accumulated particulate polluting substances.

Referring to FIG. 2, the rotating or sliding side of the filter house 108 can be used to get access into the internal space of the filter house 108 for maintenance or replacement of the pollutant removal filter 109.

Referring to FIG. 2, the heat insulators 103 are used as a thermal barrier between the supply connector 112 or any other component of the dry embodiment of the pollutant capturer and mobilizer and an existing hot surface, to which the components of the dry embodiment of the pollutant capturer and mobilizer might be in contact, to protect the components of the dry embodiment of the pollutant capturer and mobilizer against high temperatures.

Referring to FIG. 2, the thermal fins 111 or arrays of the thermal fins are attached to surfaces of desired components of the dry embodiment of the pollutant capturer and mobilizer to enhance the dissipation of heat, from the components, that might be carried into the dry embodiment of the pollutant capturer and mobilizer by a high-temperature body of polluted gaseous substance.

Referring to FIG. 2, one or multiple rain shields 110 are used to protect components of the dry embodiment of the pollutant capturer and mobilizer against rain or other undesired atmospheric conditions. One rain shield 110 is shown in FIG. 2; any other desired number of the rain shields may be used. The rain shields may be mounted on the base structure 101 or on any other component of the dry embodiment of the pollutant capturer and mobilizer, or on any combination of the base structure and components of the dry embodiment of the pollutant capturer and mobilizer as desired.

Referring to FIG. 2, when any component of the dry embodiment of the pollutant capturer and mobilizer is not included, the remaining components will be connected to each other with one of the remaining components being open to the flow of the body of polluted gaseous substance so the functionality of the dry embodiment of the pollutant capturer and mobilizer, in capturing the polluting substances of the body of polluted gaseous substance, with fewer components is still maintained.

12. Function of the Dry Embodiment of the Invention for Chimney or Stack Application Referring to FIG. 2, the dry embodiment of the pollutant capturer and mobilizer may be used to remove particulate polluting substances from a body of polluted gaseous substance that flows in a chimney or stack.

Referring to FIG. 2, the base structure 101 may be mounted on a desired type of foundation at the vicinity of an existing chimney or stack, or attached directly to the chimney or stack as desired.

Referring to FIG. 2, the distributor 102 might have one or multiple inlet ports and one or multiple exit ports as desired; each of the exit ports is connected to a secondary bird protection barrier 104 or another component of the dry embodiment of the pollutant capturer and mobilizer. A distributor with only one inlet port and two exit ports is shown in FIG. 2. Components connected to only one inlet port and one exit port of the distributor 102 are shown in FIG. 2; components connected to other inlet and exit ports of the distributor will be similar to those shown in FIG. 2. When a distributor 102 with only one inlet port and one exit port is needed, then the inclusion of the secondary bird protection barrier 104 and the secondary flow-establishing device box 105 in the dry embodiment of the pollutant capturer and mobilizer will be optional and the exit port of the distributor 102 can be connected directly to the dust box 106.

Referring to FIG. 2, with the supply connector 112 of the dry embodiment of the pollutant capturer and mobilizer connected to the open end of an existing chimney or stack, the body of polluted gaseous substance that is flowing through the chimney or stack is directed to enter into the supply connector 112 of the dry embodiment of the pollutant capturer and mobilizer. With one or both of the primary flow-establishing device boxes 114 and the secondary flow-establishing device boxes 105 in operation, the body of polluted gaseous substance is taken into the dry embodiment of the pollutant capturer and mobilizer. After flowing through the supply connector 112, the primary bird protection barrier 113, the primary flow-establishing device box 114, the distributor 102, the secondary bird protection barriers 104, the secondary flow-establishing device box 105, the dust box 106, the filter house 108, and the pollutant removal filter 109, the body of polluted gaseous substance is released, in the form of a treated gaseous substance, into the surrounding atmosphere in a desired direction that is dictated by the angles of the vents of the filter house 108, after the particulate polluting substances of the body of polluted gaseous substance have been captured by the pollutant removal filter 109 of the dry embodiment of the pollutant capturer and mobilizer.

Referring to FIG. 2, if the body of polluted gaseous substance that exits the chimney or stack has sufficient energy to flow through all of the components of the dry embodiment of the pollutant capturer and mobilizer on its own, then the inclusion of any of the primary flow-establishing device box 114 and the secondary flow-establishing device box 105 is optional. Also, the inclusion of the primary bird protection barrier 113 and the secondary bird protection barrier 104 is optional, as desired, for the chimney or stack application of the dry embodiment of the pollutant capturer and mobilizer.

Referring to FIG. 2, the dust box cap 107 is removed at desired intervals, temporarily, to empty its associated dust well of the dust box 106 from the accumulated particulate polluting substances.

Referring to FIG. 2, the rotating or sliding side of the filter house 108 may be used to get access into the internal space of the filter house 108 for maintenance or replacement of the pollutant removal filter 109.

Referring to FIG. 2, the heat insulators 103 are used as a thermal barrier between the supply connector 112 or any other component of the dry embodiment of the pollutant capturer and mobilizer and the hot surface of the chimney or stack, to which the components of the dry embodiment of the pollutant capturer and mobilizer might be in contact, to protect the components of the dry embodiment of the pollutant capturer and mobilizer against high temperatures.

Referring to FIG. 2, the thermal fins 111 or arrays of the thermal fins are attached to surfaces of desired components of the dry embodiment of the to enhance the dissipation of heat, from the components, that might be carried into the dry embodiment of the pollutant capturer and mobilizer by a high-temperature body of polluted gaseous substance that exits the chimney or stack and enters the dry embodiment of the pollutant capturer and mobilizer.

Referring to FIG. 2, one or multiple rain shields 110 are used to protect components of the dry embodiment of the pollutant capturer and mobilizer against rain or other undesired atmospheric conditions. One rain shield 110 is shown in FIG. 2; any other desired number of the rain shields may be used. The rain shields may be mounted at desired points on the chimney or stack or on the base structure 101 or on any other components of the dry embodiment of the pollutant capturer and mobilizer, or on any combination of the base structure and components of the dry embodiment of the pollutant capturer and mobilizer as desired.

Referring to FIG. 2, when any component of the dry embodiment of the pollutant capturer and mobilizer is not included for chimney or stack application, the remaining components will be connected to each other with one of the remaining components connected to the open end of the existing chimney or stack so the functionality of the dry embodiment of the pollutant capturer and mobilizer, in capturing the polluting substances of the body of polluted gaseous substance, with fewer components is still maintained.

13. Function of the Dry Embodiment of the Invention for Vehicle's Exhaust Pipe Application Referring to FIG. 2, the dry embodiment of the pollutant capturer and mobilizer may be used to remove particulate polluting substances from a body of polluted gaseous substance that flows in the exhaust pipe of a vehicle.

Referring to FIG. 2, the base structure 101 may be mounted on a vehicle at a desired location, or attached directly to the vehicle's exhaust pipe as desired.

Referring to FIG. 2, the distributor 102 might have one or multiple inlet ports and one or multiple exit ports as desired; each of the exit ports is connected to a secondary bird protection barrier 104 or another component of the dry embodiment of the pollutant capturer and mobilizer. A distributor with only one inlet port and two exit ports is shown in FIG. 2. Components connected to only one inlet port and one exit port of the distributor 102 are shown in FIG. 2; components connected to other inlet and exit ports of the distributor will be similar to those shown in FIG. 2. When a distributor 102 with only one inlet port and one exit port is needed, then the inclusion of the secondary bird protection barrier 104 and the secondary flow-establishing device box 105 in the dry embodiment of the pollutant capturer and mobilizer will be optional and the exit port of the distributor 102 can be connected directly to the dust box 106.

Referring to FIG. 2, with the supply connector 112 of the dry embodiment of the pollutant capturer and mobilizer connected to the open end of an existing vehicle's exhaust pipe, the body of polluted gaseous substance that is flowing through the exhaust pipe is directed to enter into the supply connector 112 of the dry embodiment of the pollutant capturer and mobilizer. With one or both of the primary flow-establishing device boxes 114 and the secondary flow-establishing device boxes 105 in operation, the body of polluted gaseous substance is taken into the dry embodiment of the pollutant capturer and mobilizer. After flowing through the supply connector 112, the primary bird protection barrier 113, the primary flow-establishing device box 114, the distributor 102, the secondary bird protection barriers 104, the secondary flow-establishing device box 105, the dust box 106, the filter house 108, and the pollutant removal filter 109, the body of polluted gaseous substance is released, in the form of a treated gaseous substance, into the surrounding atmosphere in a desired direction that is dictated by the angles of the vents of the filter house 108, after the particulate polluting substances of the polluted gaseous substance have been captured by the pollutant removal filter 109 of the dry embodiment of the pollutant capturer and mobilizer.

Referring to FIG. 2, If the body of polluted gaseous substance that exits the vehicle's exhaust pipe has sufficient energy to flow through all of the utilized components of the dry embodiment of the pollutant capturer and mobilizer on its own, then the inclusion of any of the primary flow-establishing device box 114 and the secondary flow-establishing device box 105 is optional. Also, the inclusion of the primary bird protection barrier 113 and the secondary bird protection barrier 104 is optional, as desired, for the vehicle's exhaust pipe application of the dry embodiment of the pollutant capturer and mobilizer. Moreover, without using the distributor 102, one end of the supply connector 112 can be connected to the open end of the vehicle's exhaust pipe and the other end of the supply connector 112 can be connected to the dust box 106 as seen in FIG. 12; heat insulator 103 is used to insulate the vehicle's exhaust pipe from the supply connector 112 thermally.

Referring to FIG. 2, the dust box cap 107 is removed at desired intervals, temporarily, to empty its associated dust well of the dust box 106 from the accumulated particulate polluting substances.

Referring to FIG. 2, the rotating or sliding side of the filter house 108 may be used to get access into the internal space of the filter house 108 for maintenance or replacement of the pollutant removal filter 109.

Referring to FIG. 2, the heat insulators 103 are used as a thermal barrier between the supply connector 112 or any other component of the dry embodiment of the pollutant capturer and mobilizer and the hot surface of the vehicle's exhaust pipe, to which the components of the dry embodiment of the pollutant capturer and mobilizer might be in contact, to protect the components of the dry embodiment of the pollutant capturer and mobilizer against high temperatures.

Referring to FIG. 2, the thermal fins 111 or arrays of the thermal fins are attached to surfaces of desired components of the dry embodiment of the pollutant capturer and mobilizer to enhance the dissipation of heat, from the components, that might be carried into the dry embodiment of the pollutant capturer and mobilizer by a high-temperature body of polluted gaseous substance that exits the vehicle's exhaust pipe and enters the dry embodiment of the pollutant capturer and mobilizer.

Referring to FIG. 2, one or multiple rain shields 110 are used to protect components of the dry embodiment of the pollutant capturer and mobilizer against rain or other undesired atmospheric conditions. One rain shield 110 is shown in FIG. 2; any other desired number of the rain shields may be used. The rain shields may be mounted at a desired point on the vehicle or on the base structure 101 or on any other component of the dry embodiment of the pollutant capturer and mobilizer, or on any combination of the base structure and components of the dry embodiment of the pollutant capturer and mobilizer as desired.

Referring to FIG. 2, when any component of the dry embodiment of the pollutant capturer and mobilizer is not included for vehicle's exhaust pipe application, the remaining components will be connected to each other with one of the remaining components connected to the open end of the existing vehicle's exhaust pipe so the functionality of the embodiment, in capturing the polluting substances of the body of polluted gaseous substance, with fewer components is still maintained.

14. Function of the Dry Embodiment of the Invention for Vehicle-Mount Application Referring to FIG. 2, one or more components of the dry embodiment of the pollutant capturer and mobilizer can be included for the vehicle-mount application. The dry embodiment of the pollutant capturer and mobilizer for vehicle-mount application can be mounted at a desired point on a vehicle, such as on the vehicle's front or top or side or rear or under the hood, and is used to remove particulate polluting substances from an atmospheric body of polluted gaseous substance as the vehicle moves from one location to another.

Referring to FIG. 2, the distributor 102 might have one or multiple inlet ports and one or multiple exit ports as desired;

each of the exit ports is connected to a secondary bird protection barrier 104 or another component of the dry embodiment of the pollutant capturer and mobilizer. A distributor with only one inlet port and two exit ports is shown in FIG. 2. Components connected to only one inlet port and one exit port of the distributor 102 are shown in FIG. 2; components connected to other inlet and exit ports of the distributor will be similar to those shown in FIG. 2.

Referring to FIG. 2, the use of the heat insulators 103 and the thermal fins 111 or arrays of thermal fins are optional for the vehicle-mount application of the dry embodiment of the pollutant capturer and mobilizer.

Referring to FIG. 2, when a distributor 102 with only one inlet port and one exit port is used for the vehicle-mount application of the dry embodiment of the pollutant capturer and mobilizer, then the inclusion of the secondary bird protection barrier 104, the secondary flow-establishing device box 105, the thermal fins 111 or arrays of thermal fins, the supply connector 112, and the heat insulators 103 in the dry embodiment of the pollutant capturer and mobilizer will be optional and the exit port of the distributor 102 can be connected directly to the dust box 106. Also, the use of the primary flow-establishing device box 114 is optional for the vehicle-mount application; the atmospheric body of polluted gaseous substance can flow through the internal spaces of the dry embodiment of the pollutant capturer and mobilizer, on its own, as the vehicle moves from one location to another.

Referring to FIG. 2, with either the supply connector 112 or the inlet port of the distributor 102 open to the flow of the atmospheric body of polluted gaseous substance, and as the vehicle moves from one location to another, the atmospheric body of polluted gaseous substance flows through internal spaces of the dry embodiment of the pollutant capturer and mobilizer for vehicle-mount application and exits the embodiment, in the form of a treated gaseous substance, to enter into the surrounding atmosphere, after its particulate polluting substances have been captured by the pollutant removal filter 109 of the dry embodiment of the pollutant capturer and mobilizer. The captured particulate polluting substances accumulate in the dust well of the dust box 106 and fill-up the dust well gradually.

Referring to FIG. 2, the dust box cap 107 is removed at desired intervals, temporarily, to empty its associated dust well of the dust box 106 from the accumulated particulate polluting substances.

Referring to FIG. 2, the rotating or sliding side of the filter house 108 may be used to get access into the internal space of the filter house 108 for maintenance or replacement of the pollutant removal filter 109 as desired.

Referring to FIG. 2, one or multiple rain shields 10 are used to protect components of the dry embodiment of the pollutant capturer and mobilizer for the vehicle-mount application against rain or other undesired atmospheric conditions. One rain shield 10 is shown in FIG. 2; any other desired number of the rain shields may be used as desired. The rain shields may be mounted on the vehicle or on the base structure 101 or on any other component of the dry embodiment of the pollutant capturer and mobilizer, or on any combination of the base structure and components of the dry embodiment of the pollutant capturer and mobilizer as desired.

Referring to FIG. 2, when any component of the dry embodiment of the pollutant capturer and mobilizer is not included for the vehicle-mount application, the remaining components will be connected to each other with one of the remaining components being open to the flow of the atmospheric body of polluted gaseous substance so the functionality of the embodiment, in capturing the polluting substances of the atmospheric body of polluted gaseous substance, with fewer components is still maintained.

15. How to Use the Invention

The wet embodiment of the pollutant capturer and mobilizer can be used to capture particulates and other desired polluting substances from a body of polluted gaseous substance that occupies a space in the atmosphere or exits a chimney or stack or a vehicle's exhaust pipe.

When water is used as the liquid pollutant capturing component, the wet embodiment of the pollutant capturer and mobilizer can capture particulate substance as well as gaseous polluting substances, that are soluble in water, from a body of polluted gaseous substance. If volume of the water, that is used as the liquid P.C.C., is increased because of condensation of water vapor content of the body of polluted gaseous substance, then the increased water volume may be released into the surrounding directly or being stored in a component of the wet embodiment of the pollutant capturer and mobilizer, temporarily, before being disposed at desired locations or facilities as desired. Produced crude oil, or any other type of synthetic or manufactured oil, or used engine oil may be used as the liquid pollutant capturing component of the wet embodiment of the pollutant capturer and mobilizer to capture $CO_2$ from the body of polluted gaseous substance. Any other desired type of liquid or combinations of liquids may be used as the liquid pollutant capturing component of the wet embodiment of the pollutant capturer and mobilizer provided that the liquid or combination of liquids can react with desired polluting substances of the body of polluted gaseous substance resulting in the removal of at least one type of the polluting substances from the body of polluted gaseous substance by dissolving or by absorbing or by formation of a solid substance or by denaturing or by consuming or by physical deposition or by altering the chemical properties of the polluting substances. When produced crude oil that is used as the liquid pollutant capturing component becomes saturated with $CO_2$ or other polluting substances of the body of polluted gaseous substance, the saturated produced crude oil can then be kept in designated liquid storage facilities as oil reserve, or be used for industrial applications, as desired. Similarly, when other types of synthetic or manufactured oil or used engine oil that are used as the liquid pollutant capturing component of the wet embodiment of the pollutant capturer and mobilizer become saturated with $CO_2$ or other polluting substances of the body of polluted gaseous substance, the saturated, or synthetic or manufactured oil or used engine oil can then be kept in designated liquid storage facilities as reserve quantities, or be used for industrial applications, as desired.

The capability of crude oil to absorb $CO_2$, and the associated swelling and decrease in viscosity of the crude oil, has been known because of $CO_2$ injection into geologic oil reservoirs for enhanced oil recovery in petroleum industry; it is also a well-established concept that $CO_2$ can be stored by injecting it in oil reservoirs. However, injection of $CO_2$ in oil reservoirs is an option that is available only to oil companies and not to the members of the public communities. The use of the produced crude oil as the liquid pollutant capturing component in the wet embodiment of the pollutant capturer and mobilizer offers an opportunity to individual members of the public community to contribute to minimizing the amount of $CO_2$ that is released into the atmosphere or the amount of $CO_2$ that exists in the atmosphere and takes advantage of the availability of the produced crude oil, which could have been stored as oil reserve otherwise, to capture $CO_2$ from a body of polluted gaseous substance before the produced crude oil is stored as oil reserve. Therefore the use of produced crude oil as a liquid pollutant capturing component in the wet embodiment of the pollutant capturer and mobilizer is a feasible and viable means of capturing $CO_2$ from atmospheric air, or from combustion products flowing in a chimney or stack or in a vehicle's exhaust pipe without producing any significant amount of extra $CO_2$ associated with the use of the wet embodiment of the pollutant capturer and mobilizer to capture the $CO_2$, as long as the resulting $CO_2$-saturated produced crude oil is kept as reserve oil or used for industrial applications. Similarly, a desired amount of produced crude oil from a body of reserve oil may be taken out for use as the pollutant capturing component in a wet embodiment of the pollutant capturer and mobilizer and keep the produced crude oil, after it has become saturated with $CO_2$ or other polluting substances of the body of polluted gaseous substance, in a designated storage facility again.

Two or multiple units of the wet embodiment of the pollutant capturer and mobilizer may be connected to each other such that the body of polluted gaseous substance that exits one unit of the wet embodiment of the pollutant capturer and mobilizer is fed into another unit of the wet embodiment of the pollutant capturer and mobilizer with the exit from the last interconnected units of the wet embodiment of the pollutant capturer and mobilizer being released, as treated gaseous substance, into the surrounding atmosphere. Similar or dissimilar liquid pollutant capturing components may be used in different interconnected units of the wet embodiment of the pollutant capturer and mobilizer allowing different types of polluting substances to be captured from a body of polluted gaseous substance as the latter flows through the interconnected units of wet embodiment of the pollutant capturer and mobilizer.

A wet embodiment of the pollutant capturer and mobilizer can be used as a stationary unit mounted on the ground or on a foundation or structure on rooftops or on streets or highways or campuses or parks, or in industrial parks, or in proximity of industrial plants and facilities, or in proximity of wildfires or active volcanos, or on rooftops, or on ships and other floating structures and trailers or mobile platforms, at desired locations to mobilize and move an atmospheric body of polluted gaseous substance from one location towards another location and capture one or multiple types of polluting substances from the atmospheric body of polluted gaseous substance. Similarly, a wet embodiment of the pollutant capturer and mobilizer can be connected to an existing chimney or stack as desired, to capture particulates and other desired pollutants from a body of polluted gaseous substance, that is flowing within the chimney or stack, before the body of polluted gaseous substance is released into the atmosphere. Also, the wet embodiment of the pollutant capturer and mobilizer can be mounted on a vehicle as desired, to take advantage of the speed of the vehicle which makes an atmospheric body of polluted gaseous substance to flow through the wet embodiment of the pollutant capturer and mobilizer, to capture particulates and other desired polluting substances from an atmospheric body of polluted gaseous substance as the vehicle moves from one location to another. Additionally, the wet embodiment of the pollutant capturer and mobilizer can be connected to the exhaust pipe of an existing vehicle as desired, to capture particulates and other desired polluting substances from a body of polluted gaseous substance that is flowing within the exhaust pipe, before the body of polluted gaseous substance is released into the atmosphere.

With water used as the liquid pollutant capturing component, one or multiple units of the wet embodiment of the pollutant capturer and mobilizer can be used at one or multiple locations to mobilize and move an atmospheric body of polluted gaseous substance, that contains also fog or water vapor, from one location towards another location to reduce rainfall at one location and therefore prevent flooding at the location, or initiate rainfall at another location and thus prevent drought at that other location, or accelerate or decelerate the movement of the atmospheric body of polluted gaseous substance to control the amount of rainfall at desired locations, or move an atmospheric body of polluted gaseous substance from one or multiple locations towards one or multiple other locations to disrupt a hurricane or formation of a hurricane, or disrupt a tornado or formation of a tornado, or disrupt heat and cold waves or formation of heat and cold waves, or produce liquid water from the fog as the atmospheric body of polluted gaseous substance flows through the liquid pollutant capturing component resulting in condensation of the fog or clear atmospheric air from fog at a location.

The dry embodiment of the pollutant capturer and mobilizer can be used to capture particulate substances and other desired pollutants from a body of polluted gaseous substance that occupies a space in the atmosphere or exits a chimney or stack or a vehicle's exhaust pipe.

Two or multiple units of the dry embodiment of the pollutant capturer and mobilizer may be connected to each other such that the body of polluted gaseous substance that exits one unit of dry embodiment of the pollutant capturer and mobilizer is fed into another unit of the dry embodiment of the pollutant capturer and mobilizer with the exit from the last interconnected units of the dry embodiment of the pollutant capturer and mobilizer being released, as treated gaseous substance, into the surrounding atmosphere. Similar or dissimilar pollutant removal filters may be used in different interconnected units of the dry embodiment of the pollutant capturer and mobilizer allowing different types and sizes of particulate polluting substances to be captured from a body of polluted gaseous substance as the latter flows through the interconnected units of the dry embodiment of the pollutant capturer and mobilizer.

A dry embodiment of the pollutant capturer and mobilizer can be used as a stationary unit mounted on the ground or on a foundation or structure on streets or highways or campuses or parks, or in industrial parks, or in proximity of industrial plants and facilities, or in proximity of wildfires or active volcanos, or on rooftops, or on ships and other floating structures, or on trailers or other mobile platforms, at desired locations to mobilize and move an atmospheric body of polluted gaseous substance from one location towards another location and capture particulate polluting substances from the atmospheric body of polluted gaseous substance. Similarly, the dry embodiment of the pollutant capturer and mobilizer can be connected to an existing chimney or stack, as desired, to capture particulate polluting substances from a body of polluted gaseous substance that flows within the chimney or stack, before the body of polluted gaseous substance is released into the surrounding atmosphere. Also, the dry embodiment of the pollutant capturer and mobilizer can be mounted on a vehicle to capture particulate polluting substances from an atmospheric body of polluted gaseous substance as the vehicle moves from one location to another. Additionally, the dry embodiment of the pollutant capturer and mobilizer can be connected to the exhaust pipe of an existing vehicle to capture particulate polluting substances from a body of polluted gaseous substance that flows within the exhaust pipe, before the body of polluted gaseous substance is released into the surrounding atmosphere.

One or multiple units of the dry embodiment of the pollutant capturer and mobilizer can be used at one or multiple locations to mobilize and move an atmospheric body of polluted gaseous substance, that contains also fog or water vapor, from one location towards another location to reduce rainfall at one location and therefore prevent flooding at the location, or initiate rainfall at another location and thus prevent drought at that other location, or accelerate or decelerate the movement of the atmospheric body of polluted gaseous substance to control the amount of rainfall at desired locations, or move an atmospheric body of polluted gaseous substance from one or multiple locations towards one or multiple other locations to disrupt a hurricane or formation of a hurricane, or disrupt a tornado or formation of a tornado, or disrupt heat and cold waves or formation of heat and cold waves, or mobilize the atmospheric body of polluted gaseous substance towards the location of the embodiment to produce liquid water from the fog, or clear atmospheric air from fog at a desired location, as the atmospheric body of polluted gaseous substance flows through the pollutant removal filter of the dry embodiment.

Any desired combination of units of the dry and wet embodiment of the pollutant capturer and mobilizer can be used such that a body of polluted gaseous substance that exits a unit of the dry embodiment of the pollutant capturer and mobilizer is fed into a unit of the wet embodiment of the pollutant capturer and mobilizer; the unit of the dry embodiment of the pollutant capturer and mobilizer can capture particulate polluting substances from the body of polluted gaseous substance while the unit of the wet embodiment of the pollutant capturer and mobilizer can capture any remaining particulate polluting substances, that might still exist in the body of polluted gaseous substance, as well as any desired gaseous polluting substances from the body of polluted gaseous substance.

The pollutant capturer and mobilizer that is the subject of this invention is a feasible, economical, affordable, efficient, and simple device that can be used to mobilize and move an atmospheric body of polluted gaseous substance from one location towards another location and capture particulate polluting substances or water vapor or fog or desired gaseous polluting substances, such as $CO_2$, from the atmospheric body of polluted gaseous substance or capture polluting substances from a body of polluted gaseous substance that flows in a chimney or stack or in a vehicle's exhaust pipe, without having any significant undesired environmental impacts. Compared to the existing methods of carbon dioxide capturing, the wet embodiment of the pollutant capturer and mobilizer does not require any cyclone or reactor or regenerator or heat exchanger or absorption tower or regenerator tower or boiler or condenser, and does not require the use of any pretreatment process, or any cooling or heating processes and can be built with much less cost and with less sophisticated manufacturing facilities. Because of the simplicity of its design, it is much easier to build, operate, and maintain either of the dry or wet embodiments of the pollutant capturer and mobilizer. Also, different embodiments of the pollutant capturer and mobilizer for different applications can be manufactured in a central facility and shipped to the site of installation easily. Most of the components of the wet and dry embodiments of the pollutant capturer and mobilizer can be built locally and with affordable cost with no need to sophisticated manufacturing facilities or processes, and can create high quality jobs for local communities.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A dry pollutant capturer and mobilizer, comprising:

(a) a base structure configured to support other components of the dry pollutant capturer and mobilizer directly or indirectly;

(b) a distributor having one or more inlet ports and two or more exit ports to receive a polluted gaseous substance and direct it towards other components of the dry pollutant capturer and mobilizer;

(c) a first barrier upstream from each of the one or more inlet ports to prevent undesired objects from entering an internal space of the dry pollutant capturer and mobilizer;

(d) at least one primary flow-establishing device between each inlet port of the distributor and a corresponding first barrier, with the at least one primary flow-establishing device attached to at least one component of the dry pollutant capturer and mobilizer and configured to force the polluted gaseous substance to flow into the internal space of the dry pollutant capturer and mobilizer;

(e) one dust box for each exit port of the distributor, each dust box connecting at least two components of the dry pollutant capturer and mobilizer together, and having at least one dust well configured to hold particulate polluting substances captured from the polluted gaseous substance;

(f) a removable dust box cap for each dust box of the dry pollutant capturer and mobilizer, mounted on or over a respective dust well to seal the dust well and to allow access to the dust well for removal of the particulate substances from the dust well;

(g) at least one pollutant removal filter for each dust box, configured to remove the particulate polluting substances from the polluted gaseous substance as the polluted gaseous substance flows through the pollutant removal filter; and (h) at least one secondary flow-establishing device between each exit port and a corresponding at least one pollutant removal filter, wherein the at least one secondary flow-establishing device is configured to further force the polluted gaseous substance to flow into and/or through the internal space of the dry pollutant capturer and mobilizer.

2. The dry pollutant capturer and mobilizer according to claim 1, open to atmosphere, configured to (i) move an atmospheric polluted gaseous substance that contains fog or water vapor from one location towards another location and (ii) produce liquid water from the fog or the water vapor, and/or clear the fog from the atmosphere at the one location.

3. The dry pollutant capturer and mobilizer according to claim 1, configured to be mounted on and connected to a chimney or a stack through which the polluted gaseous substance flows, and receive and capture the particulate polluting substances from the polluted gaseous substance in the chimney or the stack.

4. The dry pollutant capturer and mobilizer according to claim 1, configured to (i) be mounted on and connected to a vehicle, the vehicle having an exhaust pipe through which the polluted gaseous substance flows, and (ii) receive and capture the particulate polluting substances from the polluted gaseous substance in the exhaust pipe.

5. The dry pollutant capturer and mobilizer according to claim 1, wherein the polluted gaseous substance is an atmospheric polluted gaseous substance, and the dry pollutant capturer and mobilizer is configured to be mounted on and connected to a vehicle, be open to an atmospheric polluted gaseous substance, and receive and capture particulate polluting substances from the atmospheric polluted gaseous substance as the vehicle moves.

6. The dry pollutant capturer and mobilizer according to claim 1, open to atmosphere, configured to (i) move an atmospheric polluted gaseous substance that contains fog or water vapor from one location towards another location and (ii) reduce rainfall at the one location, initiate rainfall at the other location, prevent or reduce drought at the other location, and/or accelerate or decelerate movement of the atmospheric polluted gaseous substance to control the rainfall at the one location.

7. The dry pollutant capturer and mobilizer according to claim 1, wherein the distributor further has a plurality of thermal fins thereon, configured to dissipate heat carried into the dry pollutant capturer and mobilizer.

8. The dry pollutant capturer and mobilizer according to claim 1, wherein each secondary flow-establishing device is between a corresponding one of the exit ports and a corresponding dust box, and each dust box is between a corresponding secondary flow-establishing device and the corresponding at least one pollutant removal filter.

9. A method of capturing particulate polluting substances from a polluted gaseous substance utilizing a dry pollutant capturer and mobilizer, comprising:
   (a) using one or more primary flow-establishing devices, forcing the polluted gaseous substance to flow into the dry pollutant capturer and mobilizer when the polluted gaseous substance does not have sufficient energy to flow into the dry pollutant capturer and mobilizer on its own;
   (b) passing the polluted gaseous substance through a first barrier configured to prevent undesired objects from entering an internal space of the dry pollutant capturer and mobilizer;
   (c) using a distributor, receiving the polluted gaseous substance into the internal space of the dry pollutant capturer and mobilizer through an inlet port and directing the polluted gaseous substance through each of a plurality of exit ports towards dust boxes of the dry pollutant capturer and mobilizer, each of the dust boxes having a cap thereon and the dry pollutant capturer and mobilizer having one dust box for each exit port of the distributor;
   (d) using the dust boxes, containing accumulated captured particulate polluting substances of the polluted gaseous substance, the dust boxes having dust wells therein, and holding the accumulated captured particulate polluting substances in the dust wells; and
   (e) using at least one pollutant removal filter for each dust box in the dry pollutant capturer and mobilizer, removing the particulate polluting substances from the polluted gaseous substance;
   (f) using at least one secondary flow-establishing device between each exit port and a corresponding at least one pollutant removal filter, further forcing the polluted gaseous substance to flow into and/or through the internal space of the dry pollutant capturer and mobilizer; and
   (g) removing the cap from at least one of the dust boxes, and removing the accumulated captured particulate polluting substances from the corresponding dust wells.

10. The method of capturing particulate polluting substances from a polluted gaseous substance according to claim 9, comprising forcing the polluted gaseous substance to flow into the dry pollutant capturer and mobilizer using each of the secondary flow-establishing devices.

11. The method of capturing particulate polluting substances from a polluted gaseous substance according to claim 9, wherein the at least one pollutant removal filter comprises an air filtering component, a cloth, a spongy or fibrous substance, or a combination thereof.

12. The method of capturing polluting substances from a polluted gaseous substance according to claim 11, wherein the polluted gaseous substance is an atmospheric polluted gaseous substance, and the method further comprises receiving the particulate polluting substances from the atmospheric polluted gaseous substance.

13. The method of capturing polluting substances from a polluted gaseous substance according to claim 11, further comprising mounting the dry pollutant capturer and mobilizer on a chimney or a stack through which the polluted gaseous substance flows, and capturing the particulate polluting substances from the polluted gaseous substance in the chimney or the stack.

14. The method of capturing polluting substances from a polluted gaseous substance according to claim 11, further comprising mounting the dry pollutant capturer and mobilizer on a vehicle, the vehicle having an exhaust pipe from which the polluted gaseous substance flows, and capturing the particulate polluting substances from the polluted gaseous substance in the vehicle's exhaust pipe.

15. The method of capturing polluting substances from a polluted gaseous substance according to claim 11, further comprising (i) moving an atmospheric polluted gaseous substance that contains fog or water vapor from one location towards another location and (ii) producing liquid water from the fog or the water vapor and/or clearing the fog from the atmosphere at the one location as the atmospheric polluted gaseous substance flows through the at least one pollutant removal filter of the dry pollutant capturer and mobilizer.

16. The method of capturing particulate polluting substances from a polluted gaseous substance according to claim 9, wherein each pollutant removal filter is in a corresponding filter house, and the method further comprises accessing an internal space of the corresponding filter house to maintain or replace the pollutant removal filter.

17. The method of capturing polluting substances from a polluted gaseous substance according to claim 11, further comprising (i) moving an atmospheric polluted gaseous substance that contains fog or water vapor from one location towards another location and (ii) reducing rainfall at the one location, initiating rainfall at the other location, or accelerating or decelerating movement of the atmospheric polluted gaseous substance to control the rainfall at the one location.

18. A dry pollutant capturer and mobilizer, comprising:
   (a) a supply connector receiving a polluted gaseous substance from an entrance to the dry pollutant capturer and mobilizer;
   (b) a distributor having one or more inlet ports and two or more exit ports to receive the polluted gaseous substance and direct it towards other components of the dry pollutant capturer and mobilizer;

(c) at least one pollutant removal filter for each exit port of the distributor, configured to remove the particulate polluting substances from the polluted gaseous substance as the polluted gaseous substance flows through the at least one pollutant removal filter; and (d) an insulator at the entrance to the dry pollutant capturer and mobilizer, configured to connect the dry pollutant capturer and mobilizer to and thermally insulate the dry pollutant capturer and mobilizer from a hot structure or surface.

19. The dry pollutant capturer and mobilizer according to claim 18, wherein the distributor further has a plurality of thermal fins thereon, configured to dissipate heat carried into the dry pollutant capturer and mobilizer.

20. The dry pollutant capturer and mobilizer according to claim 18, wherein:

(a) the dry pollutant capturer and mobilizer further comprises a base comprising a flexible substrate, two rods threaded at one end and secured to the base, and a plurality of clamps, and (b) the two rods and the base are adapted to be mounted on an exhaust pipe of a vehicle using the plurality of clamps.

* * * * *